(12) United States Patent
McGuire, Jr. et al.

(10) Patent No.: US 7,360,899 B2
(45) Date of Patent: Apr. 22, 2008

(54) BEAMSPLITTING STRUCTURES AND METHODS IN OPTICAL SYSTEMS

(75) Inventors: James P. McGuire, Jr., Pasadena, CA (US); William J. Cassarly, Mason, OH (US); John R. Rogers, Monrovia, CA (US); Douglas A. Nutter, Monrovia, CA (US)

(73) Assignee: Optical Research Associates, Pasadena, CA (US)

( * ) Notice: Subject to any disclaimer, the term of this patent is extended or adjusted under 35 U.S.C. 154(b) by 210 days.

(21) Appl. No.: 10/852,728

(22) Filed: May 24, 2004

(65) Prior Publication Data
US 2007/0252954 A1    Nov. 1, 2007

Related U.S. Application Data

(60) Provisional application No. 60/472,713, filed on May 22, 2003, provisional application No. 60/472,617, filed on May 22, 2003, provisional application No. 60/472,712, filed on May 22, 2003, provisional application No. 60/472,823, filed on May 22, 2003, provisional application No. 60/532,105, filed on Dec. 22, 2003.

(51) Int. Cl.
*G03B 21/28* (2006.01)
*G03B 21/26* (2006.01)
*G02B 5/30* (2006.01)
*G02B 27/28* (2006.01)
*G02B 27/12* (2006.01)
*G02F 1/1335* (2006.01)
*H04N 5/74* (2006.01)

(52) U.S. Cl. ............................. 353/20; 353/33; 353/37; 353/81; 353/99; 359/495; 359/496; 359/497; 359/638; 359/640; 349/9; 348/759

(58) Field of Classification Search ................. 353/20, 353/30, 33, 34, 37, 81, 82, 47, 77–79, 98, 353/99; 359/483, 487–489, 494–497, 618, 359/629–634, 636, 638–640, 13, 453, 456, 359/460, 831, 833, 834, 837, 880; 349/8, 349/9, 57, 96; 348/739, 744, 750, 758, 759, 348/787, 789, 836; 345/7–9
See application file for complete search history.

(56) References Cited

U.S. PATENT DOCUMENTS 3,825,336 A    7/1974   Reynolds (Continued)

FOREIGN PATENT DOCUMENTS

EP    0 269 259 B1    3/1992

OTHER PUBLICATIONS

NanoOpto Subwave PBS/C, *SubWave Polarization Beam Splitter/Combiner*, Copyright 2002, NanoOpto Corporation, DOC0001/V2/PBSC/Sep. 2002 (2 pages).

(Continued)

*Primary Examiner*—Rochelle Blackman
(74) *Attorney, Agent, or Firm*—Knobbe Martens Olson & Bear LLP

(57) ABSTRACT

Various embodiments involving structures and methods for illumination can be employed, for example, in projectors, head-mounted displays, helmet-mounted displays, back projection TVs, flat panel displays as well as other optical systems. Certain embodiments may include prism elements for illuminating, for example, a spatial light modulator. Light may be coupled to the prism in some cases using fiber optics or lightpipes. The optical system may also include a diffuser having scatter features arranged to scatter light appropriately to produce a desired luminance profile. Other embodiments are possible as well.

4 Claims, 26 Drawing Sheets

U.S. PATENT DOCUMENTS

| | | | |
|---|---|---|---|
| 4,933,755 A | 6/1990 | Dahl et al. | |
| 4,978,182 A | 12/1990 | Tedesco | |
| 5,028,121 A | 7/1991 | Baur et al. | |
| 5,042,921 A | 8/1991 | Sato et al. | |
| 5,124,841 A | 6/1992 | Oishi | |
| 5,436,763 A | 7/1995 | Chen et al. | |
| 5,436,765 A | 7/1995 | Togino | |
| 5,452,128 A | 9/1995 | Kimura | |
| 5,499,139 A | 3/1996 | Chen et al. | |
| 5,513,023 A | 4/1996 | Fritz et al. | |
| 5,526,183 A | 6/1996 | Chen | |
| 5,537,253 A | 7/1996 | Cox et al. | |
| 5,684,634 A | 11/1997 | Rogers | |
| 5,701,202 A | 12/1997 | Takahashi | |
| 5,712,649 A | 1/1998 | Tosaki | |
| 5,714,967 A | 2/1998 | Okamura et al. | |
| 5,716,122 A | 2/1998 | Esaki et al. | |
| 5,726,670 A | 3/1998 | Tabata et al. | |
| 5,726,807 A | 3/1998 | Nakaoka et al. | |
| 5,743,612 A | 4/1998 | Matsuda et al. | |
| 5,748,369 A | 5/1998 | Yokota | |
| 5,771,124 A | 6/1998 | Kintz et al. | |
| 5,796,526 A | 8/1998 | Anderson | |
| 5,822,127 A | 10/1998 | Chen et al. | |
| 5,825,455 A | 10/1998 | Fecteau et al. | |
| 5,838,490 A | 11/1998 | Fritz | |
| 5,877,824 A | 3/1999 | Sarayeddine | |
| 5,880,888 A | 3/1999 | Schoenmakers et al. | |
| 5,889,625 A | 3/1999 | Chen et al. | |
| 5,892,598 A | 4/1999 | Asakawa et al. | |
| 5,997,150 A | 12/1999 | Anderson | |
| 6,019,469 A | 2/2000 | Fecteau et al. | |
| 6,023,253 A | 2/2000 | Taniguchi et al. | |
| 6,040,945 A | 3/2000 | Karawawa | |
| 6,062,695 A | 5/2000 | Kakuda et al. | |
| 6,215,460 B1 | 4/2001 | Mizoguchi et al. | |
| 6,222,508 B1 | 4/2001 | Alvelda et al. | |
| 6,254,236 B1 | 7/2001 | Fecteau et al. | |
| 6,331,916 B1 | 12/2001 | Mukawa | |
| 6,341,876 B1 | 1/2002 | Moss et al. | |
| 6,342,871 B1 | 1/2002 | Takeyama | |
| 6,353,503 B1 | 3/2002 | Spitzer et al. | |
| 6,462,882 B2 | 10/2002 | Chen et al. | |
| 6,499,863 B2 | 12/2002 | Dewald | |
| 6,697,200 B2 | 2/2004 | Nagaoka | |
| 6,700,557 B1 | 3/2004 | McKnight | |
| 6,771,424 B1 | 8/2004 | Amafuji et al. | |
| 7,196,849 B2* | 3/2007 | McGuire et al. | 359/630 |
| 7,206,133 B2* | 4/2007 | Cassarly et al. | 359/630 |
| 2001/0010598 A1 | 8/2001 | Aritake et al. | |
| 2002/0003508 A1 | 1/2002 | Schehrer et al. | |
| 2002/0060851 A1 | 5/2002 | Yamazaki | |
| 2003/0071072 A1* | 4/2003 | Takahashi et al. | 222/214 |
| 2003/0071972 A1 | 4/2003 | Ito et al. | |
| 2003/0086135 A1 | 5/2003 | Takeyama | |
| 2003/0197933 A1 | 10/2003 | Sudo et al. | |
| 2004/0095637 A1* | 5/2004 | Nikolov et al. | 359/352 |
| 2006/0098293 A1 | 5/2006 | Garoutte et al. | |

OTHER PUBLICATIONS

C. Bill Chen, *Wide field of view, wide spectral band off-axis helmut-mounted display optical design*, Optical Design Conference 2002, SPIE vol. 4832 (2002), pp. 61-66.

U.S. Appl. No. 10/852,679, filed May 24, 2004.

U.S. Appl. No. 10/852,669, filed May 24, 2004.

U.S. Appl. No. 10/852,727, filed May 24, 2004.

*International Search Report for PCT/US04/16221*, entitled "Illumination in Optical Systems", listing James P. McGuire, Jr, John Rogers, Doug Nutter and Bill Cassarly as inventors.

*International Search Report for PCT/US04/16214*, entitled "Optical Combiner Designs and Head Mounted Displays", listing John Rogers as inventor.

Moxtek, Inc., *ProFlux PBS with LCOS*, May 2002 (2 pages).

Bruzzone, Charles L. et al., *High-Performance LCoS Optical Engine Using Cartesian Polarizer Technology*, SID 03 Digest, May 2003, pp. 126-129.

Kaiser, Norbert et al., *Optical Interference Coatings*, Springer Series in Optical Sciences, Spring-Verlag Berlin Heidelberg, Jul. 15, 2003, pp. 422-454.

Kawashima, T. et al., *Photonic Crystal Polarization Beam Splitters and Their Applications-First Industrialization of Photonic Crystals*, OFC, Mar. 27, 2003, pp. 1-3.

Arnold, Stephen et al., *An Improved Polarizing Beamsplitter LCoS Projection Display Based on Wire-Grid Polarizers*, Jun. 2001, pp. 1282-1285.

Bone, Matthew, *Front-Projection Optical-System Design for Reflective LCoS Technology*, Journal of the SID, Sep. 2001, pp. 227-232.

Chen, Jianmin et al., *Two-Panel Architecture for Reflective LCD Projector*, SID 01 Digest, Jun. 2001, pp. 1084-1087.

Shimizu, Jeffrey A., *Invited Paper: Scrolling Color LCoS for HDTV Rear Projection*, SID 01 Digest, Jun. 2001, pp. 1072-1075.

Moreland, John, John Moreland's HDD Project, Jun. 21, 2002, www.sdsc.edu/moreland/projects/HDD/HDD.html.

*International Search Report for PCT/US04/16221*, entitled "Illumination in Optical Systems", listing James P. McGuire, Jr, John Rogers, Doug Nutter and Bill Cassarly as inventors, Nov. 4, 2004.

*International Search Report for PCT/US04/16214*, entitled "Optical Combiner Designs and Head Mounted Displays", listing John Rogers as inventor, Nov. 12, 2004.

* cited by examiner

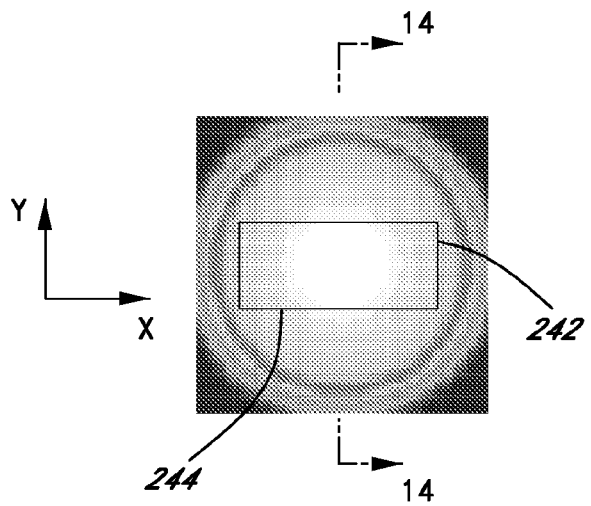
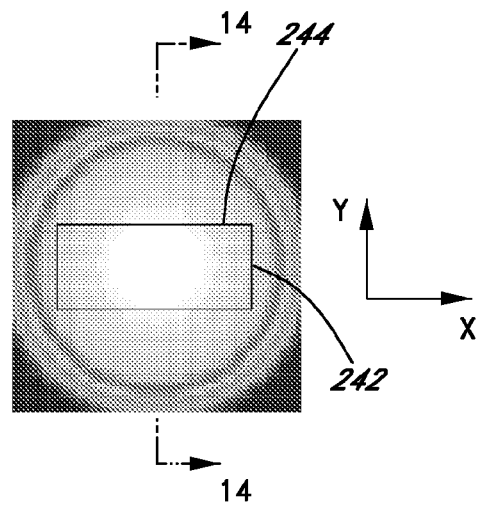
FIG. 12   FIG. 13
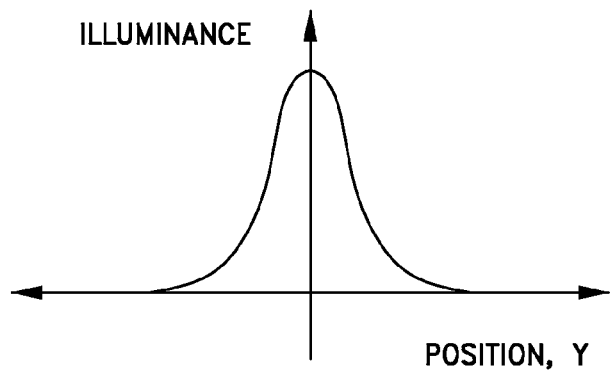
FIG. 14
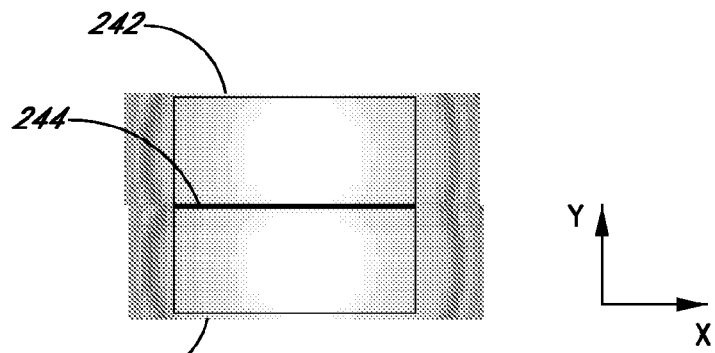
FIG. 15

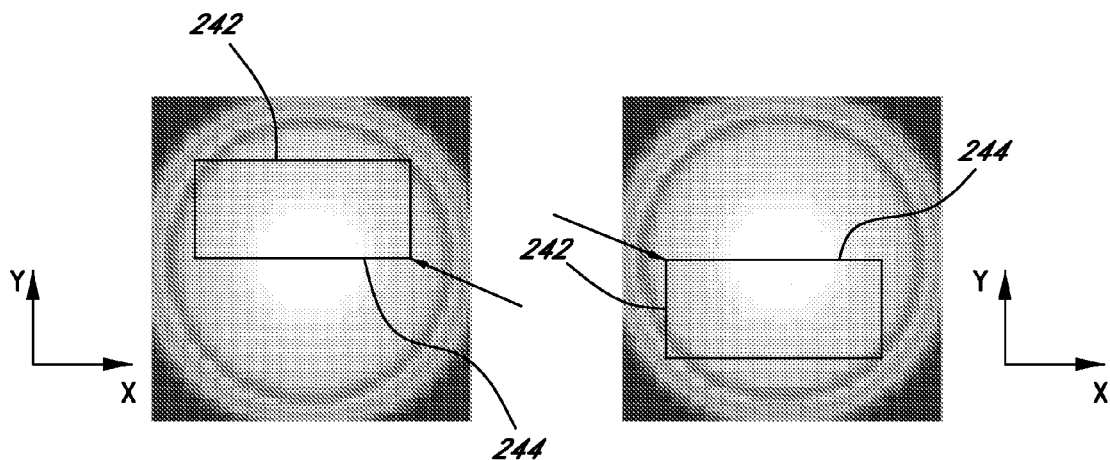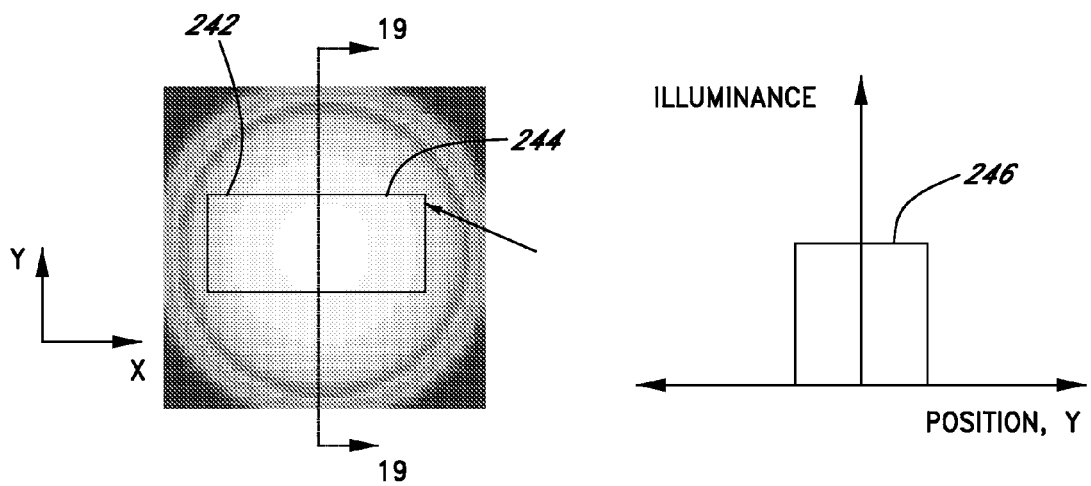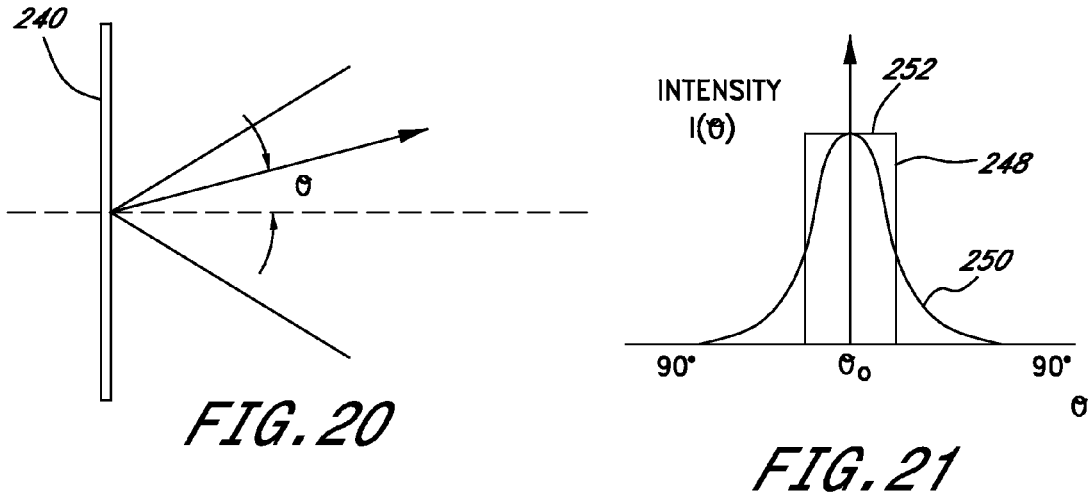

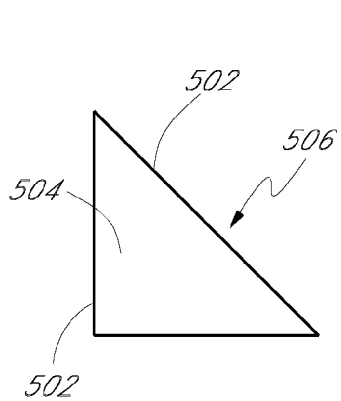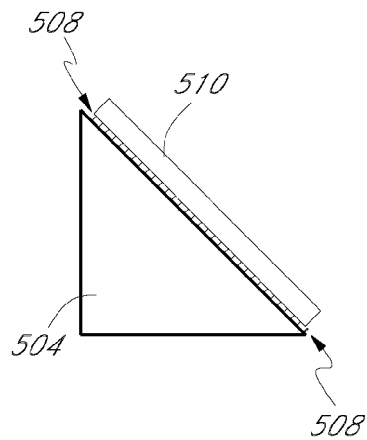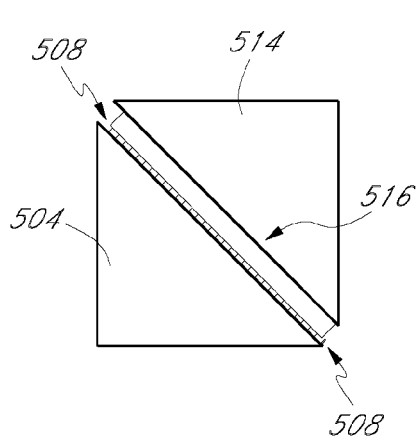
FIG.27A  FIG.27B  FIG.27C
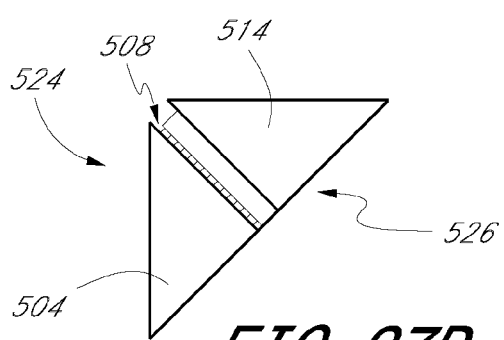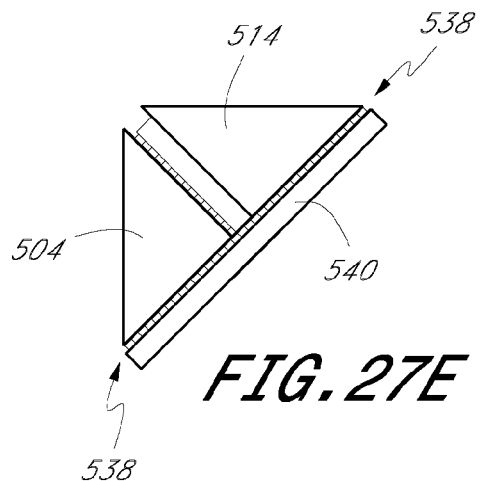
FIG.27D  FIG.27E
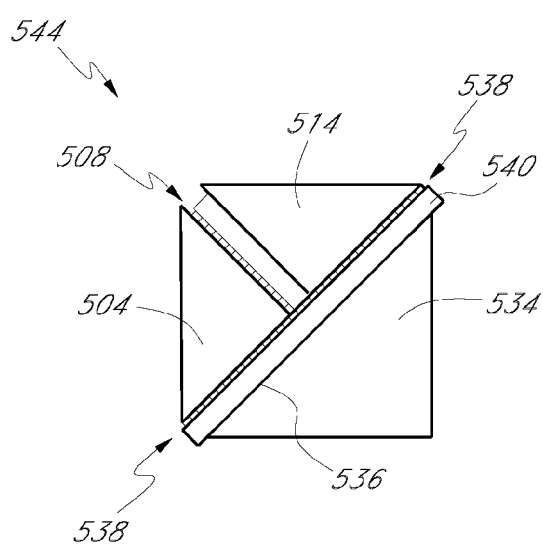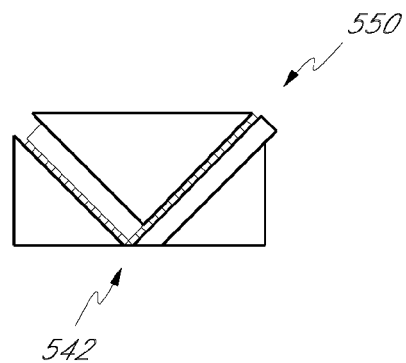
FIG.27F  FIG.27G

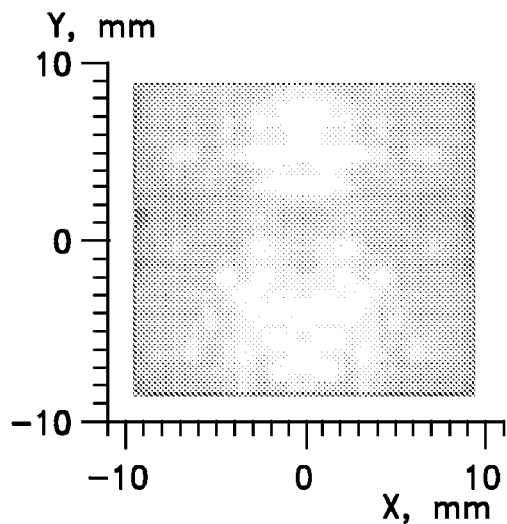 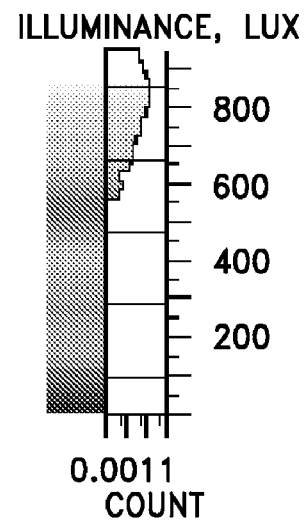
FIG.31               FIG.32
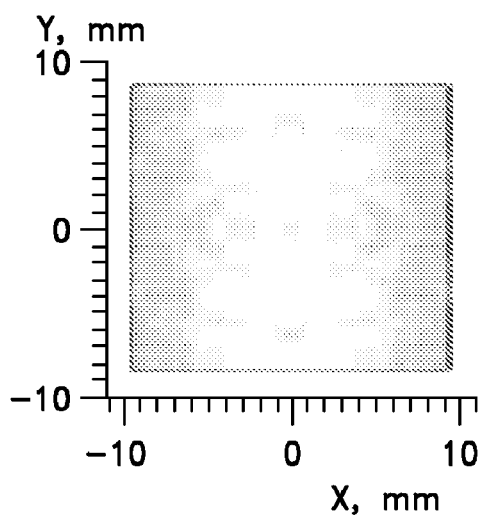 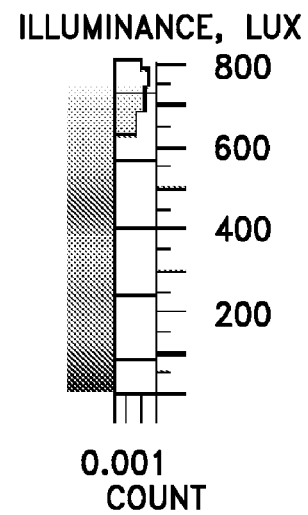
FIG.33               FIG.34 ized Patent Application No. 60/472,713, filed May 22, 2003 and entitled "Polarization

BEAMSPLITTING STRUCTURES AND METHODS IN OPTICAL SYSTEMS

PRIORITY APPLICATIONS

This application claims the benefit of priority under 35 U.S.C. 119(e) to U.S. Provisional Patent Application No. 60/472,713, filed May 22, 2003 and entitled "Polarization Beamsplitting Elements and Methods", U.S. Provisional Patent Application No. 60/472,617, filed May 22, 2003 and entitled "Combiner and Visors for Head Mounted and Helmet Mounted Displays", U.S. Provisional Patent Application No. 60/472,712, filed May 22, 2003 and entitled "Optical Systems and Methods for Head Mounted and Helmet Mounted Displays", U.S. Provisional Patent Application No. 60/472,823, filed May 22, 2003 and entitled "Illumination of Polarization Beamsplitters", and U.S. Provisional Patent Application No. 60/532,105, filed Dec. 22, 2003 and entitled "Beamsplitting Elements and Structures and Methods for Illumination", which are each incorporated herein by reference in their entirety.

BACKGROUND OF THE INVENTION

1. Field of the Invention

This invention relates to illumination devices and methods that may be used, for example, in displays and projection systems, etc.

2. Description of the Related Art

Optical devices for presenting information and displaying images are ubiquitous. Some examples of such optical devices include computer screens, projectors, televisions, and the like. Front projectors are commonly used for presentations. Flat panel displays are employed for computers, television, and portable DVD players, and even to display photographs and artwork. Rear projection TVs are also increasingly popular in the home. Cell phones, digital cameras, personal assistants, and electronic games are other examples of hand-held devices that include displays. Heads-up displays where data is projected on, for example, a windshield of an automobile or in a cockpit of an aircraft, will be increasingly more common. Helmet mounted displays are also employed by the military to display critical information superimposed on a visor or other eyewear in front of the wearer's face. With this particular arrangement, the user has ready access to the displayed information without his or her attention being drawn away from the surrounding environment, which may be a battlefield in the sky or on the ground. In other applications, head mounted displays provide virtual reality by displaying graphics on a display device situated in front of the user's face. Such virtual reality equipment may find use in entertainment, education, and elsewhere. In addition to sophisticated gaming, virtual reality may assist in training pilots, surgeons, athletes, teen drivers and more.

Preferably, these different display and projection devices are compact, lightweight, and reasonably priced. As many components are included in the optical systems, the products become larger, heavier, and more expensive than desired for many applications. Yet such optical devices are expected to be sufficiently bright and preferably provide high quality imaging over a wide field-of-view so as to present clear text or graphical images to the user. In the case of the helmet or more broadly head mounted displays, for example, the display preferably accommodates a variety of head positions and varying lines-of-sight. For projection TVs, increased field-of-view is desired to enable viewers to see a bright clear image from a wide range of locations with respect to the screen. Such optical performance depends in part on the illumination and imaging optics of the display.

What is needed, therefore, are illumination and imaging optics for producing lightweight, compact, high quality optical systems at a reasonable cost.

SUMMARY OF THE INVENTION

One embodiment of the invention comprises a head mounted display for displaying images comprising: a spatial light modulator; head mounted display imaging optics for imaging said spatial light modulator; first and second polarization beamsplitting surfaces facing different directions; and headgear configured to mount to a person's head to facilitate viewing of said images, wherein (i) said first and second reflective polarization beamsplitting surfaces are oriented to reflect similarly polarized light along a common direction toward said spatial light modulator to provide illumination for said spatial light modulator and (ii) said first and second reflective beamsplitting surfaces are each disposed in optical paths between said head mounted display imaging optics and said spatial light modulator.

Another embodiment of the invention comprises an illumination engine for a rear projection monitor, said illumination engine comprising: a spatial light modulator; at least one illumination source outputting light; a polarization beamsplitting prism including first and second reflecting polarization beamsplitting surfaces; a support structure supporting said spatial light modulator and said polarization beamsplitting prism; a first polarizer disposed along an optical path to said first beamsplitting surface such that light propagated through said first polarizer is polarized and continues onto said polarization beamsplitting surface and is reflected therefrom; a second polarizer disposed along an optical path to said second beamsplitting surface such that light propagated through said second polarizer is polarized and continues onto said polarization beamsplitting surface and is reflected therefrom; and monitor projection optics disposed with respect to said spatial light modulator to project images of patterns formed by said spatial light modulator onto a rear projection monitor screen, wherein said first and second polarization beamsplitting surfaces are oriented to reflect said light polarized by said first and second polarizers toward said spatial light modulator, said first and second beamsplitting surfaces facing different directions.

Another embodiment of the invention comprises a color projection system for projecting color images comprising: a spatial light modulator; a color light source configured to output colored light; and a polarization beamsplitting prism element including first and second reflective polarization beamsplitting surfaces that reflects light having a different polarization state than light transmitted by said reflective polarization beamsplitting surfaces, said polarization beamsplitting prism element further comprising first and second substantially optically transmissive faces; wherein said first and second polarization beamsplitting surfaces are oriented to reflect polarized light through said first substantially optically transmissive face to said spatial light modulator and said second substantially optically transmissive face is disposed to receive said light returned from said spatial light modulator propagated through said first optically transmissive face.

Another embodiment of the invention comprises a method of forming an image in the eye of a viewer using a head mounted display comprising: selectively altering a plurality of pixels in a spatial light modulator thereby forming a pattern with said spatial light modulator; polarizing a first beam of light and propagating said first polarized light beam to a first reflective polarization beamsplitting surface; polarizing a second beam of light and propagating said second polarized light beam to a second polarization beamsplitting surface; reflecting said first and second polarized light beams by said respective first and second polarization beamsplitting surfaces toward said spatial light modulator to provide illumination; and forming an image of said pattern formed by said spatial light modulator in said viewer's eye.

Another embodiment of the invention comprises a method of forming an image on a screen of a rear projection TV comprising: manipulating said spatial light modulator to form a spatial pattern for creating a video image; propagating a first polarized light beam to a first polarization beamsplitting surface that reflects light having the polarization of said first polarized light beam and transmits orthogonal polarization states; propagating a second polarized light beam to a second polarization beamsplitting surface that reflects light having the polarization of said second polarized light beam and transmits orthogonal polarization states; reflecting said first and second polarized light beams with said respective first and second polarization beamsplitting surfaces to said spatial light modulator to provide illumination; and propagating light from said spatial light modulator through said first and second polarization beamsplitting surfaces to imaging optics for forming an image of said pattern on said screen of said rear projection TV.

Another embodiment of the invention comprises A method of forming an image on a screen, said method comprising: selectively altering a plurality of pixels in a spatial light modulator thereby forming a pattern with said spatial light modulator; providing first and second polarized beams of light for illuminating said spatial light modulator; propagating said first polarized light beam to a first polarization beamsplitting surface that reflects light having the polarization of said first polarized light beam and transmits orthogonal polarization states; propagating said second polarized light beam to a second polarization beamsplitting surface that reflects light having said polarization of said second polarized light beam and transmits orthogonal polarization states; reflecting said first and second polarized light beams by said respective first and second polarization beamsplitting surfaces toward said spatial light modulator to provide illumination; and forming an image of pattern formed by said spatial light modulator on a screen.

Another embodiment of the invention comprises an image formation device for a display, said image formation device comprising: one or more sources of light; a polarization beamsplitting prism including first and second beamsplitting surfaces, said first and second beamsplitting surfaces discriminating between orthogonal polarization states, said first and second beamsplitting surfaces selectively reflecting light depending on the polarization state of said light; a first polarizer disposed along an optical path to said first beamsplitting surface such that light propagated through said first polarizer is polarized and continues onto said fiber polarization beamsplitting surface and is reflected therefrom; a second polarizer disposed along an optical path to said second beamsplitting surface such that light propagated through said second polarizer is polarized and continues onto said fiber polarization beamsplitting surface and is reflected therefrom, and a spatial light modulator device; wherein said first and second polarization beamsplitting surfaces are oriented to reflect said light polarized by said first and second polarizers toward said reflective spatial light modulator, said reflective spatial light modulator reflecting at least a portion of the light back through the first and second polarization beamsplitting surfaces and through said polarization beamsplitting element.

Another embodiment of the invention comprises an optical system for forming color images, said optical system comprising: at least one color light source outputting colored light; a polarization beamsplitting prism element including first and second beamsplitting surfaces; a color selective filtering element comprising an input port, at least one color filter, and a plurality of color output ports, said at least one color filter distributing different colored light to said color output ports; and a plurality of spatial light modulators respectively disposed to receive different colored light from said plurality of color output ports, wherein said first and second polarization beamsplitting surfaces are oriented to reflect said colored light through said input port of said color selective filtering element.

Another embodiment of the invention comprises a method of fabricating a polarization beamsplitting element comprising: disposing a first wire grid polarizer between first and second prisms; removing a portion of said first and second prisms and a portion of said wire grid polarizer to form a surface angled with respect to said first wire grid polarizer; disposing a second wire grid polarizer between a third prism and said surface angled with respect to said first wire grid polarizer; and removing a portion of said third prism, one of said first and second prisms, and said second wire grid polarizer.

Another embodiment of the invention comprises a prism comprising: a substantially optically transmissive body having first and second input ports for receiving light and an output port for egress of light; a first reflecting polarization beamsplitting surface comprising a wire grid polarizer angled with respect to said first input to direct polarized light received by said first input port through said output port; and a second reflecting polarization beamsplitting surface comprising a wire grid polarizer angled with respect to said first input to direct polarized light received by said second input port through said output port.

Another embodiment of the invention comprises a prism comprising: a substantially optically transmissive body having first and second input faces for receiving light and an output face for egress of light; a first reflecting polarization beamsplitting surface angled with respect to said first input face to direct polarized light received by said first input face through said output face; and a second reflecting polarization beamsplitting surface angled with respect to said first input face to direct polarized light received by said second input face through said output face, wherein said first and second reflecting polarization beamsplitting surfaces are each less than about 100 microns thick thereby increasing uniformity in illumination across said output face.

Another embodiment of the invention comprises a prism comprising: a substantially optically transmissive body having first and second inputs for receiving light and an output face for egress of light; a first reflecting polarization beamsplitting surface angled with respect to said first input to direct polarized light received by said first input through said output face; and a second reflecting polarization beamsplitting surface angled with respect to said first input to direct polarized light received by said second input through said output face, said first and second reflecting polarization beamsplitting surfaces converging toward a central region of said output face, wherein said first and second reflecting polarization beamsplitting surfaces have dimensions and are in proximity with respect to each other to provide substantially uniform illumination across said output face with no larger than a 5 micrometer dark strip at the central region of said output face.

Another embodiment of the invention comprises a prism comprising: a substantially optically transmissive body having an outer surface for receiving light into said prism and an exit surface for egress for light; and a reflecting polarization beamsplitting surface having a shape in the form of a surface formed by rotating of a line about a central axis through said substantially optically transmissive prism body, wherein said reflecting polarization beamsplitting surface is disposed with respect to exit surface to direct polarized light received into said body through said outer surface toward and through said exit surface.

Another embodiment of the invention comprises an optical illumination apparatus comprising: a first reflective polarization beamsplitting surface that discriminates between different polarization; a second reflective polarization beamsplitting surface that discriminates between different polarization, said second polarization beamsplitting surface facing a different direction than said first polarization beamsplitting surface; and a modulator array; wherein said first and second polarization beamsplitting surfaces are oriented to reflect said light polarized by said first and second polarizers along a common direction toward said modulator array to be illuminated.

Another embodiment of the invention comprises an optical illumination apparatus comprising: a polarization beamsplitting prism element including first and second beamsplitting surfaces, said first and second beamsplitting surfaces discriminating between orthogonal polarization states, light reflected by said beamsplitting surface having a different polarization state as light transmitted by said polarization beamsplitting surface, a first polarizer disposed along an optical path to said first beamsplitting surface such that light propagated through said first polarizer is polarized and continues onto said fiber polarization beamsplitting surface and is reflected therefrom; and a second polarizer disposed along an optical path to said second beamsplitting surface such that light propagated through said second polarizer is polarized and continues onto said fiber polarization beamsplitting surface and is reflected therefrom, wherein said first and second polarization beamsplitting surfaces are oriented to reflect said light polarized by said first and second polarizers toward an area to be illuminated, said first and second beamsplitting surfaces facing opposite directions.

Another embodiment of the invention comprises a method of illuminating a spatial light modulator, said method comprising: propagating said first polarized light beam to a first polarization beamsplitting surface that reflects light having said polarization of said first polarized light beam and transmits orthogonal polarization states; and propagating said second polarized light beam to a second polarization beamsplitting surface that reflects light having said polarization of said second polarized light beam and transmits orthogonal polarization states, wherein said first and second polarized light beams are reflected by said respective first and second polarization beamsplitting surfaces toward said spatial light modulator.

Another embodiment of the invention comprises an optical apparatus for producing images, said apparatus comprising: a polarization beamsplitting prism element including first and second beamsplitting surfaces, said first and second beamsplitting surfaces discriminating between different polarization states, said first and second beamsplitting surfaces selectively reflecting light depending on the polarization state of said light; and a reflective light modulation module; wherein said first and second polarization beamsplitting surfaces are oriented to reflect said polarized light toward said reflective light modulation module, said reflective light modulation module reflecting at least a portion of the light back though the first and second polarization beamsplitting surfaces and through said polarization beamsplitting element.

BRIEF DESCRIPTION OF THE DRAWINGS

FIGS. 12 and 13 are schematic representations of the illuminance incident on two respective portions the spatial light modulator wherein the illuminance has a Gaussian distribution;

FIG. 14 is plot on axes of position (Y) and illuminance depicting a Gaussian distribution;

FIG. 15 is a schematic representation of the illuminance distribution across the two portions of the spatial light modulator which is illuminated by light reflected from the respective reflecting surfaces of the "V" prism;

FIGS. 16 and 17 are schematic representations of the illuminance incident on the two portions of the spatial light modulator of the "V" prism wherein the central peak is shifted with respect to the respective portions of the spatial light modulator;

FIG. 18 is a schematic representation of the illuminance having a "flat top" distribution incident on one portion of the spatial light modulator;

FIG. 19 is a plot on axes of position (Y) and illuminance depicting a "top hat" distribution;

FIG. 20 is a cross-sectional schematic representation of a diffuser scattering light into a cone of angles;

FIG. 21 is a plot on axes of angle, θ, and intensity illustrating different angular intensity distributions that may be provided by different types of diffusers;

FIGS. 27A-27G are cross-sectional views schematically illustrating one embodiment of a process for forming a V-prism comprising a pair of wire grid polarization beam-splitting surfaces;

FIG. 31 is a plot of the illuminance distribution across the spatial light modulator provided by a wedge-shaped "V" prism;

FIG. 32 is a histogram of luminous flux per area (in lux) that illustrates that the luminous flux per area received over the spatial light modulator is within a narrow range of values;

FIG. 33 is a plot of the illuminance distribution across the spatial light modulator provided by a "V" prism in combination with a wedge separated from the "V" prism by an air gap such as shown in FIG. 28;

FIG. 34 is a histogram of luminous flux per area (in lux) that illustrates that the luminous flux per area received over the spatial light modulator is within a narrow range of values;

FIG. 44 is a histogram of luminous flux per area per solid angle (in Nits) that illustrates that the luminous flux per area per solid angle values received over the spatial light modulator are largely similar;

DETAILED DESCRIPTION OF THE PREFERRED EMBODIMENT

Figure 1:
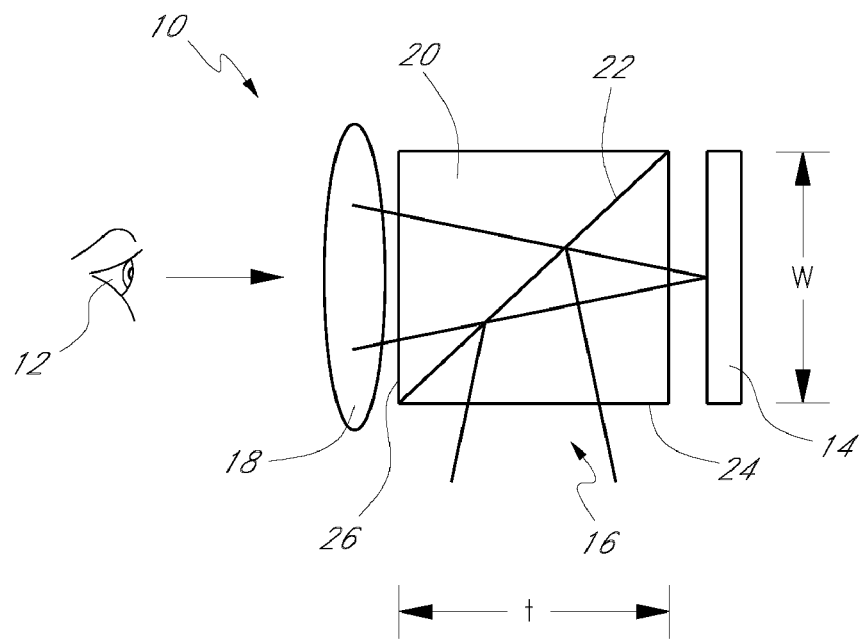
FIG. 1 is a schematic representation of a display apparatus comprising a beamsplitter disposed in front of a spatial light modulator that directs a beam of light to the spatial light modulator to provide illumination thereof.

To present graphics or other visual information to a viewer, images and/or symbols, e.g., text or numbers, can be projected onto a screen or directed into the viewer's eye. FIG. 1 schematically illustrates a display 10 disposed in front of a viewer 12 (represented by an eye). In a preferred embodiment, this display 10 includes a spatial light modulator 14 that is illuminated with light 16 and imaged with imaging or projection optics 18. The spatial light modulator 14 may comprise, for example, a reflective polarization modulator such as a reflective liquid crystal display. This liquid crystal spatial light modulator preferably comprises an array of liquid crystal cells each which can be individually activated by signals, e.g., analog or digital, to produce a high resolution pattern including characters and/or images. More generally, the spatial light modulator may comprise an array of modulators or pixels that can be selectively adjusted to modulate light. The projection optics 18 may, for example, project the image to infinity (or a relatively large distance) or may form a virtual image that may be imaged onto the retina by the eye. Such a display may be employed, for example, in a television or head mounted display.

To illuminate the LCD spatial light modulator 14, a beamsplitter 20 is disposed in front of the LCD. The beamsplitter 20 has a reflective surface 22 that reflects the beam of light 16 introduced through a side 24 of the beamsplitter toward the LCD 14. Reflections from the LCD 14 pass through the reflective surface 22 on another pass and exit a front face 26 of the beamsplitter 20. The imaging optics 18 receives the light from the beamsplitter 20 and preferably images the pattern produced by the LCD display 14 onto the retina of the viewer's eye 12.

Preferably, the light entering the side 24 of the beamsplitter 20 is polarized light and the beamsplitter comprises a polarization beamsplitter. In such a case, the reflective surface 22 may preferably comprise a polarization dependent reflective surface that reflects light having one polarization and transmits light having another polarization state. The cells within the LCD spatial light modulator 14 also may for example selectively rotate the polarization of light incident on the cell. Thus, the state of the LCD cell can determine whether the light incident on that cell is transmitted through the reflective surface 22 on the second pass through the beamsplitter 20 based on whether the polarization is rotated by the cell. Other types of liquid crystal spatial light modulators may also be used as well.

Figure 2:
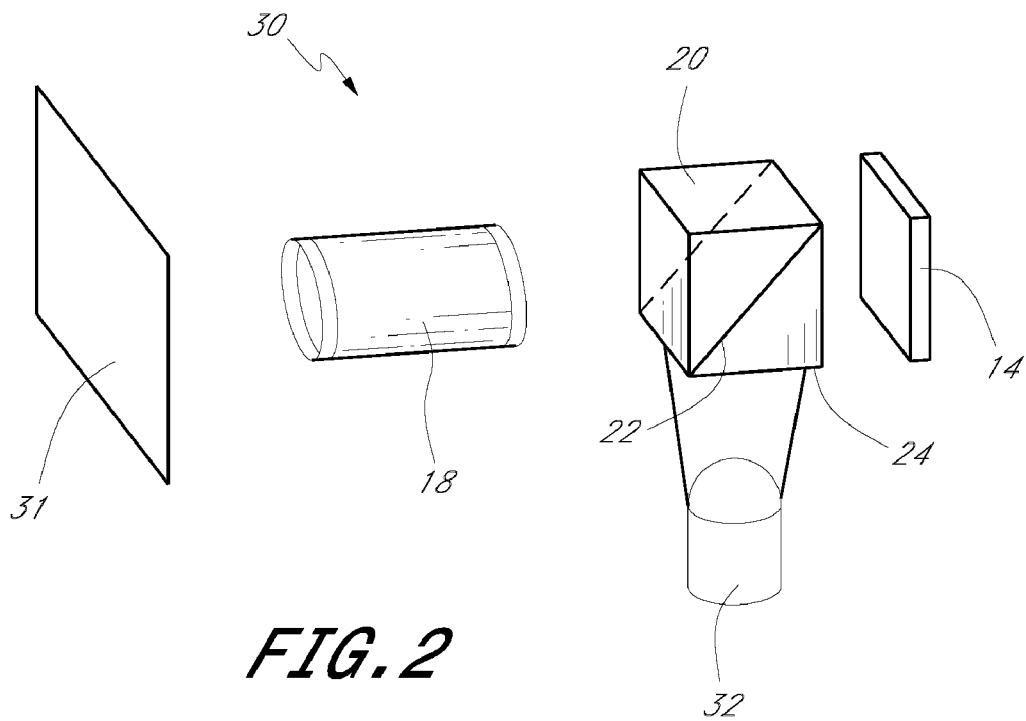
FIG. 2 is a perspective view of a projection system comprising an optical apparatus similar to that depicted schematically in FIG. 1.

A perspective view of similar type of optical apparatus 30 is shown in FIG. 2. This device 30 may also include a projection lens 18 and may be employed as a projector to project a real image of the spatial light modulator 14 onto a screen 31. The beamsplitter 20 may comprise a prism such as a polarization beamsplitting prism, and in certain preferred embodiments, the beamsplitter may comprise a multi-layer coated beamsplitting prism comprising a stack of coating layers that provide polarization discrimination as is well known in the art. MacNeille-type polarizing cubes comprising a cube such as shown in FIG. 1 with a multilayer coating on a surface tilted at an angle of about 45° may be used; however, the field-of-view may be limited by dependence of the efficiency of the multilayer on the angle of incidence. If instead of the conventional multilayer coating employed on MacNeille beamsplitting cubes, the coating layers comprise birefringent layers that separate polarization based on the material axis rather than the angle of incidence, effective performance for beams faster than f/1 can be obtained. Such birefringent multilayers may be available from 3M, St. Paul, Minn.

Alternative beamsplitters 20 may be employed as well. Examples of some alternative polarization beamsplitters that separate light into two polarization states include crystal polarizers and plate polarizers. Advantageously, crystal polarizers have a relatively high extinction ratio, however, crystal polarizers tend to be heavy, relatively expensive, and work substantially better for relatively slow beams with larger f-numbers (f/#). Image quality is predominantly better for one polarization compared to another. Plate polarizers can comprise multi-layer coatings that are applied on only one side of a plate instead of in a cube. Plate polarizers are light and relatively inexpensive. However, image quality is also primarily higher for one polarization state, and with plate polarizers, the image quality is degraded substantially for speeds approaching f/1. Other types of polarizers such as photonic crystal polarizers, and wire-grid polarizers may be employed as well. Photonic crystal polarizers comprise a stack of layers that forms a photonic crystal that can be used to discriminate polarizations. Photonic crystal polarizers are available from Photonic Lattice Inc., Japan. Photonic crystal polarizers have theoretically excellent fields-of-view and wavelength acceptance; however, photonic crystal polarizers are fabricated using expensive lithographic processes. Wire grid polarizers comprise a plurality of wires aligned substantially parallel across a planar surface. These wire grids may also discriminate polarization. Wire grid polarizers may be available, e.g., from NanoOpto Corporation, Summerset, N.J., as well as Moxtek, Inc., Orem, Utah. Wire grid polarizers have good extinction in transmission; however, these polarizers are somewhat leaky in reflection. Aluminum used to form the wire grid also tends to have higher absorption than dielectric materials. Nevertheless, wire grid polarizers are preferred for various embodiments of the invention.

As discussed above, multi-layer coatings comprising a plurality of birefringent layers in cube polarizers work well for beams faster than f/1 and provide high image quality for both polarizations. Wire grid polarizers and photonic crystal polarizers, may replace the birefringent multilayers in the beamsplitter cube in preferred embodiments. The cube configuration, however, depending on the size, can be heavy. The beamsplitter 20 shown in FIGS. 1 and 2 comprises a beamsplitter cube having sides of approximately equal length. Similarly, the beamsplitter 20 has a size (e.g., thickness, t) greater than the width, w, of the spatial light modulator 14.

As shown in FIG. 2, a light source 32 is disposed with respect to the polarization beamsplitter 20 to introduce light into the beamsplitter to illuminate the spatial light modulator 14. The beamsplitter 20 includes one port for receiving light. The light is introduced into the beamsplitter 20 through the side 24. The reflective surface 22 is sloped to face both this side 24 and the LCD display 14 such that light input through the side 24 of the beamsplitter is reflected toward the LCD display. This reflective surface 22 may comprise a planar surface tilted at an angle of between about 40 and 50 degrees with respect to the side 24 of the beamsplitter but may be inclined at other angles outside this range as well. The illuminated LCD display can be imaged with the imaging optics 18. The imaging optics 18 may comprise a projection lens that is relatively large and heavy to accommodate a sufficiently large back focal distance and a sufficiently large aperture through the beamsplitter cube 20 to the spatial light modulator 14.

Figure 3:
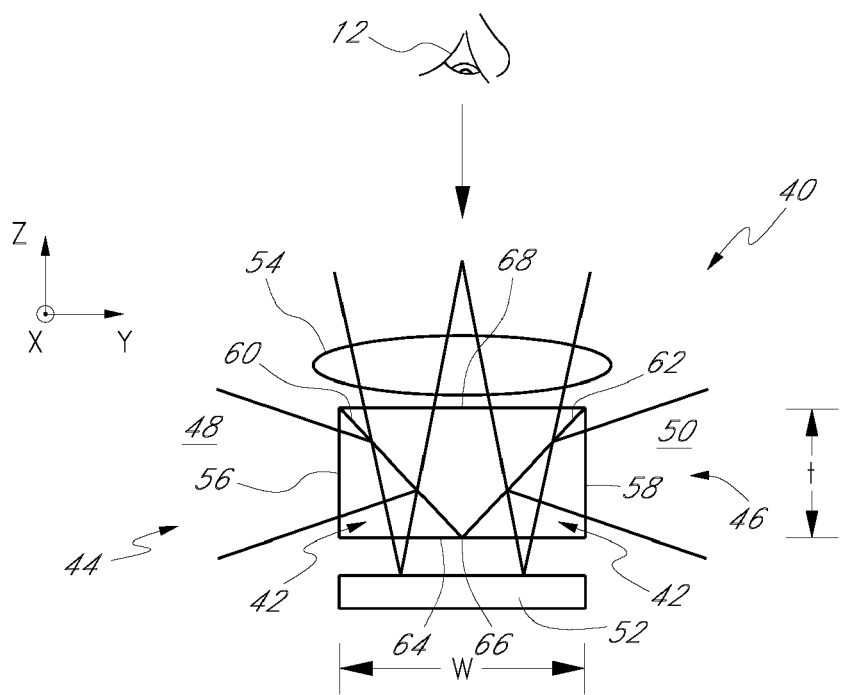
FIG. 3 is a schematic representation of a preferred display apparatus comprising a "V" prism for illuminating a spatial light modulator.

Beamsplitters with other dimensions or having other geometries and configurations may also be employed as well. A variety of novel beamsplitters and optical systems using beamsplitters are described herein. In one exemplary embodiment of the invention, for example, by including two or more ports, the thickness of the beamsplitter may be reduced. Such a design is illustrated in FIG. 3. FIG. 3 shows a display 40 comprising a beamsplitter device 42 having two ports 44, 46 for receiving two beams of light 48, 50. The display 40 further comprises a spatial light modulator 52 and imaging optics 54 for imaging the spatial light modulator. As discussed above, the spatial light modulator 52 may comprise a liquid crystal spatial light modulator comprising an array of liquid crystal cells. These liquid crystal cells may be selectively controlled accordingly to data or video signals received by the spatial light modulator.

The beamsplitter device 42 may comprise a prism element comprising glass or plastic or other materials substantially transparent to the incident light 48, 50. The prism element 42 shown has two input faces 56, 58 for receiving the two beams of light 48, 50, respectively. In the embodiment illustrated in FIG. 3, these two input surfaces 56, 58, are parallel and counter-opposing, disposed on opposite sides of the prism. Similarly, the two input ports 44, 46 are oppositely directed, the optical path of the corresponding light beam being directed along substantially opposite directions. Although the input ports 44, 46 are oriented 180° with respect to each other, other configurations where, for example, the ports are directed at different angles such as 30°, 40°, 60°, 72°, 120° etc., and angles between and outside these ranges are possible. The two input faces 56, 58 are preferably substantially optically transmissive to the light 48, 50 such that the light can be propagated through the prism 42.

The prism element 42 also has two reflecting surfaces 60, 62 that reflect light received by the two ports 44, 46 toward a first (intermediate) output face 64 and onto the spatial light modulator 52. The two reflecting surfaces 60, 62 are sloped with respect to the input and output faces 56, 58, 64 such that light input through the input faces is reflected to the output face. In one preferred example, the reflecting surfaces 60, 62 are inclined at an angle of between about 40 to 50 degrees with respect to the input faces 56, 58 and at an angle of between about 40 to 50 degrees with respect to the first output face 64. The angle of inclination or declination, however, should not be limited to these angles.

The two reflective surfaces 60, 62 are also oppositely inclined. In the example shown in FIG. 3, the reflective surfaces 60, 62 slope from a central region of the output face 64 to the respective opposite input faces 56, 58. The reflecting surfaces 60, 62 meet along a line or edge 66 in the central region of the output face 64, and may be coincident with the output face 64. This configuration, however, should not be construed as limiting as other designs are possible. The prism 42 may be referred to herein as a "V" prism in reference to the "V" shape formed by the reflective surfaces 60, 62 that are oppositely inclined or sloping and that preferably converge toward the vertex (or apex) 66 located in the central region of the output face 64.

Preferably, each of the reflective surfaces 60, 62 comprises a polarization-dependent reflective surface that reflects light having one polarization and transmits light having another polarization state. For example, the reflective surfaces 60, 62 may each reflect the s-polarization state and transmit the p-polarization state or vice versa. Alternative configurations are possible and the reflective surfaces 60, 62 may be designed to reflect and transmit other states as well. In various preferred embodiments, the reflective surfaces 60, 62 are formed using multi-layered birefringent coatings or wire grids as described above.

The "V" prism 42 can therefore be said to be a polarization beamsplitter, as this prism device splits beams having different polarizations. Preferably, however, light entering the sides of the beamsplitter 42 is polarized light. In such a case, the reflective surfaces 60, 62 are preferably selected to reflect the light beams 48, 50 introduced through the respective sides 56, 58 of the beamsplitter 42. The input beams 48, 50 propagating along paths oppositely directed and parallel to the Y-axis (as shown in FIG. 3) are redirected along similarly directed optical paths parallel to the Z-axis towards the LCD 52. The spatial light modulator 52 is also preferably a reflective device. Accordingly, light from both input beams 48, 50 traveling toward the liquid crystal array 52 is preferably reflected in an opposite direction along a path parallel to the Z-axis back to the reflective surfaces 60, 62.

The cells within the LCD spatial light modulator 52 also preferably selectively rotate the polarization of light incident on the cell. Thus, reflections from the LCD 52 will pass through the reflective surfaces 60, 62 on another pass and exit a front face 68 of the beamsplitter 42. In this manner, the state of the LCD cell can determine whether the light incident on that cell is transmitted through the reflective surface 60, 62 on the second pass through the beamsplitter 42 based on whether the polarization is rotated by the respective cell. High resolution patterns such as text or images can thereby be produced by individually activating the liquid crystal cells using, for example, electrical signals. Other types of spatial light modulators may be used. These spatial light modulators may be controlled by other types of signals. These spatial light modulators may or may not comprise liquid crystal, may or may not be polarization dependent, and may or may not be reflective. For example, transmissive spatial light modulators may be employed in alternative embodiments. The type of spatial light modulator, however, should not be restricted to those recited herein.

The imaging optics 54 images the spatial light modulator 52. The imaging optics 54 enables patterns created by the modulated liquid crystal array 52 to be formed on the retina of the viewer or in other embodiments, for example, on a screen or elsewhere.

The addition of an input port 46 and a corresponding reflective surface 62 permits the beamsplitting element 42 to have a smaller thickness, t. As shown in FIGS. 1 and 3, the respective prism elements 20, 42 have widths, w. The ratio of the thickness to the width (t/w) is less for the "V" prism 42 as a smaller thickness is required to accommodate a given prism width, w. Similarly, a smaller thickness, t, is needed to illuminate a spatial light modulator 14, 52 having a given width, w.

The width of the spatial light modulator 14, 52 may be, for example, ½ to 1 inch (13 to 25 millimeters) on a diagonal. The thickness of the prism 42 may be between about ¼ to ½ inch (6 to 14 millimeters). Accordingly, the input faces 56, 58 and reflective surfaces 60, 62, may be between about ⅓×½ inch (9×12 millimeters) to about ⅔×1 inch (18×24 millimeters), respectively. A beam 1 inch (25 millimeters) diagonal may be used to illuminate the spatial light modulator 14, 52. Other dimensions outside these ranges may be used and should not be limited to those specifically recited herein. Also, although the shape of the spatial light modulator 42 as well as the shape of the input ports 56, 58 and the reflective surfaces 60, 62 may be square or rectangular in many embodiments, other shapes are possible.

As discussed above, adding additional ports 46 such as provided by the "V" prism 42 may advantageously yield a smaller, lighter, more compact illumination system. For example, the thickness and mass of the "V" prism polarization beamsplitting element 42 may be about ½ that of a polarization beamsplitting cube 20 for illuminating a same size area of the spatial light modulator 14, 52 specified by the width, w. Similarly, the back focal distance of the projection lens or imaging optics 54 may be shortened. As a result, the imaging optics 54 used in combination with the "V"-prism can be reduced in size (e.g., in diameter) in comparison with the imaging optics 18 used in combination with a prism cube 20 in a display having a similar f-number or numerical aperture. Reduced size, lower cost, and possibly improved performance of the imaging optics 54 may thus be achieved.

In one preferred embodiment, the "V"-prism 42 comprises a square prism element comprising three smaller triangular prisms having a triangular shape when viewed from the side as shown in FIG. 3. A method of fabricating such a "V" prism 42 is discussed below with reference to FIGS. 27A-27G. The prisms 42 may have polarization beamsplitting coatings such as multiple birefringent layers to create selectively reflective surfaces 60, 62 that separate polarization states. Such a "V"-prism 42 preferably performs well for f-numbers down to about f/1 and lower. In other embodiments, the polarization beamsplitting surfaces 60, 62 may comprise wire grid polarizers or photonic crystal polarization layers, for example.

Figure 4:
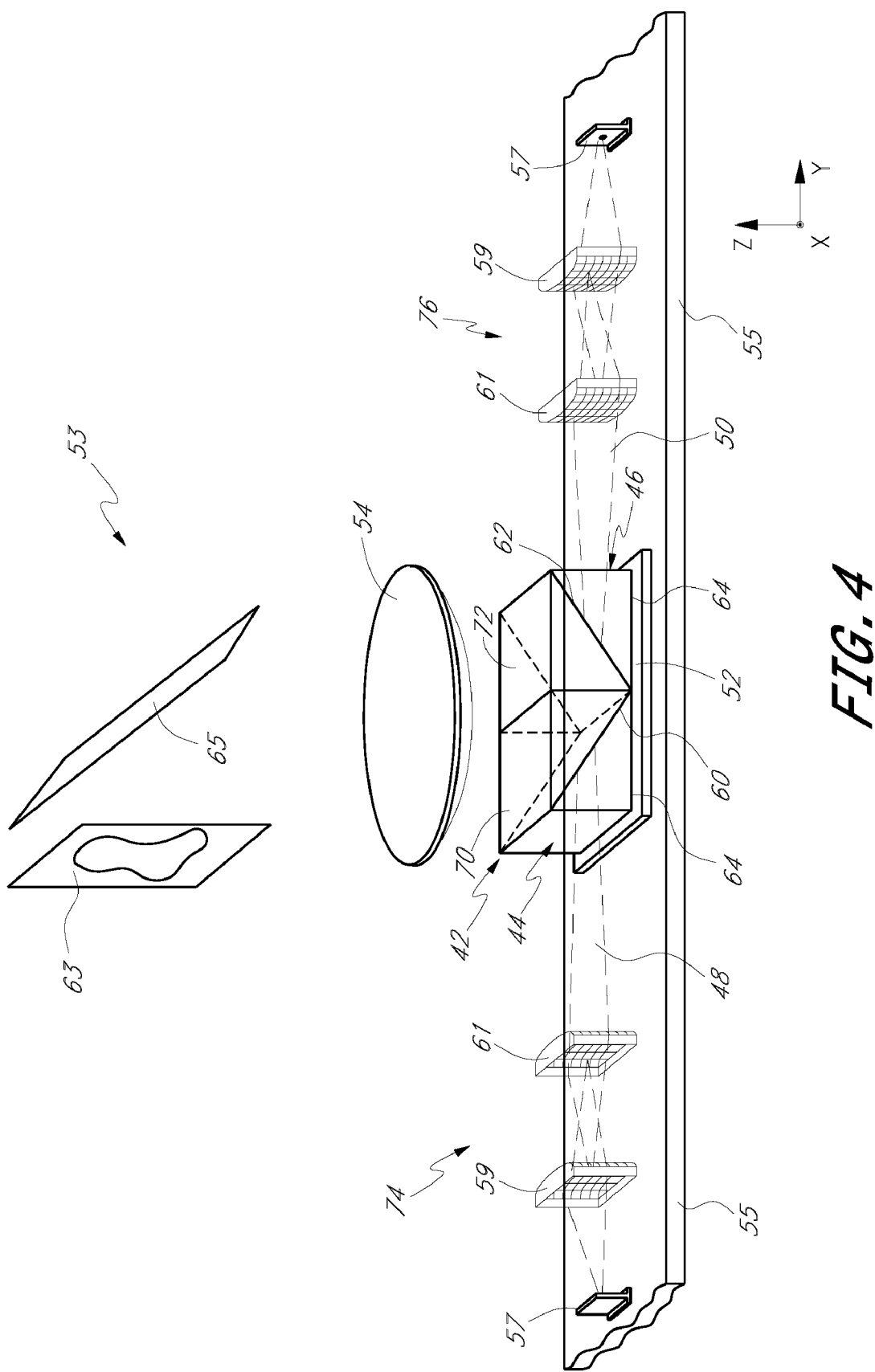
FIG. 4 is a perspective view of an optical system for a rear projection TV comprising a "V" prism such as shown in FIG. 3 disposed between a pair of light sources for illuminating a spatial light modulator.

FIG. 4, shows an illumination engine 53 for a rear projection television (which may be, e.g., an HDTV) comprising a "V" prism 42. The "V" prism 42 comprises a pair of polarization beamsplitting cubes 70, 72 arranged such that the reflective surfaces 60, 62 are oppositely inclined and thus face different directions. Accordingly, as described above, light input from the two oppositely directed input ports 44, 46 can be reflected through the output face 64 on each of the beamsplitters 70, 72 for example, to a liquid crystal spatial light modulator 52. FIG. 4 depicts two sources of illumination 74, 76 coupling light in the two oppositely facing ports 44, 46 located on opposite sides of the prism element 42. This light 48, 50 following oppositely directed paths parallel to the Y-axis, is reflected from the sloping reflective surfaces 60, 62 along a path parallel to the Z-axis toward the spatial light modulator 52. The two polarization beamsplitters 70, 72 in the device 42 may be secured in place using optical contact, cement, adhesive, clamps, fasteners or by employing other methods to position the two cubes appropriately. Preferably, these two polarization cubes 70, 72 are adjoining such that the reflective surfaces 60, 62 are in sufficiently close proximity to illuminate the spatial light modulator 52 without creating a dark region between the two polarization cubes. The "V"-prism 42 may be formed in other ways as well.

The illumination engine 53 shown in FIG. 4 further includes a support assembly 55 for supporting the "V" prism and the sources of illumination 74, 76. Although this support assembly 55 is shown as substantially planar, the support assembly need not comprise a board or planar substrate. Other approaches for supporting the various components may be used and the specific components that are affixed or mounted to the support structure may vary. The support structure 55 may for example comprise a frame for holding and aligning the optics. Walls or a base of the rear projection TV may be employed as the support structure 55. The examples describe herein, however, should not be construed as limiting the type of support used to support the respective system.

Each of these illumination sources 74, 76 comprise an LED array 57 and first and second fly's eye lenses 59, 61 mounted on the support assembly 55. The fly's eye lenses 59, 61 each comprise a plurality of lenslets. In various preferred embodiments, the first and second fly's eye lenses 59, 61 are disposed along an optical axis from the LED array 57 to the spatial light modulator 52 through the reflective surfaces 60, 62 with suitable longitudinal separation. For example, the LED array 57 is imaged by the first fly's eye lens 59 onto the second fly's eye lens 61, and the first fly's eye lens is imaged by the second fly's eye lens onto the spatial light modulator 52. In such embodiments, the first fly's eye lens 59 may form an image of the LED array 57 in each of the lenslets of the second fly's eye lens 61. The second fly's eye lens 61 forms overlapping images of the lenslets in the first fly's eye lens 59 onto the spatial light modulator 52. In various preferred embodiments, the first fly's eye 59 comprises a plurality of elongated or rectangular lenselets that are matched to the portion of the spatial light modulator 52 to be illuminated by the LED array 57.

The illumination engine 53 further comprises imaging or projection optics 54 for example for projecting an image of the LCD 52 onto a screen or display or directly into an eye. The illumination engine 53 depicted in FIG. 4 is shown as part of a rear projection TV having a flat projection screen 63 and a tilted reflector 65 for forming the image on the screen for the viewer to see. One or more additional reflectors may be employed to reorient the image or to accommodate illumination engines 53 having output in different directions. As the "V" prism 42 may have reduced thickness in comparison to a polarization cube for illuminating a similarly dimensioned region of the spatial light modulator 52, the imaging or projection optics 54 in the illumination engine 53 may be scaled down in size in comparison with a system having an identical f-number or numerical aperture.

Figure 5:
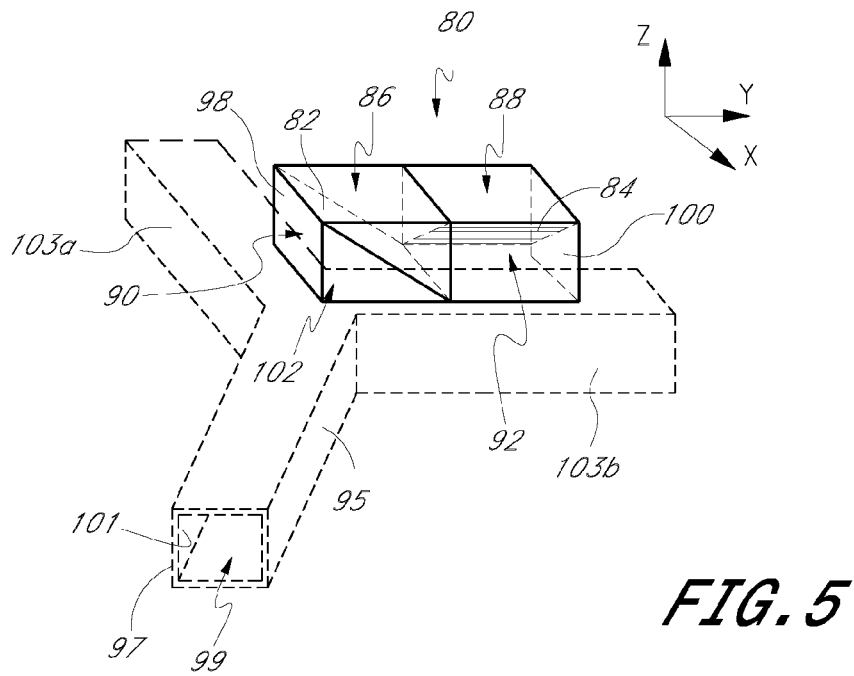
FIG. 5 is a perspective view of a prism device having a pair of reflective surfaces for providing illumination of a display, wherein light is coupled into the prism via light propagating conveyances.

Other configurations and designs for providing illumination are possible. FIG. 5, for example, depicts a prism device 80 comprising a pair of reflective surfaces 82, 84 oriented differently than the reflective surfaces in the "V" prism 42. The prism element 80 shown comprises a pair of polarization beamsplitting cubes 86, 88 with the reflective surfaces 82, 84 formed using wire grid polarizers, although MacNeille-type prisms could be employed in other embodiments. The wire grid polarizers comprise an array of elongated strips or wires arranged substantially parallel. In various preferred embodiments, these elongated strips comprise metal such as aluminum. The wire grid polarizers reflect one linear polarization and transmit another orthogonal linear polarization. Alternative embodiments may employ other types of polarizers such as polarizers formed from multiple birefringent layer coating as well as photonic crystal polarizers.

The prism element 80 has two ports 90, 92 on different sides of the prism element. Light piping 95 is shown in phantom in FIG. 5 as directing illumination from a light source (not shown) through two respective input faces 98, 100, one on each of the polarization beamsplitting cubes 86, 88. The light piping 95 may comprise sidewalls 97 that form conduits or conveyances with hollow channels 99 therein through which light propagates. Preferably, the inner portions 101 of the conduits are reflecting, and may be diffusely reflecting in certain preferred embodiments, such that light propagates through the inner channel of the light piping 95 from the light source to the input faces 98, 100 of the prism element 80. The light piping 95 shown in FIG. 5 branches into two arms 103a, 103b that continue toward the two input faces 98, 100. Preferably, the two arms 103a, 103b have suitable dimensions and reflectivity of the respective sidewalls 97 to provide substantially equal illumination at the two input faces 98, 100. In various preferred embodiments, the light piping 95 may be shaped (e.g., molded) to accommodate or conform to the other components or to fit into a particular space in a device, such as a helmet-mounted display or, more broadly, a head-mounted display. (As used herein helmet-mounted displays, which accompany a helmet, are one type of head-mounted display, which may or may not be mounted on a helmet.)

Each of the reflective surfaces 82, 84 in the prism device 80 is oriented at an angle with respect to the input faces 98, 100 and an output face 102. The angle with respect to the output face 102 may be, for example, between about 40 to 50 degrees or outside these ranges. The reflective surfaces 82, 84 in this prism element 80, however, face different directions on different sides of the prism element than the reflective surfaces 60, 62 in the "V" prisms 42. For example, one of the reflective surfaces 84 is oriented to receive light propagating along an optical path parallel to the X-axis and to reflect the light along an optical path parallel to the Z-axis. The other reflective surface 82 is oriented to receive light propagating along an optical path parallel to the Y-axis and to reflect the light along an optical path parallel to the Z-axis. Accordingly, the two reflective surfaces 82, 84 face different directions, here 90° apart. Ports directed along other directions also may be employed.

A range of other configurations are possible wherein a pair of reflective surfaces are provided. Preferably, these reflective surfaces are inclined to reflect light input into the prism element 80 from one of the side surfaces along a common direction. Different input sides can be used as the input surfaces in different embodiments. For example, the side surfaces can be oppositely facing or can be oriented 90 degrees with respect to each other or at different angles with respect to each other. The reflective surfaces can be planar and square or rectangular as shown in FIG. 5 or may have different shapes. The reflective surfaces can be tilted substantially the same amount or can be inclined or declined or be angled different amounts. The reflective surfaces can also be inclined in different directions. Still other configurations are considered possible and should not be limited to those specifically described herein as variations can be suitably employed consistent with the teaching disclosed herein.

Figure 6:
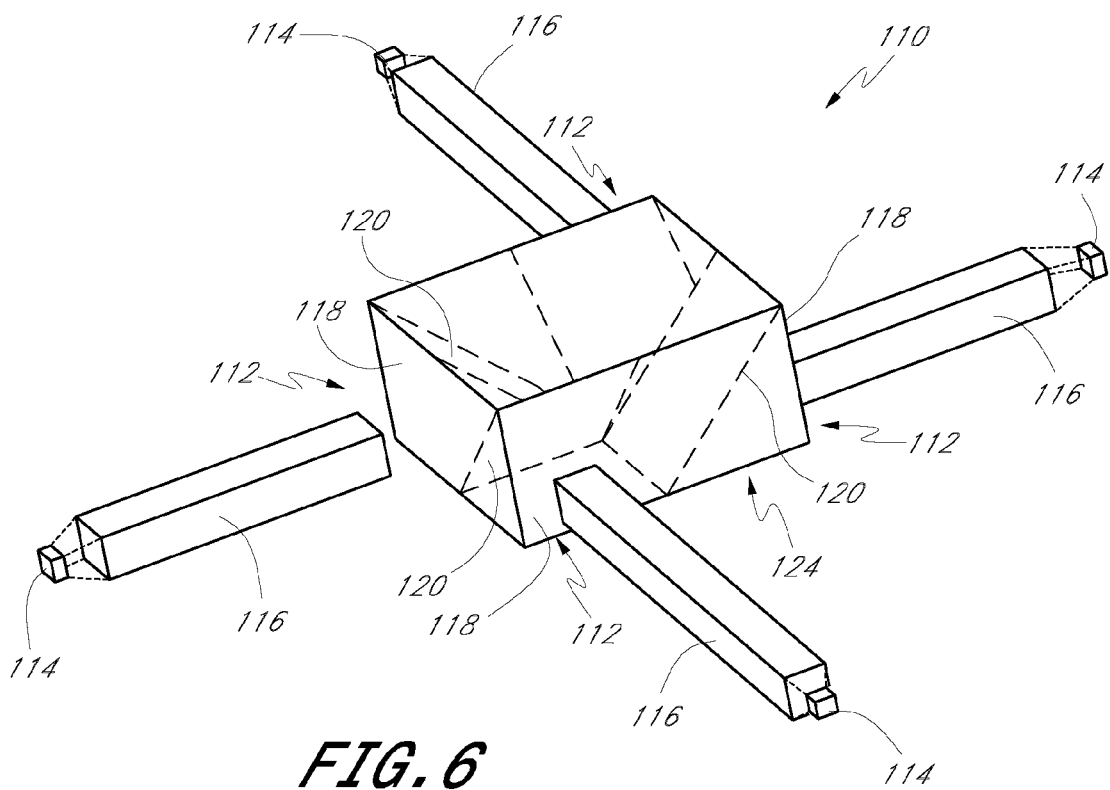
FIG. 6 is a perspective view of a prism element having four input ports for receiving light from four integrating rods and four reflective surfaces for reflecting the light input through the four input ports.

FIG. 6 shows a square prism element 110 with four input ports 112 on four separate sides of the square prism. Four light sources 114 coupled to rectangular integrating rods 116 are also depicted. The rectangular integrating rods 116 may comprise hollow conduits with inner sidewalls that are reflecting, possibly diffusely reflecting. In alternative embodiments, the rectangular integrating rods 116 are not hollow but instead comprise material such as glass, crystal, polymer, that is substantially optically transmissive and that is shaped to provide reflecting sidewalls. Light propagates through this material or through the hollow conduit reflecting multiple times from the sidewalls of the integrating rod 116. The multiple reflections preferably provide mixing that homogenizes the output, preferably removing bright spots or other non-uniformities. In some embodiments, the integration rods 116 have a square or rectangular cross-section orthogonal to respective optical axes extending lengthwise therethrough. Such cross-sections are desirable for illuminating a square or rectangular region on the spatial light modulator. Other shapes are also possible. In various preferred embodiments, the cross-section is elongated in one direction, as is a rectangle. Also, although rectilinear shaped integrating rods 116 are shown, curvilinear structures may be employed as well. Lightpipes that follow a curve path including, for example, fiber bundles, large core fibers, and other substantially flexible lines that may be bent may be employed. Alternatively, rigid but curved lightpipes may be employed as well in alternative embodiments.

The four input ports 112 include input surfaces 118 each forming an optical path to one of four respective reflecting surfaces 120. The four ports 112 and input surfaces 118 face four different directions outward from the four sides of the square prism 110. The reflective surfaces 120 also face four different directions. These reflective surfaces 120 are tilted toward an output face 124, which is depicted in FIG. 6 as under or behind the prism element 110. Accordingly, light received by the four input surfaces 118 is deflected downward in FIG. 6 toward the output face 124 where a reflective LCD module (not shown) may be located. Preferably, these reflective surfaces 120 are polarization splitting surfaces, and the light input is polarized such that the light reflects toward the output face 124. The prism element 110 may be formed from four adjoining beamsplitting cubes appropriately oriented.

Four polarizers may be inserted between the light sources 114 or the integrating rods 116, and the input faces 118. These polarizers may be referred to herein as pre-polarizers. The polarizers preferably ensure that substantially all the light reaching the input faces 118 has suitable polarization such that this light is reflected by the polarization splitting reflective surfaces 120.

Figure 7:
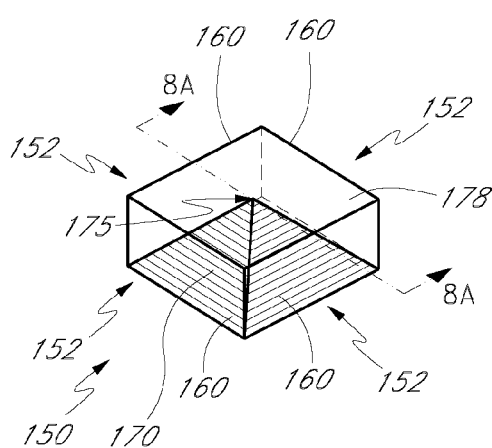
FIG. 7 is a perspective view of another prism structure having four input ports for receiving light and four reflecting faces comprising wire grid polarizers for reflecting polarized light input into the input ports.
Figure 8A:
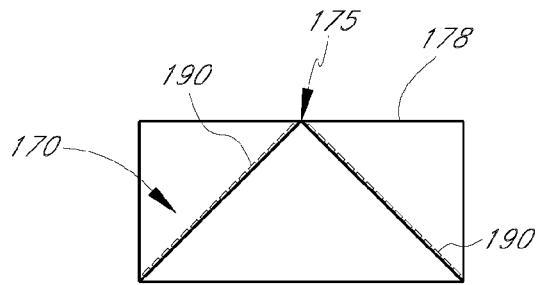
FIG. 8A is a cross-sectional view of the prism structure shown in FIG. 7 along the line 8A-8A.
Figure 8B:
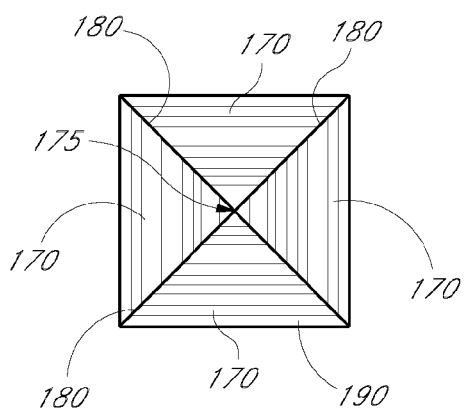
FIG. 8B is a top view of the prism structure depicted in FIGS. 7 and 8A showing the four triangular faces and wire grid polarizers for reflecting polarized light input into the four ports of the prism structure.

Another embodiment of a square prism element 150 having four input ports 152 is illustrated in FIG. 7. This prism element 150 includes four faces 160 where light can be input and four triangular reflective surfaces 170 that are similarly inclined toward an apex region 175 such that light input through the input face 160 is reflected upward and out an output surface 178 as shown in FIGS. 7, 8A, and 8B. A spatial light modulator (not shown) such as a reflective liquid crystal array device or other reflective modulator assembly may be located adjacent the output surface 178 to reflect light back into the prism 150 via the output face 178. A side sectional view as well as a top view are depicted in FIGS. 8A and 8B. The adjacent triangular reflective surfaces 170 are preferably adjoined to each other along edges 180 that are inclined toward the apex region 175. In the orientation shown in FIGS. 7, 8A, and 8B, the four reflective surfaces 170 appear to form a pyramid-shaped surface. The four input ports 152 face four different directions outward from the square prism 150. The four triangular reflective surfaces 170 also face four different directions. Preferably, the four reflective surfaces 170 comprise polarization splitting surfaces that reflect one polarization state and transmit another polarization state. These four surfaces may reflect similar or different polarizations. Preferably, polarized light is coupled into the input ports 152 such that the light is reflected from the polarization splitting reflective surfaces 170. These polarization splitting interfaces 170 may be formed using multilayered coatings, grid polarizers, and photonic crystals, as described above as well as other types of polarizers both known and yet to be devised. Grid polarizers 190 comprising arrays of parallel metal strips are shown in FIGS. 7, 8A, and 8B. The size of these grid polarizers 190 and the metal strips forming the polarizers are exaggerated in the schematic drawings presented.

Figure 9A:
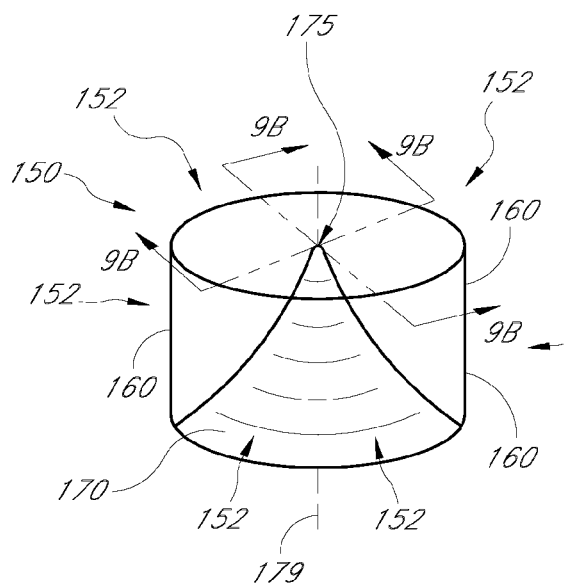
FIGS. 9A and 9C are perspective views of other prism structures having multiple input ports for receiving light and a reflecting surface for reflecting polarized light input into the input ports.
Figure 9B:
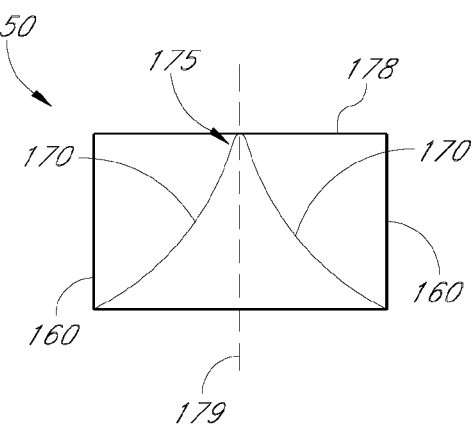
FIGS. 9B and 9D are a cross-sectional views of the prism structures shown in FIGS. 9A and 9D along the lines 9B-9B, and 9D-9D respectively.
Figure 9C:
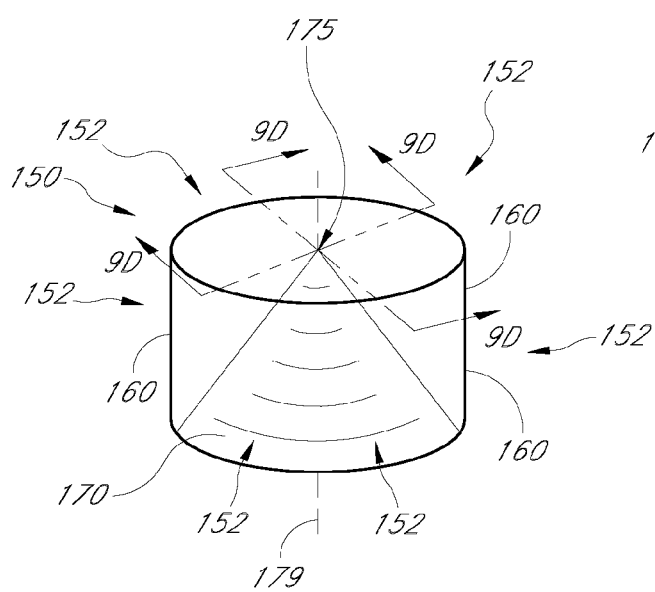
Figure 9D:
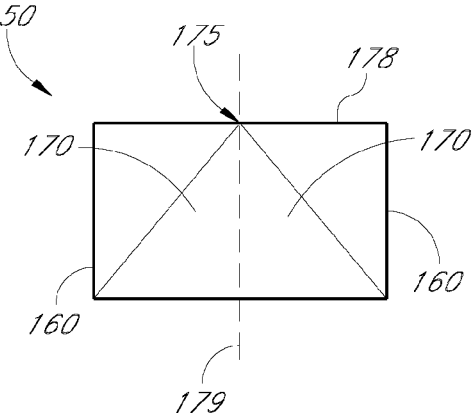

Another embodiment of a prism element 150 having multiple input ports 152 is illustrated in FIG. 9A. This prism element 150 comprises a circularly symmetric prism. The prism element 150 includes input faces 160 where light can be input and reflective surfaces 170 that are similarly inclined toward an apex region 175 such that light input through the input faces 160 is reflected upward and out an output surface 178 as shown in FIGS. 9A and 9B. A spatial light modulator (not shown) such as a reflective liquid crystal modulator assembly may be located adjacent the output surface 178 to reflect light back into the prism 150 via the output face 178. A side sectional view is depicted in FIG. 9B. The reflective surfaces 170 are preferably inclined toward the apex region 175. In the orientation shown in FIGS. 9A-9B, the reflective surfaces 170 appear to form a conical-shaped surface. The surface 170 is circularly symmetric about an axis 179 through the apex 175. The input ports 152 face different directions outward from the circular prism 150. The reflective surfaces 170 also face different directions. As shown in the cross-section in FIG. 9B, the surface is curved along a direction parallel to the axis 179. The curvature, slope, concavity may vary. Other variations in the curvature may be included. Other types of surfaces of revolution providing inclined reflective surfaces may also be employed. FIGS. 9C and 9D depict a prism 150 having a reflective surface 170 shaped like a cone. Instead of having a curvature that varies along the axis of rotation, the slope is substantially constant. The linear incline of this reflective surface 170 is depicted in the cross-section shown in FIG. 9D. The surfaces shown in FIGS. 9A and 9C have shapes conforming to the shape of surfaces of revolution about the axis 179. Polarization beamsplitting surfaces having shapes that conform to portions of such surfaces of revolution are also possible. Also, the curve that is rotated to form the surface of revolution for the corresponding shape may be irregular, yielding differently shaped surfaces. Other shapes are possible for the reflective surfaces 170.

Preferably, the reflective surfaces 170 comprise polarization splitting surfaces that reflect one polarization state and transmit another polarization state. Preferably, polarized light is coupled into the input ports 152 such that the light is reflected from the polarization splitting reflective surfaces 170. These polarization splitting interfaces 170 may be formed using multilayered coatings, grid polarizers, and photonic crystals, as described above as well as other types of polarizers both known and yet to be devised.

The prism elements preferably comprise glass or other material substantially transmissive to the light input into the input ports. Examples of optically transmissive materials that may be employed include BK7 and SFL57 glass. Other materials may be employed as well and the prism should not be limited to those transmissive materials specifically recited herein. These prism elements need not be limited to square configurations. Other shapes and sizes such as for example rectangular, hexagonal, etc. can be employed. Other techniques for reflecting one polarization state and transmitting another polarization state can be used as well. These reflective surfaces, for example, may comprise polarization plates in various embodiments.

As discussed above, the resultant illumination device is thinner and thus provides for lighter, more compact designs. Lower cost and higher performance may also be achieved. Smaller projection optics with shorter back focal length may also be employed.

Figure 10:
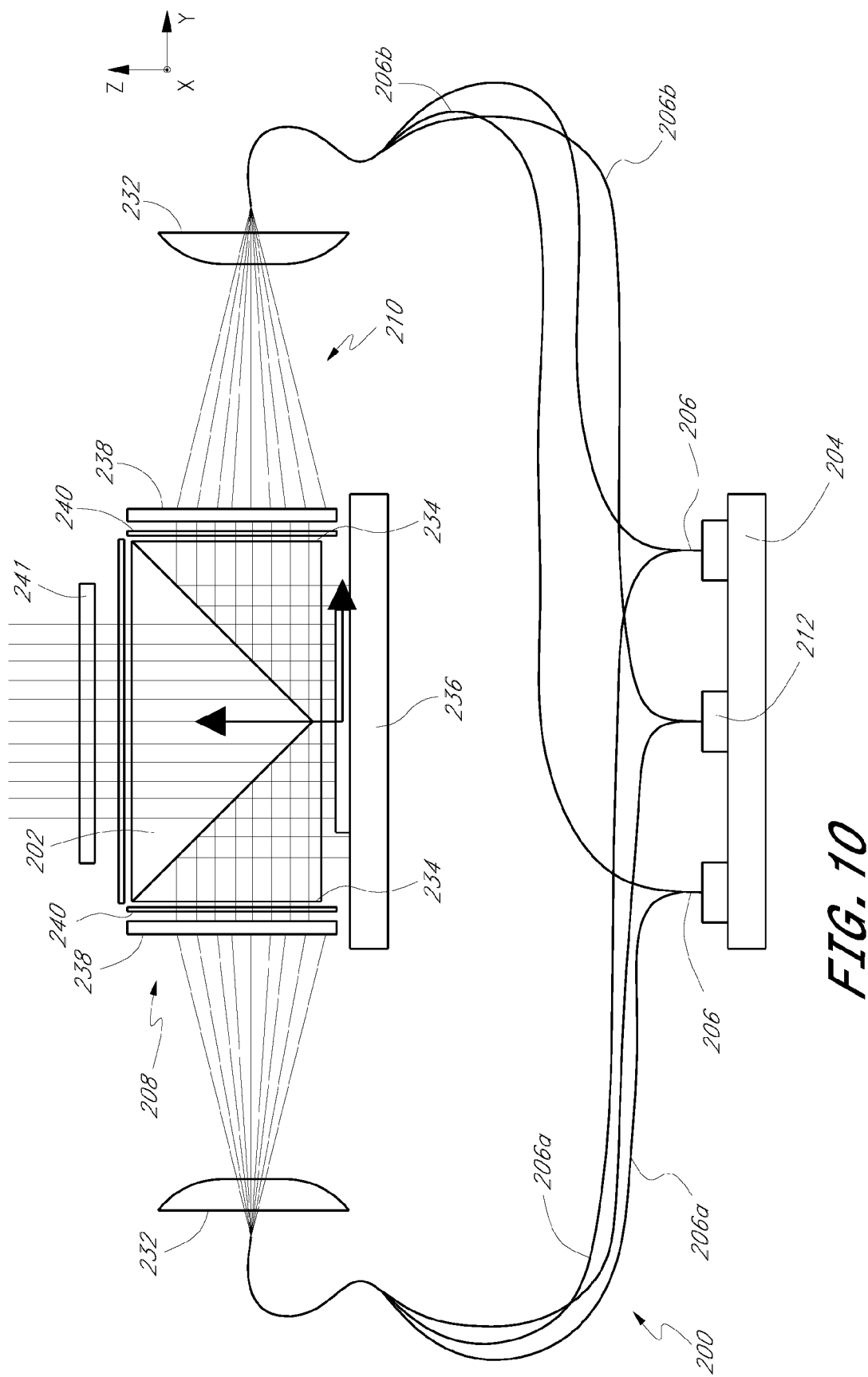
FIG. 10 is a schematic representation of an illuminating system comprising a "V" prism further comprising a plurality of light sources, as well as beamshaping optics and a diffuser for each of two input ports.

An optical apparatus 200 is depicted in FIG. 10 comprising a "V" prism 202 that is optically coupled to an array of light emitting diodes (LEDs) 204 via optical fiber lines 206 to first and second input ports 208, 210. Such an optical apparatus 200 may be included in a head-mounted display such as a helmet-mounted display and may be enclosed in a housing and supported on a support structure (both not shown). The fiber lines 206 are considered to be a particular type of light pipe which include incoherent fiber bundles, coherent fiber bundles, large core optical fibers, hollow conduits, or other types of light pipes. Optical fiber lines 206 advantageously offer flexibility, for example, for small compact devices and designs where packaging requirements restrict size and placement of components. The LED array 204 comprises three LEDs 212, which may comprise for example red, green, and blue LEDs. The three LEDs 212 are depicted coupled to the three optical fiber lines 206. Each of the three optical fiber lines 206 is split into a pair of separate first and second fiber lines 206a, 206b. The first fiber line 206a associated with each of the three LEDs is optically coupled to the first input port 208 of the "V" prism 202. The second fiber line 206b associated with each of the three LED 206 is optically coupled to the second input port 210 of the "V" prism 202. Light from each of the LEDs 212 can therefore be distributed to both ports 208, 210 of the "V" prism 202.

Figure 11:
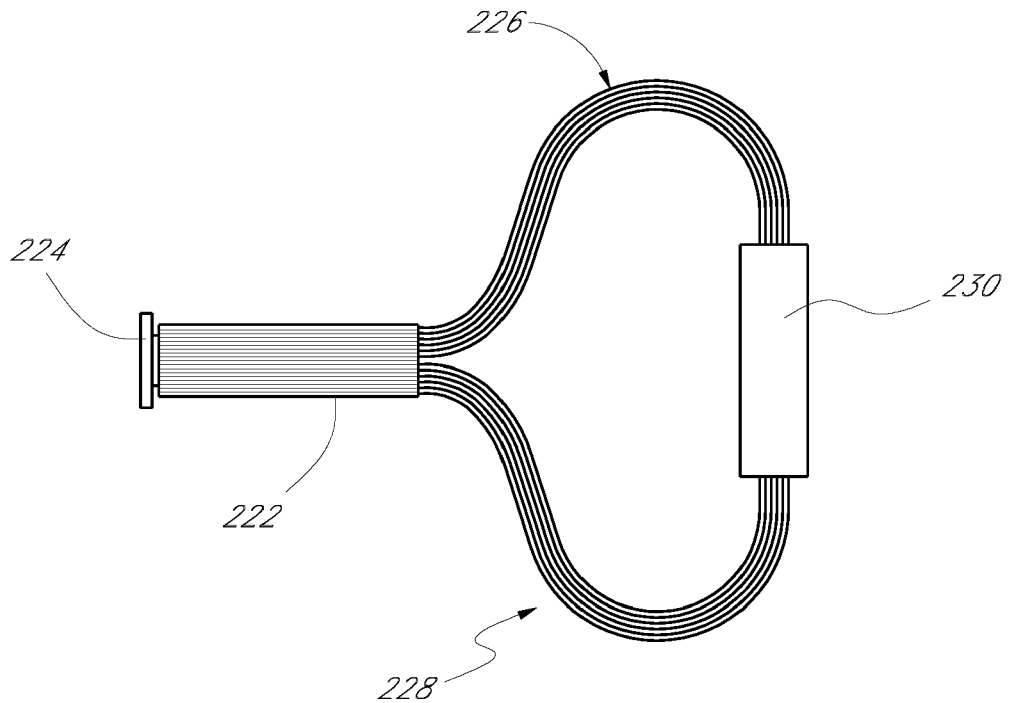
FIG. 11 is a schematic representation of an optical fiber bundle split to provide light to a pair of input ports of an illumination device such as the prism shown in FIG. 10.

In various preferred embodiments, the three optical fiber lines 206 comprise fiber bundles such as incoherent fiber bundles. FIG. 11 schematically illustrates one optical bundle 222 abutted to one light source 224 or light emitter so as to receive light from the light source. The optical fiber bundle 222 is split into two sections 226, 228 that follow paths to two opposite ends of an optical device 230 such as a "V" prism. These two sections 226, 228 correspond to the first and second fiber lines 206a, 206b depicted in FIG. 10.

The fiber bundles 222 preferably comprise a plurality of optical fibers. The fiber bundles 222 may be split, for example, by separating the optical fibers in the bundle into two groups, one group for the first fiber line 206a to the first input port 208 and one group for the second fiber line 206b to the second input port 210. In various preferred embodiments, a first random selection of fibers is used as the first fiber line 206a and a second random selection of fibers is used as the second fiber line 206b. To provide an approximately equal distribution of light into the separate first and second lines 206a, 206b directed to the first and second input ports 208, 210, the number of fibers is preferably substantially the same in both the separate first and second lines 206a, 206b. This distribution can be adjusted by removing fibers from either the first or second of the fiber lines 206a, 206b. Scaling, introducing correction with the spatial light modulator 236, can also be employed to accommodate for differences in the illumination directed onto different portions of the display.

In one preferred embodiment, light emitted by the red, green, and blue light sources 212 is introduced into the optical fiber bundle 222. As described above, this fiber bundle 222 is split such that the red light, the green light, and the blue light is input into opposite sides of the "V" prism 202. As is well known, light that appears white can be produced by the combination of red, green, and blue. In addition, a wide range of colors can be produced by varying the levels of the red, green, and blue hues. Although three light sources 212 are shown comprising red, green, and blue LEDs, more or fewer different colored light sources may be provided. For example, four colored emitters may be employed that include near blue and deep blue emitters for obtaining high color temperature. Still more colors can be employed. In some embodiments eight or more colors may be included. Light sources other than LEDs may also be employed, and color combinations other than red, green and blue may be used. Fluorescent and incandescent lamps (light bulbs) and laser diodes are examples of alternative types of light sources. Other types of sources are possible as well. Other color combinations include cyan, magenta, and yellow, although the specific colors employed should not be limited to those described herein. Various preferred embodiments include a plurality different color emitters that provide color temperatures between about 3000K and 8500K (white), although this range should not be construed as limiting.

Although the fiber bundle 222 is shown in FIG. 10 as being split into two portions 226, 228 corresponding to the two input ports 208, 210 of the "V" prism 202, the fiber bundle may be split further, for example, when the number of input ports is larger. In various embodiments, separate fiber bundles may be brought together at the source. Alternatively, a plurality of fiber bundles, one for each input port, may be positioned to couple light into the respective input port. These fiber bundles may be split into a plurality of ends that are optically coupled to the plurality of light emitters. Accordingly, light from the different color emitters is brought together and input into the two sides of the prism 202. Various other combinations are possible.

In certain other embodiments, more than one set of emitters may be employed, e.g., one set for each port 208, 210. Separate sources with separate fiber bundles can be employed for separate ports 208, 210. Utilizing a common light source such as a common red, green, or blue LED or LED array for the plurality of input ports, however, has the advantage of providing uniformity in optical characteristics such as for example in the wavelength of the light. Both sides of the "V" prism will thus preferably possess the same color.

A homogenizer such as an integrating rod, another form of light pipe, may also be employed to mix the red, green, and blue light. Light boxes such as cavities formed by diffusely reflecting sidewalls may be used as well for mixing and/or for conveying light. A fiber bundle can be optically connected to a light pipe such as a conduit or a single large (or smaller) core fiber. In other embodiments, the fiber bundle can be altogether replaced with optical fiber or flexible or rigid light pipes, or optical couplers, which may have large core or small core. Various combinations, e.g., of light sources, light piping, optical fiber and optical fiber bundles, and/or mixing components, etc., may also be utilized.

In certain preferred embodiments, individual red, blue, and green conveyances from respective red, blue, and green emitters may be coupled to a mixing component such as a mixing rod or light box or other light pipe where the different colors are combined. In other embodiments, light piping such as molded walls that form optical conduits may include a LED receiver cup for coupling from different color emitters, e.g., red, green, and blue LEDs, through the light piping to a mixing area such as a light box that may be output to a lens or other optical element. Alternative configurations and combinations are possible and the particular design should not be limited to those examples specifically recited herein.

To produce color images using the spatial light modulator, the different color emitters can be time division multiplexed with each color emitter separately activated for a given time thereby repetitively cycling through the different colors. The spatial light modulator is preferably synchronized with the cycling of the color emitters and can be driven to produce particular spatial patterns for each of the colors. At sufficiently high frequencies, the viewer will perceive a single composite colored image. In other embodiments more fully described below, the three colors can be separated out by color selective filters and directed to three separate modulators dedicated to each of the three colors. After passing through the respective spatial light modulators, the three colors can be combined to produce the composite color image. Exemplary devices for accomplishing color multiplexing include the "X-cube" or the "Philips prism". In other embodiments, more colors can be accommodated, e.g., with time division multiplexing and/or with additional spatial light modulators.

As shown in FIG. 10, beam shaping optics 232 are disposed in an optical path between the optical fiber lines 206a and the first input face 234 of the "V" prism. These beam shaping optics 232 may comprise, for example, a refractive lens element or a plurality of refractive lens elements. Alternatively, diffractive optical elements, mirrors or reflectors, graded index lenses, or other optical elements may also be employed. In various preferred embodiments, the beam shaping optics 232 has different optical power for different, e.g., orthogonal directions. The beam shaping optics, 232, may for example, be anamorphic. The beam shaping optics 232 preferably has different optical power for orthogonal meridianal planes that contain the optical axis through the beam shaping optics 232. For example, the beam shaping optics 232 may comprise an anamorphic lens or anamorphic optical surface. A cylindrical lens may be suitably employed in certain preferred embodiments. In one preferred embodiment, the beam shaping optics 232 comprises a lens having an aspheric surface on one side and a cylindrical surface on another side. The cylindrical surface has larger curvature in one plane through the optical axis and smaller or negligible curvature in another plane through the optical axis. Preferably, the beam shaping optics 232 is configured to produce a beam or illumination pattern that is asymmetric. The beam may, for example, be elliptical or otherwise elongated, possibly being substantially rectangular, so as to illuminate a rectangular field. The rays of light corresponding to the beam exiting the beam shaping optics 232 may be bent (e.g. refracted) more in one direction than in another orthogonal direction. Accordingly, the corresponding rays of light may diverge at wider angles, for example, in the X-Y plane than in the Y-Z plane. In some embodiments, integrating rods having rectangular cross-section or a fly's eye lens with rectangular lenslets may illuminate a rectangular field. Other cross-sections and shapes may be used to illuminate areas other than rectangular. Although the beamshaping optics 232 is described as preferably being anamorphic or have different optical power in different directions, in some embodiments, the beam shaping optics need not be so configured.

The beam shaping optics 232 also may be configured to provide a substantially uniform distribution of light over the desired field. This field may correspond, for example, to the reflective surface of the "V" prism 202 or the corresponding portion of a LCD array 236 disposed with respect to an output of the "V" prism to receive light therefrom. The luminance may be substantially constant across the portion on the LCD 236 to be illuminated. In certain embodiments, preferably substantially uniform luminance is provided across the pupil of the optical system. This pupil may be produced by imaging optics, e.g., in the head-mounted display or other projection or display device. Control over the light distribution at the desired portion of the spatial light modulator 236 may be provided by the beamshaping optics 232.

The optical system 200 further comprises a collimating element 238 which preferably collimates the beam as shown in FIG. 10. The collimating element 238 depicted in FIG. 10 comprises a Fresnel lens, which advantageously has reduced thickness and is light and compact. Other types of collimating elements 238 may also be employed, such as other diffractive optical elements, mirrors, as well as refractive lenses. For example, the Fresnel lens could be replaced with an asphere, however, the Fresnel lens is likely to weigh less. In the embodiment illustrated in FIG. 10, the Fresnel lens is proximal the input face 234 of the "V" prism 202. As described above, in the case where the beamshaping optics 232 is configured to produce a uniform light distribution, the illuminance at the collimating element 238 preferably is substantially constant. The collimating lens 238 may also be anamorphic to collimate an elliptical or elongated beam.

An optical diffuser 240 is also disposed in the optical path of the beam to scatter and diffuse the light. In various preferred embodiments, the diffuser 240 spreads the light over a desired pupil such as an exit pupil of the imaging or projection optics 54 (see FIGS. 3 and 4). The diffuser 240 is also preferably configured to assist in filling the pupil. The pupil shape is the convolution of the diffuser scatter distribution and the angular distribution exiting the Fresnel collimating element 238.

In some embodiments, the diffuser 240 also preferably assists in providing a uniform light distribution across the pupil. For example, the diffuser may reduce underfilling of the pupil, which may cause the display to appear splotchy or cause other effects. As describe more fully below, when the viewer moves his/her eye around, the viewer would see different amounts of light at each eye position. In various embodiments, for example, the f-number of the cone of rays collected by the projection optics or imaging optics varies with position (e.g., position on the spatial light modulator). Underfilling for some positions in the spatial light modulator causes different levels of filling of the imaging optics pupil for different field positions, which produces variations observed by the viewer when the eye pupil moves. Uniformity is thereby reduced. Preferably the imaging system pupil is not underfilled. Conversely, if the pupil is overfilled, light is wasted. The Fresnel lens also preferably avoids overfilling and inefficient loss of light. Accordingly, diffuser designs may be provided for tailoring the fill, such that the pupil is not overfilled. The collimating lens used in combination with the diffuser aids in countering underfilling.

A variety of types of diffusers such as for example holographic diffusers may be employed although the diffuser should not be limited to any particular kind or type. The diffuser 238 may have surface features that scatter light incident thereon. In other embodiments, the diffusers may have refractive index features that scatter light. Different designs may be used as well. A lens array such as one or more fly's eye lenses comprising a plurality of lenslets can also be used. In such a case, the lenslets preferably have an aspheric surface (e.g., a conic profile or a curve defined non-zero conic constant) suitable for fast optical systems such as about f/1.3 or faster.

The diffuser 238 may also be combined with a polarizer or the Fresnel lens or the polarizer and/or the Fresnel lens may be separate from the diffuser. Preferably, however, the polarizer is included in the optical path of the beam before the reflective beamsplitting surface of the beamsplitter 202. Accordingly, this polarizer is referred to herein as the pre-polarizer. Different types of polarizers that provide polarization selection may be employed including polarizers that separate polarization by transmitting, reflecting, or attenuating certain polarizations depending on the polarization. For example, polarizers that transmit a first polarization state and attenuate a second polarization state, polarizers that transmit a first polarization state and reflect a second polarization state, and polarizers that reflect a first polarization state and attenuate a second polarization state may be employed. Other types of polarizers and polarization selective-devices may be employed as well.

The pre-polarizer is preferably oriented and configured such that light propagating therethrough has a polarization that is reflected by the polarization beamsplitting surface in the prism 202. Preferably, substantially all of the light entering the input port 208, 210 is polarized so as to be reflected by the polarization beamsplitting surface and thereby to avoid transmission of light through the polarization beamsplitting surface. If such light leaks through, e.g., the first polarization beamsplitting surface and reaches the second reflective surface, this light may be reflected by the second surface and may continue onto the output. Such leakage may potentially wash out the pattern produced by the LCD and/or create imbalance between two sides of the output. A post-polarizer 241 disposed at the output of the V-prism may reduce this effect by removing the polarization that leaks through the first polarization beamsplitting surface and is reflected by the second polarization beamsplitting surface in the V-prism 202. Accordingly, this post-polarizer 241 preferably removes light having a polarization that is selected to be reflected by the first and second polarization beamsplitting surfaces within the V prism 202. Both the pre-polarizers and the post-polarizer 241 may comprise polarizers currently known as well as polarizers yet to be devised. Examples of polarizers include birefringent polarizers, wire grid polarizers, as well as photonic crystal polarizers.

The optical apparatus 200 depicted in FIG. 10 includes beamshaping optics 232, collimating elements 238, diffusers 240, and polarizers for each port. Accordingly, for the "V" prism 202 having two ports 208, 210, a pair of each of these components is shown. In other embodiments comprising more ports, the additional input ports may be similarly outfitted with beamshaping optics, collimating elements, diffusers, and polarizer's. Other elements such as filters etc. can also be included and any of the elements shown may be excluded as well depending potentially on the application or design. Various other combinations and arrangements of such elements are also possible.

As discussed above, light from the array of light sources 204 is coupled into the optical fiber line 206 and distributed to the input ports 208, 210 of the prism 202. The light output from the optical fiber 206 is received by the beamshaping optics 232, which preferably tailors the beam substantially to the size and shape of the portion of the spatial light modulator 236 to be illuminated. Similarly, the size and shape of the beam substantially may match that of an aperture or pupil associated with the optical system 200 in various preferred embodiments. The beam may be for example between about 5 and 19 millimeters wide along one direction and between about 10 and 25 millimeters along another direction. In various embodiments, the beamshaping optics 232 converts a circular shaped beam emanating from the optical fiber 206a, 206b into an elliptical beam. The cross-section of the beam exiting the optical fiber 206 taken perpendicular to the direction of propagation of the beam is generally circular. The beam shaping optics 232 preferably bends the beam accordingly to produce a perpendicular cross-section that is generally elliptical or elongated. This shape may be substantially rectangular in some embodiments.

Preferably, the beamshaping optics 232 also provides for more uniform distribution across the spatial light modulator 200. The beam exiting the optical fiber 206 may possess a substantially Gaussian intensity distribution with falloff in a radial direction conforming approximately to a Gaussian function. Such a Gaussian intensity distribution may result in a noticeable fall off in light at the LCD 236. Accordingly, the beamshaping optics 232 preferably produces a different distribution at the LCD 236. In certain preferred embodiments discussed more fully below, the beamshaping optics 232 is configured such that the light at the LCD 236 has a "top hat" or "flat top" illuminance distribution which is substantially constant over a large central region.

FIGS. 12 and 13 show the illuminance distribution at the spatial light modulator 234 for the respective first and second input ports 208, 210 of the "V" prism 202. This illuminance distribution is substantially Gaussian. A cross-section of a Gaussian illuminance distribution such as across the line 14-14 in FIG. 12 is presented in FIG. 14. The Gaussian has a peak with an apex and sloping sides. As shown, this Gaussian is circularly symmetric about the Z-axis. FIGS. 12 and 13 also show a portion of the perimeter 242 of the output face. One edge 244 of the perimeter corresponds to the vertex of the prism. For each side, a peak is centrally located within the rectangular field of the reflective surface of the prism and/or the rectangular portion of the LCD 236.

FIG. 15 schematically illustrates flux from the two sides of the "V" prism 202 combined together for example at the spatial modulator 236. FIG. 15 also shows a perimeter 242 corresponding to the two portions of the output face associated with the two sides of the "V" prism 202, respectively. This perimeter may likewise correspond to the two portions of the spatial light modulator 236. Two peaks in the illuminance distribution are centrally located within each of the rectangular portions of the LCD 236.

The light beam may be offset such that the peak is shifted from center in one direction as illustrated in FIGS. 16 and 17, which show the illuminance incident on the two portions of the spatial light modulator corresponding to the two sides of the "V" prism. FIGS. 16 and 17 show a perimeter 242 delineating the two portions of the spatial light modulator 234 coinciding with the reflective surfaces in the prism 202, and/or the output faces. Line 244 on the perimeter 242 corresponds to the vertex of the prism. The illuminance is represented as a Gaussian distribution with a peak shifted in the Y direction from the center of the spatial light modulator 234. The light beam may be shifted or altered in other ways to preferably provide more uniform illumination.

In various exemplary embodiments that employ Koehler illumination, the falloff in the source angular distribution maps to the corners of the two output portions of the "V" prism 202 as well as, for example, to the corresponding portions of the spatial light modulator 236. (In Koehler illumination, the light source is imaged in the pupil of the projection optics, e.g., at infinity.) If the falloff is sufficiently slow and not too large, the observable variation in light level may not be significant. If however, the falloff is sharp and sizeable, the variation across the output of the "V" prism 202 may result for example in noticeable fluctuations in light reaching the eye in specific circumstances.

In various embodiments, the illumination output by the prism 202, however, is preferably substantially constant and uniform. As discussed above, therefore, a "top hat" or "flat top" illuminance distribution may be preferred over the Gaussian distribution. A substantially "top hat" illuminance distribution incident on the output face 234 of the prism 202 is shown in FIG. 18. A cross-section of the "top hat" illuminance distribution across the line 19-19 is presented in FIG. 19. The "top hat" distribution is substantially constant over a central portion 246 and falls off rapidly beyond the substantially constant central portion. The width of the substantially constant central portion 246 is preferably sufficiently large so as to fill the appropriate area, such as for example the eye pupil in certain display embodiments such as for head mounted and helmet mounted displays. In the case where the "top hat" distribution is substantially constant within the central portion 246, substantially constant illuminance across the pupil may be provided. This "top hat" distribution is shown as circularly symmetric about the Z-axis although asymmetric such as elliptical shapes may be preferred. FIG. 18 also shows the perimeter 242 of the portion of the spatial light modulator 234 illuminated by one side of the V-prism, or the corresponding reflective surface and/or output face of the prism 202. One edge 244 of the perimeter 242 corresponds to the vertex of the prism 202. Although a "top hat" distribution is shown, other distributions wherein the light level, e.g., illuminance, is substantially constant may be employed. Preferably, the illuminance is substantially constant at least across a portion of the "V" prism 202 output corresponding to the relevant pupil such as the pupil of the eye for certain embodiments.

The intensity exiting the optical fiber 206*a*, 206*b* may be more Gaussian than "top hat" or "flat top" resulting in more falloff. As discussed above, clipping the rotationally symmetric angular distribution with a rectangular field can produce more significant falloff near the center of the spatial light modulator 236 and consequently at the center of the display or projection screen since the vertex of the "V" prism 202 corresponds to the center of the output of the "V" prism. In certain embodiments, therefore, the beamshaping optics 232 preferably provides a substantially "top hat" illuminance distribution at the spatial light modulator 234. A lens 232 that is aspheric at least on one of the optical surfaces may yield such a distribution. An integrating rod may also output a substantially constant illumination distribution like a flat top distribution that falls of rapidly. When using an integrating rod or light pipe that provides substantially constant illumination beam shaping optics may or may not be used to further flatten the illumination distribution. (In various embodiments, preferably the diffusers as well as the collimator may be employed with the integrating rod or light pipe, e.g., to increase uniformity. The diffuser may, for example, be used instead of longer integrating rods or light pipes, thereby increasing compactness.)

Asymmetric beamshaping optics 232 are also preferably used to produce an asymmetric beam. For example, a cylindrical lens having a cylindrical surface may advantageously convert the circular peaked distribution into a distribution having a central oval portion, more suitable for the rectangular field. As described above, the beamshaping optics 232 may comprise one or more refractive elements having an aspheric surface and an anamorphic (e.g., cylindrical) surface. As stated above, an integrating rod having an asymmetric (e.g., rectangular) cross-section or a fly's eye lens comprising a plurality of asymmetrically shaped (e.g., rectangular) lenslets may be used to provide such asymmetric beam patterns. Other approaches to providing asymmetric distributions are possible.

As will be discussed more fully below, the diffuser 240 is also preferably configured to provide substantially uniform light levels. The diffuser may include a plurality of scatter features that scatter incident light into a cone of angles such as illustrated in FIG. 20. The diffuser may be designed to substantially limit this cone of angles, θ. In addition, the diffuser may be configured to provide a specific angular distribution wherein the intensity varies with angle according to a distribution, I(θ). In certain preferred embodiments, for example, this angular distribution also substantially conforms to a "top hat" distribution. Top hat and Gaussian angular distributions 248, 250 are plotted in FIG. 21. (Such distributions are similar to corresponding Bidirectional Scatter Distribution Functions, BSDFs). For the Gaussian distribution 250, the intensity peaks for a central angle, $\theta_o$, but falls off gradually for angles larger and smaller than the central angle. In contrast, for the "top hat" distribution 248, a portion 252 of the angles have a substantially similar intensity level. For angles outside that region 252, however, the intensity rapidly drops off. Such a distribution 248 may be useful for efficiently distributing the light to the desired areas without unnecessary and wasteful overfill.

The size of the spatial light modulator 236 may be between about 6 to 40 millimeters or between about 12 to 25 millimeters on a diagonal. In certain embodiments; the spatial light modulator 236 may have shapes other than square, and may for example be rectangular. In one exemplary embodiment, the aspect ratio of the spatial light modulator that is illuminated is about 3:4. Dividing the illuminated region in two may yield an aspect ratio of about 3:8 for the section of the spatial light modulator illuminated by one side of the V-prism. More broadly, the portion illuminated by one half of the output port may be between about 2×4 millimeters to 14×28 millimeters, although sizes outside these ranges are possible. Still other shapes, e.g., triangular, are possible. Accordingly, the beam used to illuminate the spatial light modulator 236 may have a length and width between about 2×4 millimeters to 14×28 millimeters, respectively. The collimator aperture, diffuser aperture, polarizer aperture as well as the input faces 234 and reflective surfaces of the prism 202 may have aperture sizes in one direction between about 2 and 14 millimeters and in another direction between about 4 and 28 millimeters. The dimensions, however, should not be limited to those recited here.

Figure 22:
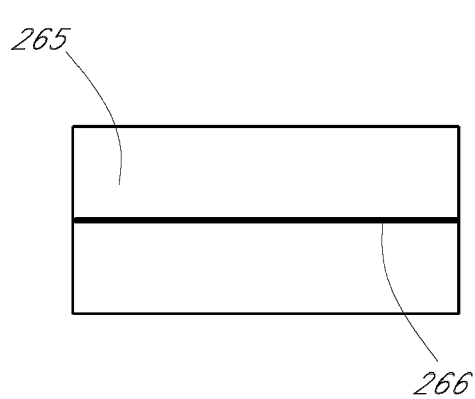
FIG. 22 is a schematic illustration of a field-of-view for a display showing a non-uniformity in the form of a stripe at the center of the field caused by the V-prism.
Figure 23:
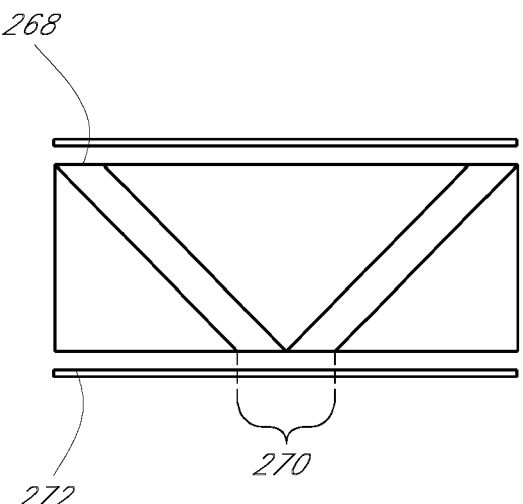
FIG. 23 is a cross-sectional view of the V-prism schematically illustrating the finite thickness of the reflective surfaces of the V prism that produce the striped field non-uniformity depicted in FIG. 22.

FIG. 22 depicts a field-of-view 265 for a display such as a head mounted display produced by a V-prism. A dark stripe 266 is visible at the center of the field 265. This stripe 266 results from the finite thickness of the beamsplitting reflective surfaces 268 of the V prism, which is shown in FIG. 23. In the case where polarization beam splitting is provided by a plurality of birefringent layers, the stack of birefringent layers introduces this thickness. In the case where the polarization beam splitting layer comprises a wire grid, the height of the wires contributes to this thickness. Other structures such as photonic crystal polarizers have finite thickness, which may cause this stripe to be visible. A portion 270 of the output of the V-prism, is affected by the reduced performance of the beamsplitting surfaces. This region 270, as well as the thickness of the beamsplitting layers 268, has been exaggerated in this schematic drawing and, accordingly, is not to scale. The stripe 266 shown in FIG. 22 is likewise exaggerated as well and is preferably not visible to the viewer.

To decrease the size of the stripe 266, the thickness of the polarization beamsplitting layer 268 is preferably reduced. Preferably, the thickness is not larger than a few percent of the beam at the pupil of the system. In various preferred embodiments, for example, the thickness of the polarization beamsplitting structure 268, e.g., the thickness of the multiple birefringent layer stack or the photonic crystal polarizers is less than about 5 to 100 micrometers. Thicknesses outside this range, however, are possible. A post-polarizer 272 may also be included to potentially reduce this effect.

Figure 24:
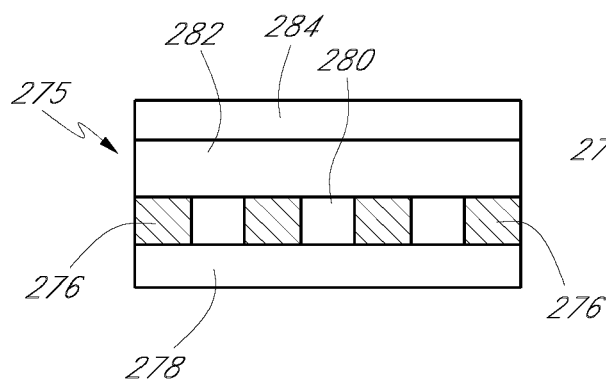
FIG. 24 is a cross-sectional view of a wire grid polarizer comprising a plurality of strips spaced apart by air gaps.
Figure 25:
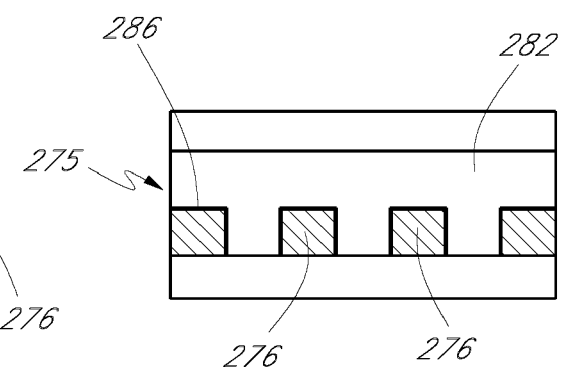
FIG. 25 is a cross-sectional view of a wire grid polarizer comprising a plurality of strips with glue filled between the strips.
Figure 26:
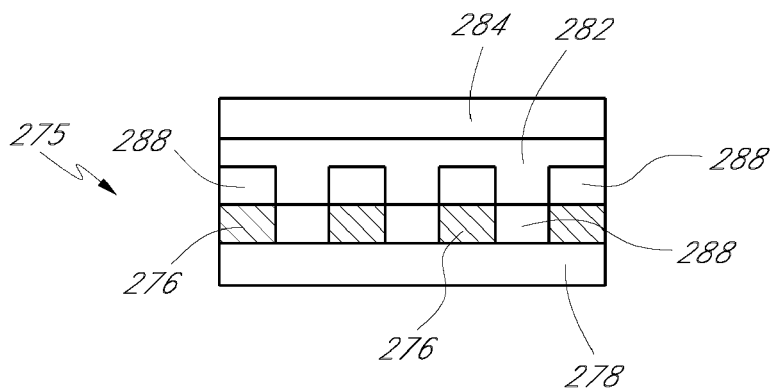
FIG. 26 is a cross-sectional view of a wire grid polarizer comprising a plurality of strips and a MgF overcoat formed thereon.

FIGS. 24-26 depict cross-sectional views of wire grid polarizers 275. The wire grid polarizer 275 comprises a plurality of elongated strips 276 preferably comprising metal such as aluminum. The elongated strips 276 are arranged parallel to each other. The height of the wires 276 is between about 20 to 60 nanometers, although larger or smaller strips may be employed in different embodiments. The strips 276 may have a width of between about 10 and 90 nanometers and a periodicity of between about 50 and 150 nanometers. The strips 276 may be separated by a distance to provide a duty cycle of between about 0.25 and 0.75. The periodicity is preferably sufficiently small for the wavelengths of use such that the plurality of strips 276 does not diffract light into different orders. Light will therefore be substantially limited to the central or zero order. Values outside these ranges, however, are possible.

In FIG. 24, the strips 276, formed on a substrate 278, are separated by open spaces such as air gaps 280. A layer of glue 282 or other adhesive material is employed to affix a superstrate 284 to the wire grid polarizer. In such an embodiment, preferably the glue 282 is viscous and does not fill in the open regions 280 separating the strips 276. In FIG. 25, glue 282 fills these open regions 280. In various preferred embodiments, the glue 282 has an index of refraction similar to that of the substrate 278 and/or superstrate 284. Accordingly, if the substrate 278 and superstrate 284 comprise BK7 glass, preferably the glue 282 has an index of refraction of about 1.57. FIG. 25 shows a layer of oxide 286 such as aluminum oxide ($Al_2O_3$) that may be formed on metal strips 276 comprising for example aluminum. FIG. 26 shows a layer of MgF 288 formed over the array of strips. This layer of MgF may range between about 0.5 and 20 microns thick although other thicknesses outside this range are possible. The MgF is shown in the regions separating the strips 276 as well in this exemplary embodiment. Other materials beside MgF, such as, for example, silica may be employed in other embodiments of the invention.

One exemplary process for forming the wire grid polarizers 275 in the V-prism is illustrated in FIGS. 27A-27G. Preferably, substantially smooth surfaces 502 are formed on a first triangular prism 504, for example, by polishing as shown in FIG. 27A. This prism 504 may comprise glass such as BK7 or SF57 or other glass or substantially optically transmissive material. In certain preferred embodiments, this prism 504 has a cross-section in the shape of a right triangle having a hypotenuse 506. The surfaces 502 of this prism are preferably substantially planar, at least those corresponding to the hypotenuse 506 and one of the sides opposite the hypotenuse shown in the cross-section.

A first wire grid polarizer 508 is formed on a side of the prism 504 as illustrated in FIG. 27B. Metal deposition and patterning may be employed to create an array of parallel metal strips comprising the wire grid polarizer 508. These strips are shown as being formed on the surface 502 corresponding to the hypotenuse 506 in the cross-section shown in FIG. 27B. In certain preferred embodiments, the metal strips may be formed on a glass wafer 510 using lithographic processes. The wafer 510 may be diced into pieces that are bonded or adhered to the prism 504. Open spaces may separate the strips. An overcoat layer comprising, e.g., MgF or silica or other material, may be formed over the plurality of strips.

A second triangular prism 514 similar to the first triangular prism 504 is attached to the first triangular prism sandwiching the first wire grid polarizer 508 between the two prisms as depicted in FIG. 27C. This second prism 514 may also comprise glass such as BK7 or SF57 or other glass or substantially optically transmissive material. Similarly, this second prism 514 may have a cross-section in the shape of a right triangle having a hypotenuse 516. At least the surface corresponding of the hypotenuse 516 shown in the cross-section is preferably substantially planar. A substantially cylindrical structure having a substantially square cross-section is formed by attaching the second triangular prism 514 to the first triangular prism 504.

The first and second triangular prisms 504, 514 together with the first wire grid polarizer 508 sandwiched therebetween are cut and/or polished along a diagonal of the square cross-section formed by attaching the first triangular prism to the second triangular prism as shown in FIG. 27D. A substantially cylindrical structure 524 having a substantially triangular cross-section is thereby created. This triangular cross-section 524 is a right triangle with a hypotenuse 526 that is preferably substantially orthogonal to the first wire grid polarizer 508.

A second wire grid polarizer 538 is added to the substantially triangular cylindrical structure 524 as shown in FIG. 27E. The second wire grid polarizer 538 may be created by depositing and patterning metal to form a plurality of parallel metal strips. As described above, in certain preferred embodiments, the metal strips may be formed on a glass wafer 540 using lithographic processes. The wafer 540 may be diced into pieces that are bonded or adhered to the prism 504. An overcoat layer comprising, e.g., MgF or silica or other material, may be formed on the second wire grid 538. As illustrated in FIG. 27E, the second wire grid polarizer 538 is disposed on a surface of the substantially cylindrical structure 524 corresponding to the hypotenuse 526 of the triangular cross-section. Accordingly, the second wire grid polarizer 538 is preferably approximately orthogonal to the first wire grid polarizer 508.

A third triangular prism 534 similar to the first and second triangular prisms 504, 514 is attached to the first and second triangular prisms sandwiching the second wire grid polarizer 538 therebetween (see FIG. 27F). This third prism 534 may also comprise glass such as BK7 or SF57 or other glass or substantially optically transmissive material. Similarly, this third prism 534 may have a cross-section substantially in the shape of a right triangle having a hypotenuse 536, and at least the surface of this third triangular prism 534 corresponding to the hypotenuse is preferably substantially planar. The surface corresponding to the hypotenuse 536 of the third triangular prism is preferably adjacent to the second wire grid 538 or the overcoat layer formed thereon. A substantially cylindrical structure 544 having a substantially square cross-section is thereby formed by attaching the third triangular prism 534 to the first and second triangular prisms 504, 514. This square cross-section has four sides, two sides are provided by the first and second triangular prisms 504, 514 respectively, and two sides are provided by the third triangular prism 534. The first wire grid 508 partly extends along a portion of a first diagonal of this square cross-section while the second wire grid 538 extends along a second diagonal of the square cross-section that is orthogonal to the first diagonal.

The first, second, and third triangular prisms 504, 514, 534 together with the second wire grid polarizer 538 are cut and/or polished thereby removing portions of the third triangular prism and portions of either the first or second triangular prisms along one side of the generally square cross-section. In FIG. 27G, portions of the first triangular prism 504 are removed together with portions of the third triangular prism 534. In certain preferred embodiments, a substantially planar surface 542 is formed by cutting and/or polishing. Preferably, the portions of the first and second wire grid 508, 538 that remain extend toward this substantially planar surface 542 at an angle of about 40° to 50° to this substantially planar surface, and about 80-100° with respect to each other. Additionally, sufficient material is removed by cutting and/or polishing such that the portions of the first and second wire grid 508, 538 also preferably extend to this substantially planar surface 542. The result is a V-prism 550. In the case where MgF coatings are employed, a slight asymmetry may be introduced depending on whether material is removed by polishing the first or second triangular prism 504, 514 together with the third triangular prism 534.

Variations in the process of forming the V-prism are possible. For example, substantially planar surfaces need not be formed in certain embodiments. Curved surfaces on the V-prism that have power may be formed. Different methods of fabricating the wire grid polarizers 510, 538 are also possible and one or both of the MgF layers 510, 540 may or may not be included. Additional processing steps may be added or certain steps may be removed, altered, or implemented in a different order. In certain embodiments, for example, a flat with a wire grid formed thereon may be cemented to the triangular prism instead of depositing and patterning the plurality of metal strips directly on the prism. Other techniques for forming the V-prism including those yet devised may be employed as well.

Figure 28:
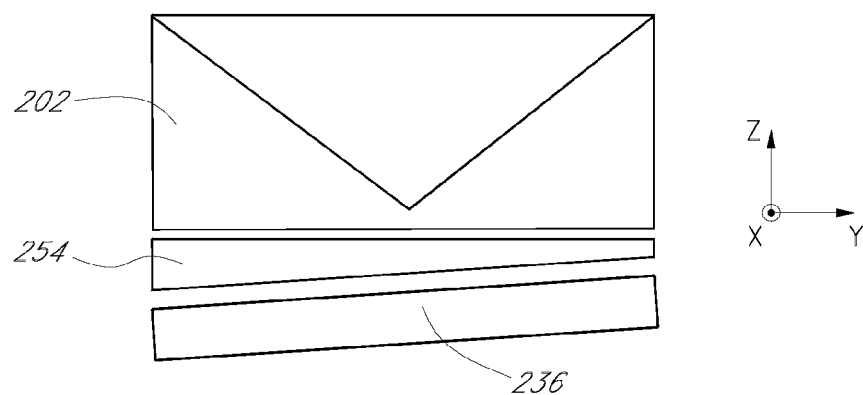
FIG. 28 is a cross-sectional view of a wedge shaped optical element for providing correction of astigmatism and coma that is disposed between the "V" prism and the spatial light modulator.

In various preferred embodiments, the optical system 200 may further comprise an optical wedge 254 with the V-prism. This optical wedge 254 may for example be disposed between the (intermediate) output face of the "V" prism and the spatial light modulator 236 as shown in FIG. 28. The wedge 254 may comprise, for instance, a plate of material such as glass that is substantially optically transmissive to the light. The plate, however, has one surface tilted with respect to the other. The thickness of the wedge 254, therefore, varies across the field. The optical wedge 254 introduces astigmatism and coma when the beam is focused through the wedge. This astigmatism and coma can be employed to offset astigmatism and coma introduced by other optical elements such as the imaging optics 54. Optical wedges are described, for example, in U.S. Pat. No. 5,499,139 issued to Chen which is hereby incorporated herein by reference in its entirety.

Figure 29:
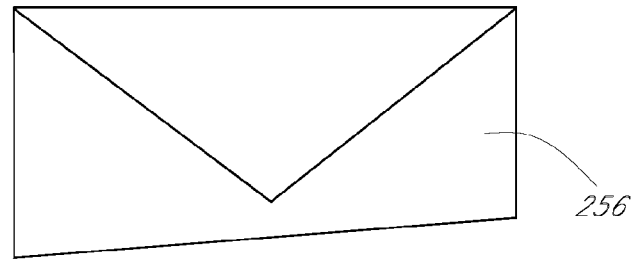
FIG. 29 is a cross-sectional view of a "V" prism having a wedge shape that includes correction of astigmatism and coma.

The optical wedge 254 shown in FIG. 28 is separated from the prism 202 by a gap, which may be an air gap. In contrast, FIG. 29 shows a wedge-shaped prism 256 wherein the wedge is incorporated in the prism. The wedge-shaped prism 256 may for example have one output surface, the intermediate output, tilted with respect to the other output surface. This prism 256 also introduces astigmatism and coma and can be used to counter these effects introduced by components elsewhere in the system 200. In certain circumstances, however, the wedge 254 separated from the prism 202 by a gap yields improved optical performance.

Figure 30:
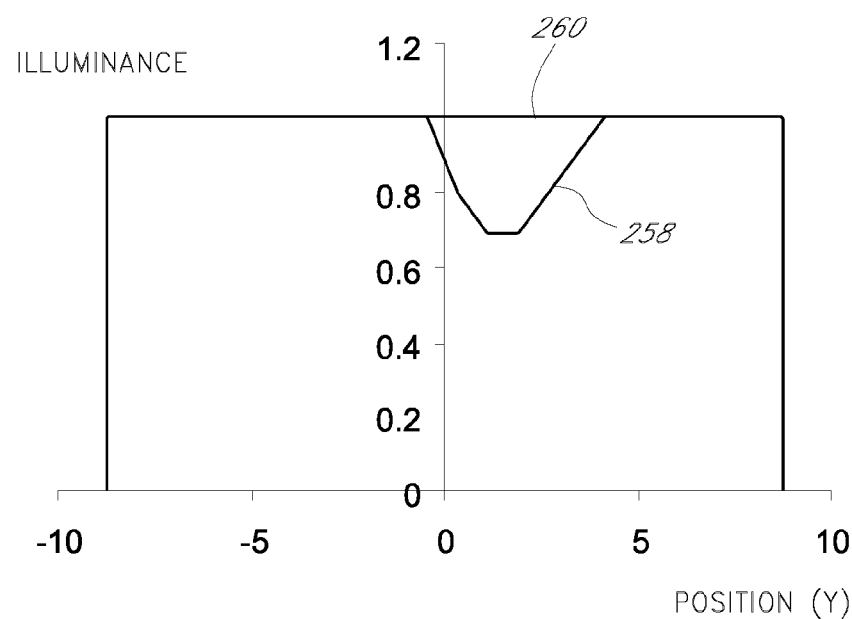
FIG. 30 is a plot on axes of position (Y) versus illuminance on the spatial light modulator for a wedge-shaped prism used in combination with different type diffusers.

In certain embodiments wherein the wedge-shaped prism 256 is employed, the diffuser preferably has a "top hat" angular distribution 248 such as shown in FIG. 21, which provides increased uniformity. Otherwise, the illuminance distribution may exhibit additional non-uniformities. FIG. 30 shows a plot of illuminance across the liquid crystal spatial light modulator 236 for embodiments that include a wedge-shaped prism 256. A diffuser 240 having a Gaussian angular distribution 250 such as shown in FIG. 21 yields an illuminance distribution shown by a first plot 258 that has a dip in the illuminance. A diffuser 240 having a "top hat" angular distribution 248 such as shown in FIG. 21 yields an illuminance distribution shown by a second plot 260 having a substantially constant illuminance across the field. The wedge-shaped prism 256 can be replaced with a prism 202 and wedge 254 combination such as shown in FIG. 28 wherein a gap separates the prism and the spatial light modulator 236. A substantially constant illuminance results. Such a configuration will also reduce angular uniformity requirements of the diffuser 240. For example, both diffusers 240 with Gaussian distributions and diffusers with "flat top" distributions can perform suitably well.

A mapping of the illuminance across the spatial light modulator 236 for a wedge-shaped prism 256 having a 1.3° wedge is shown in FIG. 31. Substantial uniformity is demonstrated. FIG. 32 is a histogram of the luminous flux per area (in lux). This plot shows that the luminous flux per area received over the spatial light modulator 236 is within a narrow range of values.

The uniformity is greater for the example wherein the wedge 254 is separate from the prism 202 with an air gap therebetween. FIG. 33 shows a mapping of the illuminance for such a case. The variation is within ±12%. FIG. 34 shows the smaller range of variation in illuminance level. The illuminance level may depend on the particular system design or application. Values outside these ranges are possible as well.

The wedge-shaped prism 356 may also demonstrate improved performance if the "V" is rotated with respect to the tilted surface forming the wedge. In such a configuration, the thickness of the wedge increases (or decreases) with position along a direction parallel to the edge that forms the apex of the "V" shaped component.

Figure 35:
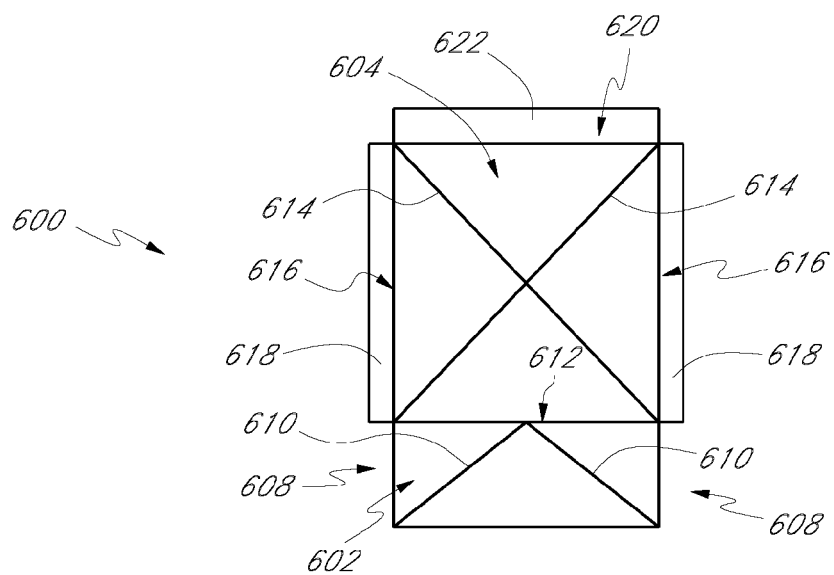
FIG. 35 is a schematic representation of a V-prism together with an X-cube.

A color splitting prism may also be included together with the V-prism in certain embodiments to provide color images, graphics, text, etc. FIG. 35 illustrates an optical system 600 for a projector comprising a V-prism 602 and an X-cube 604. The V-prism 602 is disposed between a projection lens 606 and the X-cube 604. X-cubes are available from 3M, St. Paul, Minn.

The V-prism 602 comprises first and second input ports 608 for receiving illumination that is preferably polarized. The V-prism 602 further comprises first and second polarization beamsplitting surfaces 610 for reflecting the illumination received through the first and second input ports 608. The first and second polarization beamsplitting surfaces 610 are oriented to reflect light received through said first and second input ports 608 to a central input/output port 612 of the X-cube 604.

The X-cube 604 additionally comprises first and second reflective color filters 614 that reflect certain wavelengths and transmit other wavelengths. The first and second reflective color filters 614 preferably have respective wavelength characteristics and are disposed accordingly to reflect light of certain color to first and second color ports 616 where first and second spatial light modulators 618 are respectively disposed. The X-cube 604 further comprises a third color port 620 located beyond the first and second reflective color filters 614 to receive light not reflected by the first and second reflective color filters. A third spatial light modulator 622 is disposed to receive light from this third color port 620. In various preferred embodiments, reflective spatial light modulators that selectively reflect light may be employed to create two-dimensional spatial patterns. Light reflected from the first and second spatial light modulator 618 through the respective port 616 will be reflected from the first and second reflective color filters 614 respectively. Light reflected from the third spatial light modulator 622 through the third color port 620 will be transmitted through the first and second reflective color filters 614. The light returned by the spatial light modulators 618, 622 will therefore pass through the X-cube 604 and the central input/output port 612 of the X-cube. This light will continue through the V-prism 602 onto and through the projection optics 606 to a screen 624 where a composite color image is formed for viewing.

Other components, such as e.g., polarizers, diffusers, beamshaping optics etc., may also be included. Optical wedges may be included as well between the X-cube 604 and the spatial light modulators 618, 622 in certain embodiments. Other designs, configurations, and modes of operation are possible.

Figure 36:
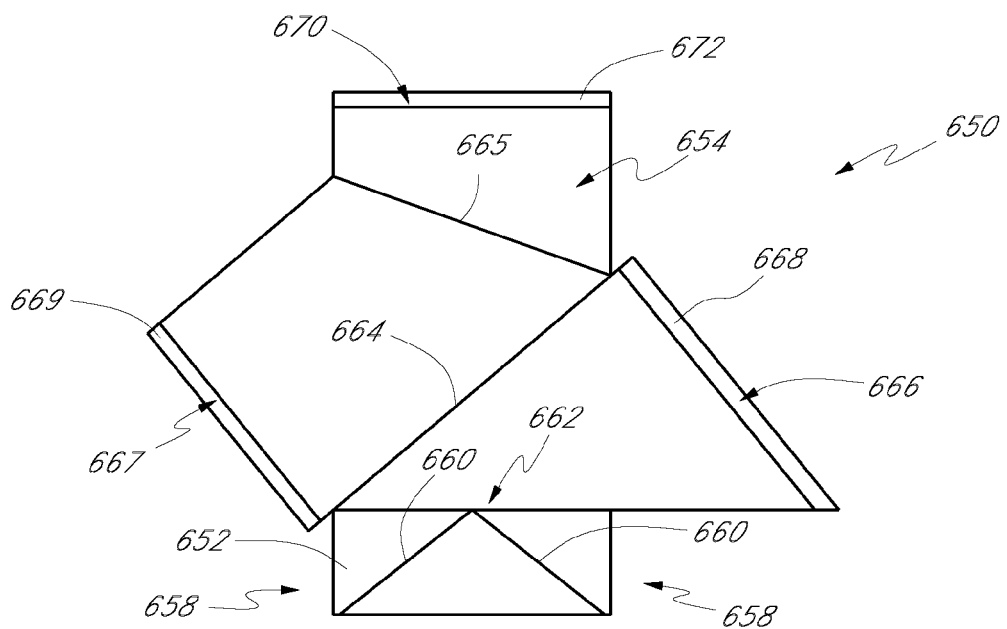
FIG. 36 is a schematic representation of a V-prism together with a Philips prism.

Other types of color devices may also be employed. FIG. 36 illustrates an optical system 650 for a rear projection television comprising a V-prism 652 and a Philips prism 654. The V-prism 652 is disposed between a projection lens 656 and the Philips prism 654. Philips prisms are available from Richter Enterprises, Wayland, Mass.

The V-prism 652 comprises first and second input ports 658 for receiving illumination that is preferably polarized. The V-prism 652 further comprises first and second polarization beamsplitting surfaces 660 for reflecting the illumination received through the first and second input ports 658. The first and second polarization beamsplitting 660 surfaces are oriented to reflect light received through said first and second input ports 658 to a central input/output port 662 of the Philips prism.

The Philips prism 654 additionally comprises first and second reflective color filters 664, 665 that reflect certain wavelengths and transmit other wavelengths. The first and second reflective color filters 664, 665 preferably have respective wavelength characteristics and are disposed accordingly to reflect light of certain color to first and second color ports 666, 667 where first and second spatial light modulators 668, 669 are respectively disposed. The Philips prism 654 further comprises a third color port 670 located beyond the first and second reflective color filters 664, 665 to receive light not reflected by the first and second reflective color filters. A third spatial light modulator 672 is disposed to receive light from this third color port 670.

In various preferred embodiments, reflective spatial light modulators that selectively reflect light may be employed to create two-dimensional spatial patterns. Light reflected from the first and second spatial light modulator 668, 669 through the respective port 666, 667 will be reflected from the first and second reflective color filters 664, 665, respectively. Light reflected from the third spatial light modulator 672 through the third color port 670 will be transmitted through the first and second reflective color filters 664, 665. The light returned by the spatial light modulators 667, 668, 672 will therefore pass through the Philips prism 654 and the central input/output port 662 of the Philips prism. This light will continue through the V-prism 652 onto and through the projection optics 656 to a pair of mirrors (not shown) for forming a composite color image on a screen for viewing. As described above, other components, such as, e.g., polarizers, diffusers, beamshaping optics, etc., may also be included. Additionally, optical wedges may be included between the Philips prism 654 and the spatial light modulators 668, 669, 672 in certain embodiments.

FIGS. 35 and 36 do not show the optical components used to couple light to the V-prisms 602, 652. As discussed above, however, illumination may be provided using light pipes and light boxes including conformal walls that define cavities for light to flow as well as mirrors and other refractive, reflective, and diffractive optical components. Illumination may also be provided by optical fibers, fiber bundles, rigid or flexible waveguides, etc. In certain cases where compactness is a consideration, such configurations may be designed to reduce overall size.

Figure 37:
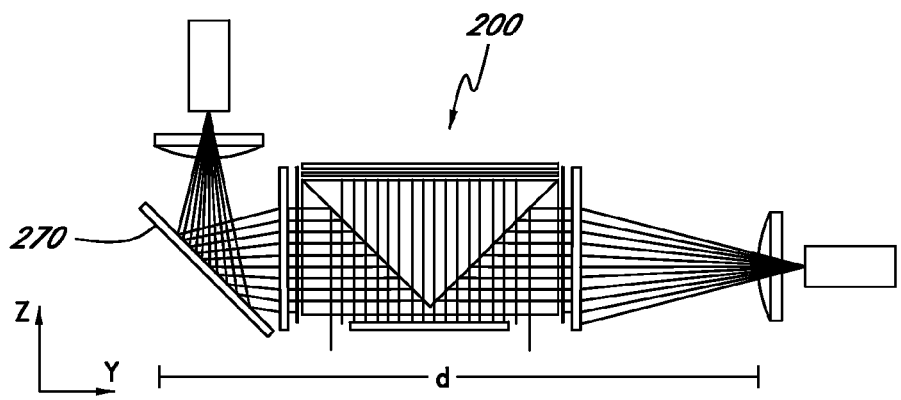
FIG. 37 is a schematic representation of a configuration having reduced dimensions that facilitates compact packaging.

FIG. 37 shows one example where a mirror 270 for folding the input beam may be included in the optical system 200 to reduce the width of the system. The folding mirror 270 may comprise a planar specularly reflective surface such as shown or may comprise other reflective optical elements as well. As depicted in FIG. 37, this beam folding mirror 270 may be easily integrated into the illuminator optical path. The fold mirror 270 bends the optical path of the beam reducing the width of the system, and thereby facilitating compact packaging. In various preferred embodiments, this optical path is bent by about 90°, however, different angles are possible as well. A dimension, d, corresponding to the width of the system is shown in FIG. 37. In various preferred embodiments, this dimension, d, may be 1-3 inches, and preferably about 2 inches. Sizes outside this range are also possible. The folding mirror may, however, increase stray light effects.

In various embodiments, non-uniform controlled illumination at the spatial light modulator 236 is desired. For example, in some cases, uniform illuminance at the spatial light modulator 236 (with an intensity distribution that falls off only slightly towards higher angles) produces a non-uniform distribution at the output of the optical system. As discussed above, in many optical imaging systems, for instance, the f-number or cone of rays collected by the optical system varies across the field due to distortion. Uniformly illuminating the object field of such an imaging system results in the collection of different amounts of light from different locations in the object field and corresponding illuminance variation at the image plane. Non-uniform illumination at the spatial light modulator, may compensate for this effect and provide uniformity at the image field.

Figure 38:
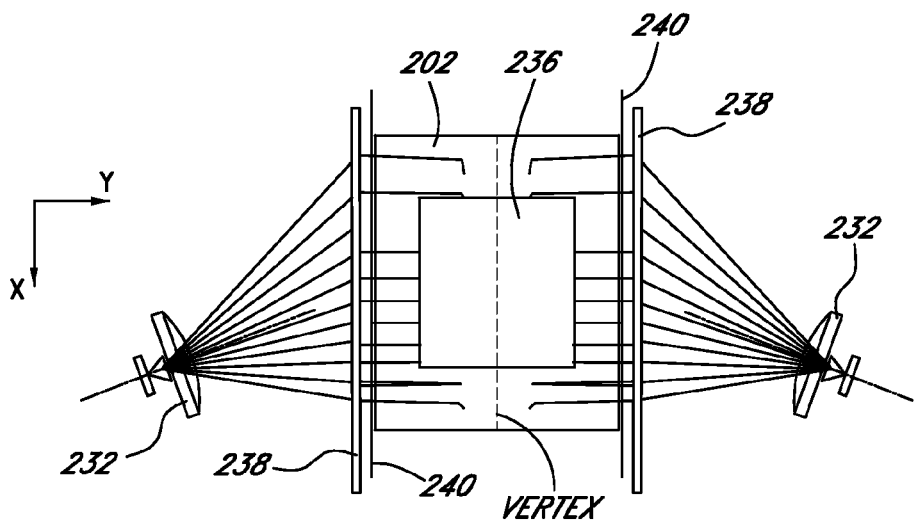
FIG. 38 is a schematic representation of a configuration for providing non-constant illuminance at the spatial light modulator.

Accordingly, if a uniform spatial illuminance distribution across the display results in a gradation in the uniformity seen by the observer, a non-uniform illuminance can be used to compensate for the gradation. One method for achieving a compensating linear variation in the illuminance is to use an off-axis illumination such as shown in FIG. 38. In this embodiment, the optical axis of the fiber output and the beamshaper optics 236 is oriented at an oblique angle with respect to the optical axis through the Fresnel collimating lens 238, diffuser 240, polarizer, and the "V" prism input 234. The light source and beamshaping optics 236 are appropriately rotated with respect to the Fresnel lens 238 and the "V" prism 202, and the Fresnel lens, diffuser 240, and "V" prism are decentered with respect to the fiber output and the beam shaping optics 232. Similarly, the optical path of the beam of light propagating from the fiber optic 206a, 206b and the beamshaping optics 232 to the Fresnel collimating lens 238 is angled with respect to the optical path of the beam through the Fresnel lens, diffuser 240, polarizer and input 234 of the "V" prism 202. FIG. 38 depicts the rotation of the beamshaping optics about an axis parallel to the Z axis and the decentering in the X direction. This tilt of the light source with respect to the V-prism may be, for example, range between about 5° to 45°, e.g., about 26°. The decenter of the light source with respect to the central axis through the V-prism may be between about 11 and 25 millimeter in some cases. Values outside these ranges, however, are possible.

In this embodiment, the beamshaping optics 232 comprises a lens having a cylindrical surface. As described above, this cylindrical surface improves collection efficiency of the rectangular input face of the "V" prism 202. The resultant efficiency is substantially similar to the efficiency achieved in the uniform luminance configurations. Other elements within the optical system 200 may be tilted, decentered and/or off-axis as well. In addition, not all of the components need to be tilted, decentered, and off-axis in every embodiment. Other variations are possible.

The result of the tilt and decenter is that the illuminance across the Fresnel collimating lens 238, diffuser 240, polarizer, input 234 of the prism 202, and liquid crystal spatial light modulator 236 is non-uniform. In particular, in this embodiment, the illuminance across the intermediate output of the "V" prism 202 and at the spatial light modulator 236 is graded as shown by the plots in FIGS. 39 and 40. In this embodiment, this gradation from high to low illuminance extends along the X direction parallel to the vertex of the "V" prism. As shown, the optical path distance from the beam shaping optics 232 to the Fresnel collimating lens 238 varies across the field introducing a corresponding variation in the illuminance.

Preferably, the configuration is selected to provide the desired illumination, which may be a specific illumination of the object field to counter non-uniformity in the optics, e.g., imaging optics 54, and to ultimately yield uniformity in the image plane. One exemplary configuration is the off-axis illumination depicted in FIG. 38, which can be suitably adjusted to offset non-uniformities in off-axis imaging systems 54 and provide uniformity in the image field. Other configurations, however, adjusted in a variety of ways may be utilized to provide the desired effect. For example, an absorption plate having graded transmission properties or transmittance that varies with location along the width of the plate may be employed. Alternative designs are also possible. Also, although the illuminance is depicted as a generally decreasing value with position, X, along the width of the spatial light modulator 236, the variation in illumination can take other forms. Preferably the system 200 is configured to provide the desired illumination across the spatial light modulator 236. In some cases, the desired profile is a generally decreasing, e.g., substantially monotonically decreasing illuminance across a substantial portion of the light spatial light modulator 236. For example, the ratio of illuminance from one end to another may range from about 2:1 to 6:1 over a lateral distance of between about 15 to 45 millimeters. This distance may be, for example, about 26 millimeters when the spatial light modulator may be for example about 17×19 millimeters. Values outside these ranges, however, are possible.

Figure 41:
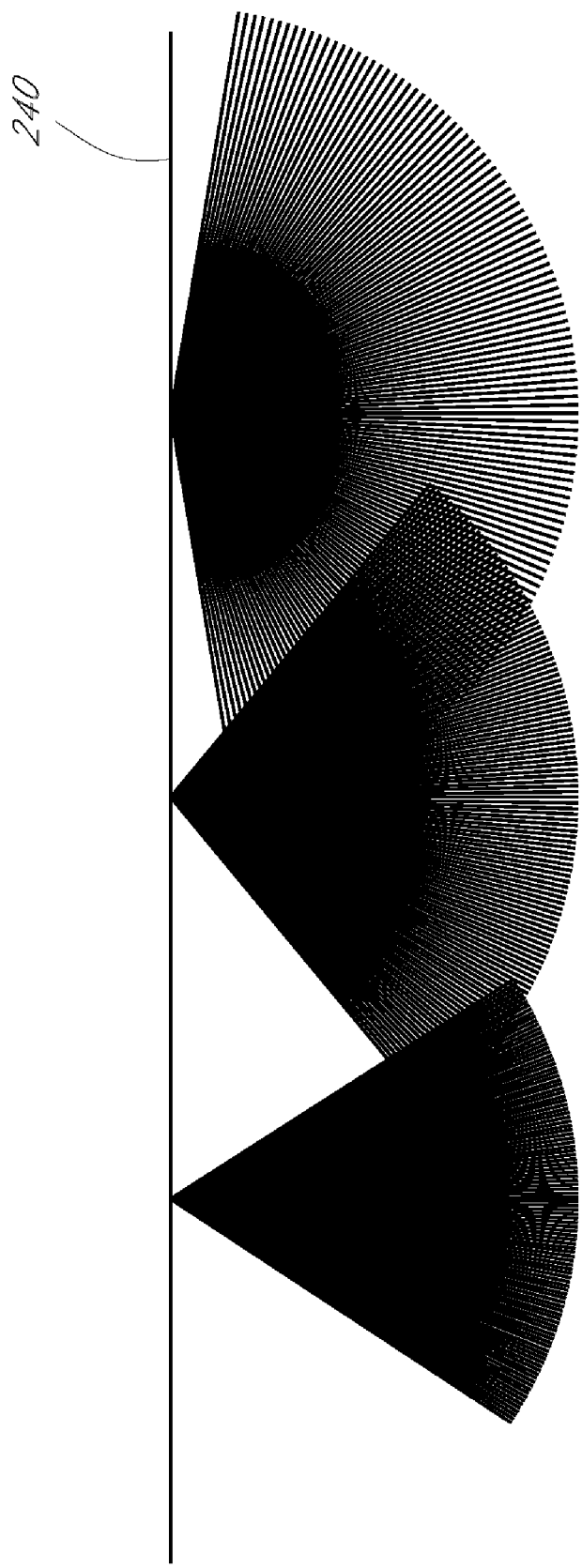
FIG. 41 is a cross-sectional view of a diffuser that scatters light different amounts at different locations on the diffuser.
Figure 42:
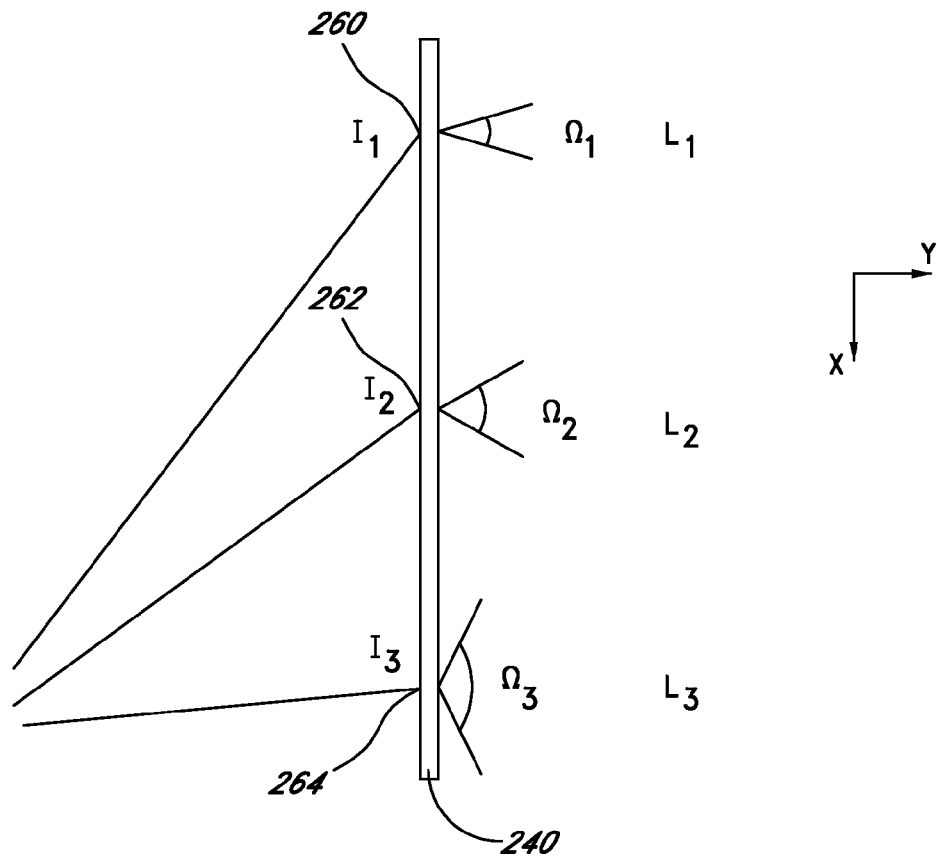
FIG. 42 shows three locations on a diffuser that receive different levels of luminous flux corresponding to different illuminance values ($I_1$, $I_2$, and $I_3$) and that scatter light into different size cone angles ($\Omega_1$, $\Omega_2$, and $\Omega_3$) such that the luminance at the three locations ($L_1$, $L_2$, and $L_3$) is substantially constant.

In various embodiments, the diffuser 240 is graded in the lateral direction. The diffuser 240 includes a plurality of scattering (e.g., diffractive features) laterally disposed at locations across the diffuser to scatter light passing through the diffuser. As shown in FIGS. 41 and 42, light incident on the diffuser is scattered by these diffractive features into a plurality of directions filling a projected solid angle having a size determined by the diffractive features in the diffuser. As shown, the projected solid angle into which light is scattered may be different for different locations on the diffuser. Preferably, the scattering features in the diffuser are arranged such that the projected solid angle into which light is scattered increases with lateral position on the diffuser. Accordingly, light incident on a first location 260 is scattered into a first projected solid angle $\Omega_1$, light incident on a second location 262 is scattered into a second projected solid angle $\Omega_2$, and light incident on a third location 264 is scattered into a third projected solid angle $\Omega_3$. These locations are shown in FIG. 42 as being arranged sequentially along the X-direction. Similarly, the projected solid angle $\Omega_1$, $\Omega_2$, $\Omega_3$ associated with the three locations 260, 262, 264, progressively increases such that light is dispersed into smaller angles for locations on one side of the diffuser and larger angles for locations on the other side of the diffuser.

Gradation in the scattering characteristics across the diffuser can be useful in various applications. For example, as described above, the imaging optics may possess an f-number or numerical aperture and corresponding collection angle that varies with field. If the illumination is reflected from the liquid crystal spatial light modulator 236 into a constant projected solid angle, the projected solid angle of the illumination may not match the respective collection angle of the imaging optics. The light from some field points on the liquid crystal modulator 236 may fill the aperture of the imaging optics; however, the light from other field points may fail to fill the corresponding aperture of the imaging optics.

For displays such as head-mounted including helmet-mounted displays, the aperture of the imaging optics preferably maps to the pupil of the eye 12. If the aperture of the imaging optics is under-filled, slight movement of the eye pupil may cause dramatic drop off in light received by the retina. Increased tolerance is therefore desirable as the eye and head of the viewer may move laterally shifting the location of the eye pupil.

Overfilling is a possible solution. The projected solid angle into which the spatial light modulator emits light may fill the aperture of the imaging optics in each case, overfilling the aperture for some field points. This latter approach, however, is less efficient as light outside the aperture is discarded. Moreover, light that is outside the aperture of the imaging optics may not be absorbed and can scatter back into the field-of-view, reducing the image contrast.

Accordingly, in various preferred embodiments, the projected solid angle into which light propagates from the spatial light modulator 236 is substantially matched to the corresponding collection angle of the imaging optics. For example, in cases where the f-number of the imaging optics varies with field position, the projected solid angle associated with the output of the liquid crystal modulator 236 is preferably field-dependent as well. A graded diffuser such as described above can provide this effect. The diffuser 240 preferably scatters light into projected solid angles that increase in size across the diffuser. This light illuminates the reflective spatial light modulator 236. The light is reflected from the liquid crystal modulator 236 into projected solid angles that increase across the spatial light modulator. Preferably, these increasing projected solid angles substantially match the collection angles of the imaging optics, which also increase with field position. If the projected solid angles for the various points on the spatial light modulator 236 are substantially equivalent to the respective collection angles of the imaging optics, the aperture of the imaging optics will be efficiently filled for each particular field location.

Figure 39:
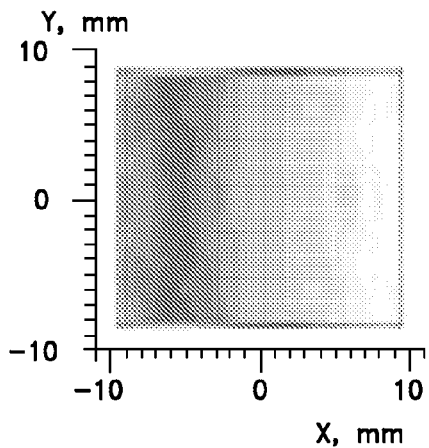
FIG. 39 shows graded illuminance across the spatial light modulator.
Figure 40:
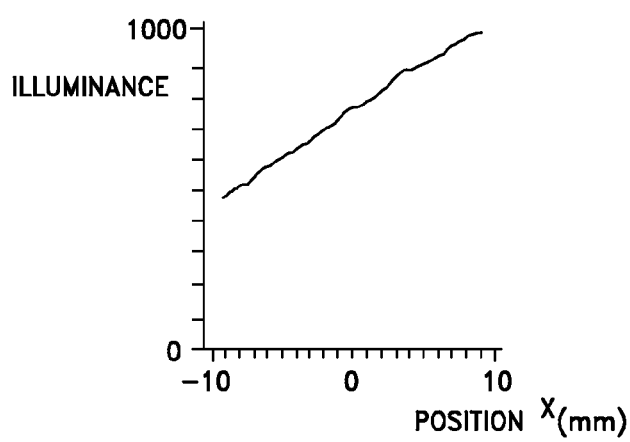
FIG. 40 is a plot on axis of illuminance versus position (Y) showing that the illuminance across the spatial light modulator increases from one side to another.

In various preferred embodiments, non-uniform, and more specifically graded illumination such as provided by the off-axis illumination configuration shown in FIG. 38 is combined with a graded diffuser having scatter properties that progressively vary with transverse location across the diffuser. Graded illuminance is illustrated in FIGS. 39 and 40. Such an illuminance distribution across the diffuser can be paired with an increasingly large projected solid angle into which the diffuser 240 scatters light. Preferably, this combination provides substantially constant luminance as higher illuminance and wider projected solid angles can be selected to yield substantially the same luminance as lower illuminance and corresponding narrower projected solid angles.

In the example shown in FIG. 42, light incident on the first location 260 has an illuminance $I_1$ and is scattered into the first projected solid angle $\Omega_1$ to produce a resultant luminance $L_1$. Light incident on the second location 262 has an illuminance $I_2$ and is scattered into the second projected solid angle $\Omega_2$ to yield luminance $L_2$. Light incident on the third location 264 has an illuminance $I_3$ and is scattered into the third projected solid angle shown $\Omega_3$ thereby providing a resultant luminance $L_3$. In this case, the illuminance increases progressively with lateral position across the diffuser 240 such that $I_1 < I_2 < I_3$. Similarly, the projected solid angle $\Omega_1, \Omega_2, \Omega_3$ associated with the three locations 260, 262, 264, is progressively wider. Accordingly, less light is distributed over a smaller range of angles while more light is distributed over a wider range of angles. In certain embodiments, for example, the projected solid angle may range from 0 to $\pi$ radians across the diffuser. The ratio of projected solid angles from one end of the diffuser to another end of the diffuser used to illuminate the spatial light modulator may range, for example, from 2:1 to 6:1. Values outside these ranges, however, are possible. Substantially constant luminance across the diffuser 240 can thereby be achieved if the illuminance (e.g., $I_1, I_2, I_3$) and projected solid angles (e.g. $\Omega_1, \Omega_2, \Omega_3$) are appropriately matched. $L_1$, $L_2$, and $L_3$ are therefore preferably substantially equal.

Figure 43:
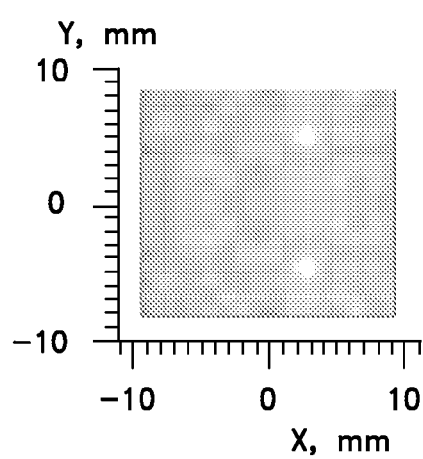
FIG. 43 is a plot of luminance across the spatial light modulator, which is substantially constant from one side to another.
Figure 44:
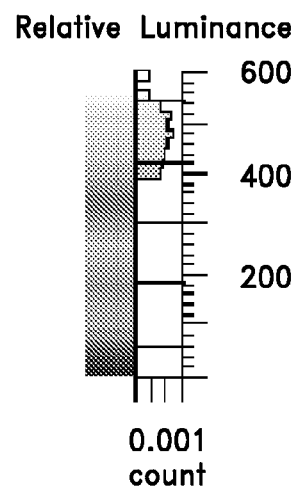

A plot of the substantially constant luminance at the spatial light modulator 236 is shown in FIG. 43. The luminance of the spatial light modulator 236 may, for example, be about 10 nits to 150 nits, depending possibly on the application and/or system design. These values correspond to the luminance at the eye. Luminance at the LCD are preferably higher to compensate for losses in the imaging optics. FIG. 44 is a histogram of luminance (in nits) that illustrates that the luminous flux per area per steradian values received over the spatial light modulator 236 are largely similar. The variation in luminance, for example, may be less than 10% across small regions of the display or 50% between any two points in the display. Different specifications of the variation may be employed for different applications. For example, in some embodiments, the luminance at the LCD preferably does not vary by a factor greater than about 1.5. The spatial light modulator 236 therefore preferably appears to have a constant luminance at the different positions thereon (assuming the liquid crystal is not modulated to produce an image or pattern). Absent this combination, the display, projector, or other optical system may appear to the viewer to be non-uniformly lit.

Figure 45:
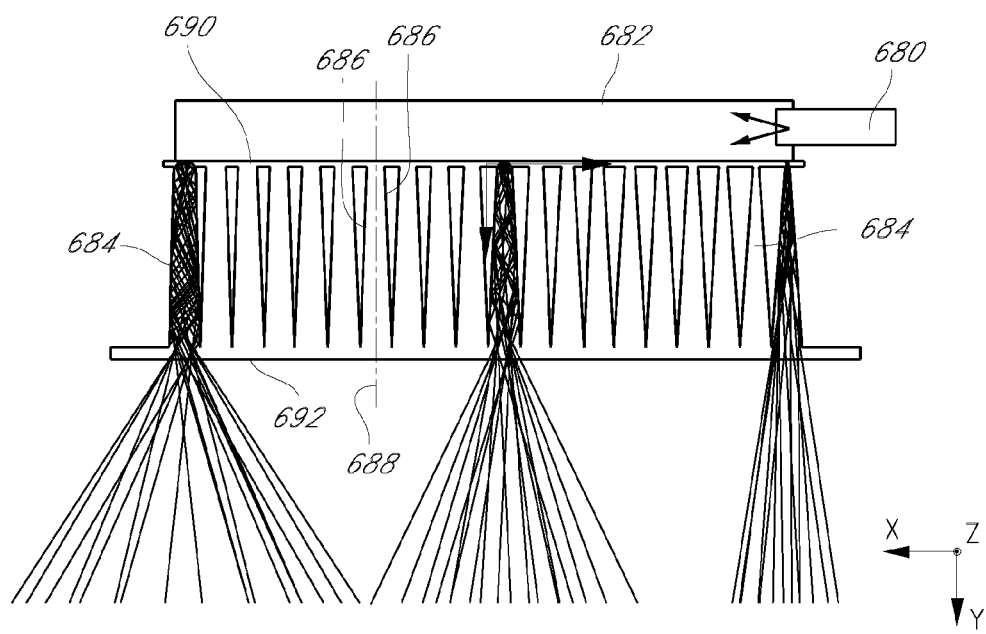
FIG. 45 is a cross-sectional view schematically showing a light box and a plurality of compound parabolic collectors optically connected thereto to couple light out from the light box.

Other configurations for providing non-uniform illumination and uniform luminance may be employed. In FIG. 45, for example, a light pipe 680 feeds into a light box 682 optically coupled to a plurality of angle area converters such as compound parabolic collectors (CPCs) 684 disposed across the light box. This light box 682 typically comprises a chamber defined, for example, by diffusely reflecting sidewalls or textured surfaces. Such lightboxes are similar to those used as LCD backlights for direct view applications. The angle area converters, are disposed on one of the sidewalls. Twenty exemplary angle area converters 684, here compound parabolic collectors 684, are shown. In the embodiment shown, each of these collectors 684 comprises a pair of parabolic reflectors 686 oppositely situated along an optical axis 688 through the respective angle area converters 684. The pair of spaced apart parabolic reflectors 686 define input and output apertures 690, 692 and numerical apertures. In the embodiment shown in FIG. 45, the input apertures 690 and numerical apertures for the plurality of angle area converters 684 increases with longitudinal position (in the X direction) across the light box 682. The numerical aperture also increases although the output aperture is substantially the same for the plurality of angle area converters 684.

FIG. 45 is a cross-sectional view, and thus the sidewalls of the light box 682 as well as the angle area converters 686 extend into the Z direction as well. Accordingly, the angle area converters 684 are symmetrical about a plane that corresponds to the optical axis 688 shown in the cross-section of FIG. 45. The light box 682 and plurality of angle area converters 688 are disposed in front of one of the input faces of the V prism.

As illustrated by arrows, the light pipe 680 couples light into the light box 682. This light exits the light box 682 through the plurality of angle area converters 684. The different numerical apertures and different apertures 690 control the illumination in the lateral (X) direction as well as the projected solid angle into which the light is output.

Accordingly, the angle area converters convert increased area at the input into increased numerical aperture at the output. The increased numerical aperture at the output is useful for matching to increasing f-number with position across the field. To provide constant luminance, more light is collected with increased input aperture to accommodate increased numerical aperture at the output.

The compound parabolic collectors work well as angle area converters 684 with the light box 682. The luminance into the compound parabolic collectors equals the luminance out of the compound parabolic reflector. The f-number is controlled by using a different compound parabolic reflector input size. As the input sizes vary across the light box 682, gaps between the CPC prevent light from immediately exiting the light box 682, however, this light is reflected back into the light box and recycled for subsequent egress through the compound parabolic collectors. Gaps between the output apertures of the CPCs may, however, introduce variation in the "average" spatial luminance across the field.

Accordingly, the plurality of angle area converters 684 can control the illumination that reaches the input face of the V-prism. In certain preferred embodiments, the illuminance and projected solid angle vary to provide substantially constant luminance. Although the plurality of angle area converters 684 may be selected to provide non-uniform illuminance and uniform luminance, other designs are possible where uniform illuminance and/or non-uniform luminance is provided. Other types of configurations may also be employed. Components other than light boxes and angle area converters may also be employed in other embodiments. Other types of angle area converters different from compound parabolic collectors may also be employed. A lens array comprising a plurality of lenses having increasing numerical aperture may be employed in certain embodiments.

Implementations for illuminating displays, projectors, and other optical systems should not be limited to those embodiments specifically shown herein. For example, the various components specifically described may be included or excluded and their interrelationship may be altered. For instance, configurations for providing non-uniform illumination at the diffuser 240 other than the off-axis scheme depicted in FIG. 38 may be employed. The diffuser 240 may comprise devices well-known in the art such as diffractive optical elements, holographic optical elements, holographic diffusers as well as structures yet to be devised. Also, although embodiments are depicted that include a "V" prism 202 having two ports 208, 210, other beamsplitting elements may be employed and the number of input ports need not be limited to two. The system may include one or more input ports. Other techniques for directing the illumination onto the spatial light modulator 236 may also be employed as well although polarization beamsplitters 202 such as the "V" prism offer some advantages. Various configurations and approaches for providing composite colored images are possible.

Moreover, controlling the illumination incident on a diffuser 240 having variable scattering properties at different locations may be a powerful tool in improving optical properties of displays, projectors, and other optical systems. Although described here in connection with providing constant luminance, the scattering may be adjusted otherwise to provide the desired non-constant luminance profile. Other variations are possible as well. Accordingly, the illumination and the scattering or light dispersing features of the diffuser 240 may be different.

Figure 46:
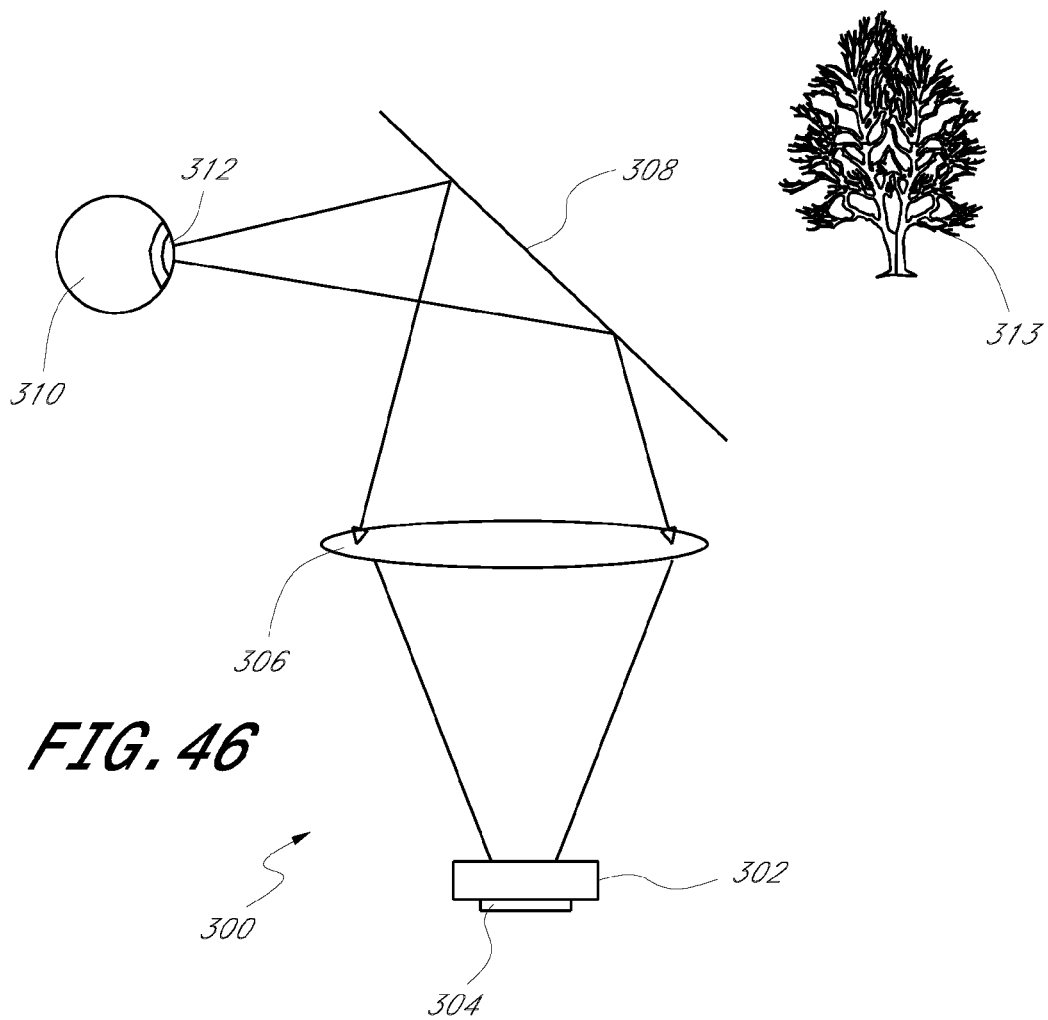
FIGS. 46-56 are schematic representations of displays such as head mounted displays.

An example of a display device 300 such as a helmet mounted display or, more broadly, a head mounted display that includes a polarization beamsplitter such as a "V" prism 302 is shown in FIG. 46. The display comprises a liquid crystal spatial light modulator 304 proximal the "V" prism 302. An optical path extends from the spatial light modulator 304 through the "V" prism 302 and imaging or projection optics 306 and reflects off a combiner 308 to a viewer's eye 310, which includes a pupil 312. The combiner 308 folds the image projected by the imaging optics 306 into the eye 310. The combiner 308 may be at least partially transparent such that the viewer can see both the surrounding environment 313 as well as the images and patterns created by the spatial light modulator 304. The combiner 308 may comprise, for example, a visor mounted on a helmet. The combiner 308 can be used for head mounted displays that are not transparent such as may be used in immersive virtual reality. The combiner 308 shown in FIG. 46 is substantially planar.

Figure 47:
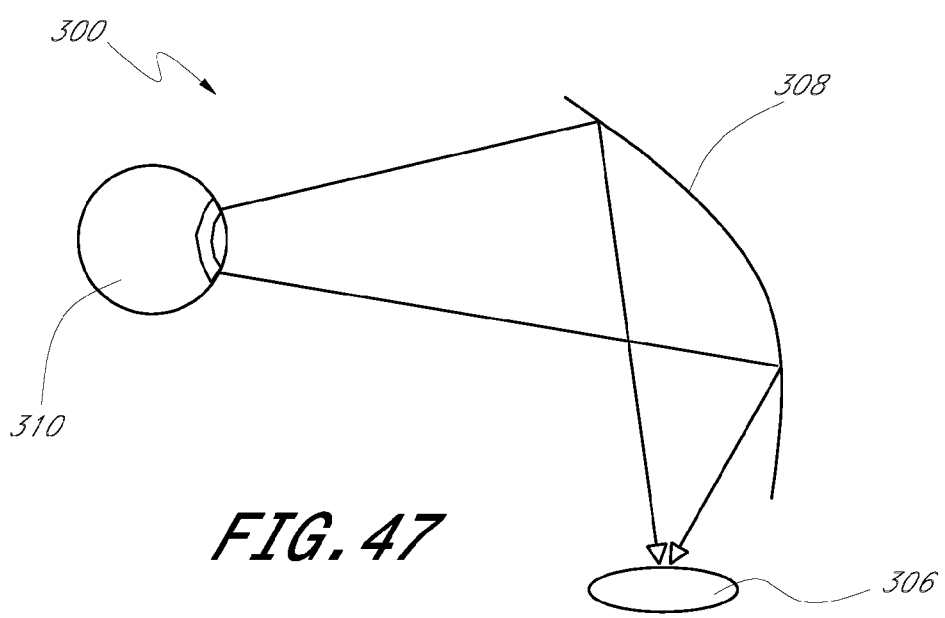

A display 300 having a concave combiner 308 is shown in FIG. 47. This combiner 308 has convergent optical power to image the exit pupil of the projection optics 306 onto the eye pupil 312 of the wearer. Such a combiner 308 may reduce the aperture size and thus the size and weight of the imaging optics 306 as shown. A wide field-of-view may also be provided with the powered optical combiner 308 as part of an optical relay.

Figure 48:
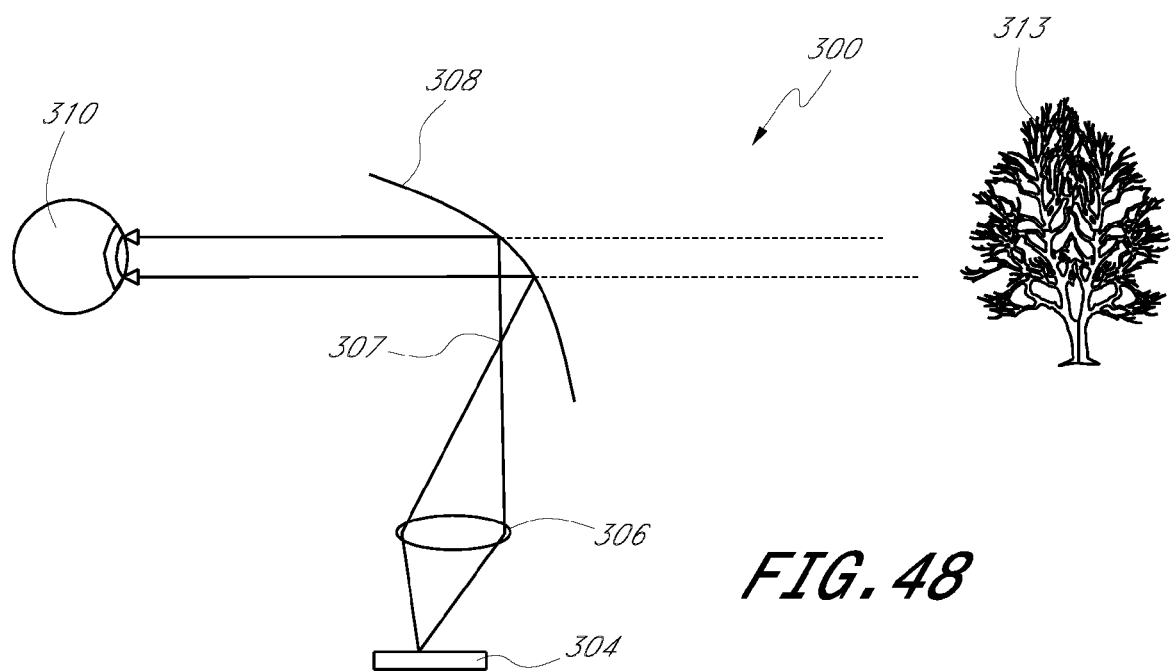

A display 300 that projects the image produced by the spatial light modulator 304 at (or near) infinity is shown in FIG. 48. An intermediate projected image 307 is shown located between the projection optics 306 and the combiner 308. A virtual image of the projected images 307 is produced by the combiner 308 at (or near) infinity, e.g., at a large distance which is comfortable for viewing by the eye 310. Accordingly, the rays (indicated by dashed lines) are depicted as being substantially collimated. This combiner 308 may be partially or totally reflective.

Figure 49:
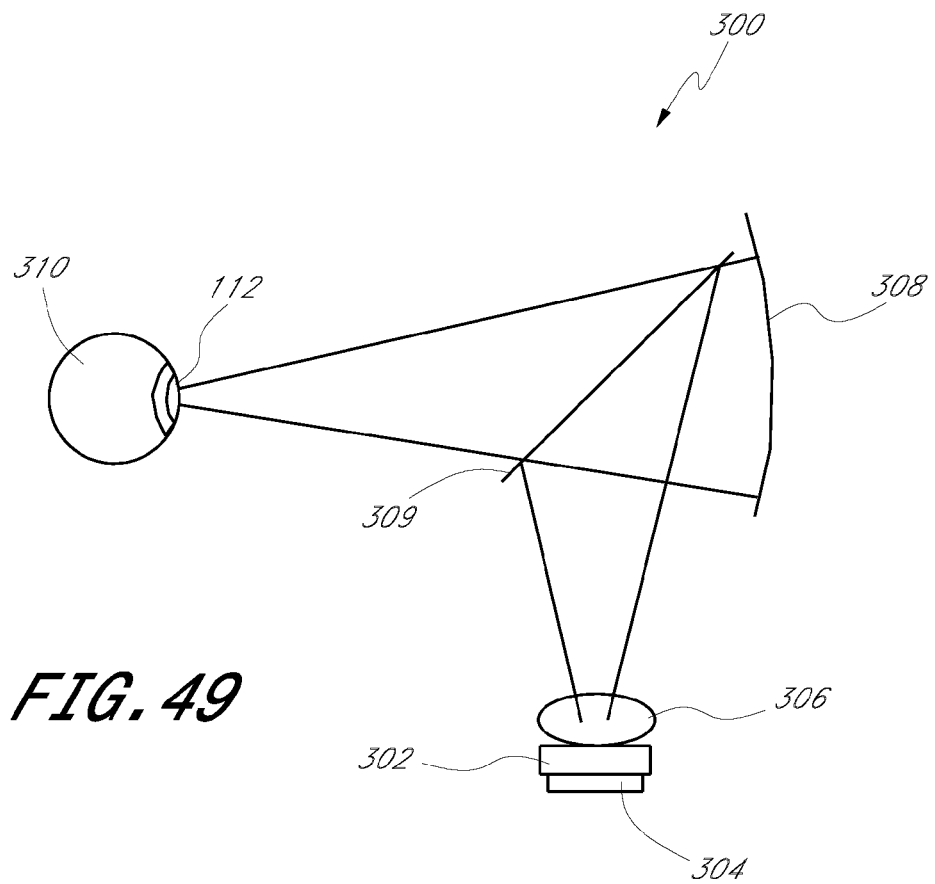

A display 300 having a powered on-axis combiner 308 that forms an image of the exit pupil of the imaging optics 306 at the eye pupil 112 is shown in FIG. 49. A beamsplitter 309 directs the beam from the projector optics 306 to the combiner 308. The combiner 308 shown is circularly or rotationally symmetric about the optical axis passing through the combiner 308. Similarly, a central ray bundle strikes the on-axis optical combiner 308 at an angle of zero. Another type of on-axis combiner is flat. The combiners 308 in FIGS. 47 and 48 are off-axis combiners and are not circularly symmetric about the respective optical axes passing therethrough.

On-axis combiners have the advantage of being rotationally symmetric about the central ray bundle; as a consequence, aberrations introduced by the combiner may be corrected in the projection optics using surfaces that are also rotationally symmetric about the central ray bundle. The drawback of an on-axis combiner is that a beamsplitter is also employed, and thus the configuration is heavier and bulkier.

Off-axis combiners are lightweight; however, because the light reflects obliquely from a powered reflecting surface, larger amounts of aberration (chiefly, astigmatism) may be generated in both the image of the pupil (see FIG. 47) and in the intended display image (see FIG. 48). To reduce these aberrations, the combiner surface can be made aspheric, for example, as a toroidal surface, anamorphic surface, or other type of surface.

Preferably control is provided for both the aberrations of the image as well as the aberrations of the pupil. If the pupil image is substantially uncorrected, for example, the caustic (region where the rays cross) near the pupil may be large such that large-diameter optics are preferably used to intercept the rays. In addition, the aberrations of the pupil are not entirely separable from those of the image. If, for example, the ray bundles for some of the image field locations have crossed before reaching the imaging optics, and others have not, then the imaging optics are presented with the field positions in a "scrambled" order, and performing image correction may be difficult.

In one preferred embodiment, a combiner having a conic surface and more specifically an ellipsoid of revolution may be employed. Preferably, this ellipsoid has one of two conic foci located at or near the eye of the wearer, and the other conic focus located at or near the pupil of the projection optics.

Such a design provides several advantages. Since the conic surface is a surface of revolution, this surface may be fabricated through single-axis diamond turning. If the part is to be made in mass-production using an injection molding, compression molding, or casting, then the mold inserts may be made by injection molding. Also, if one conic focus is at the eye and the other conic focus is at the pupil of the projection optics, then spherical aberration of the pupil may be substantially reduced or eliminated. In addition, the central rays for all the points in the field preferably cross at the center of the pupil, and the "scrambling" described above is thereby substantially reduced or eliminated. Also astigmatism in the image is reduced, since a conic surface does not introduce astigmatism when one of the foci is placed at the pupil.

Figure 50:
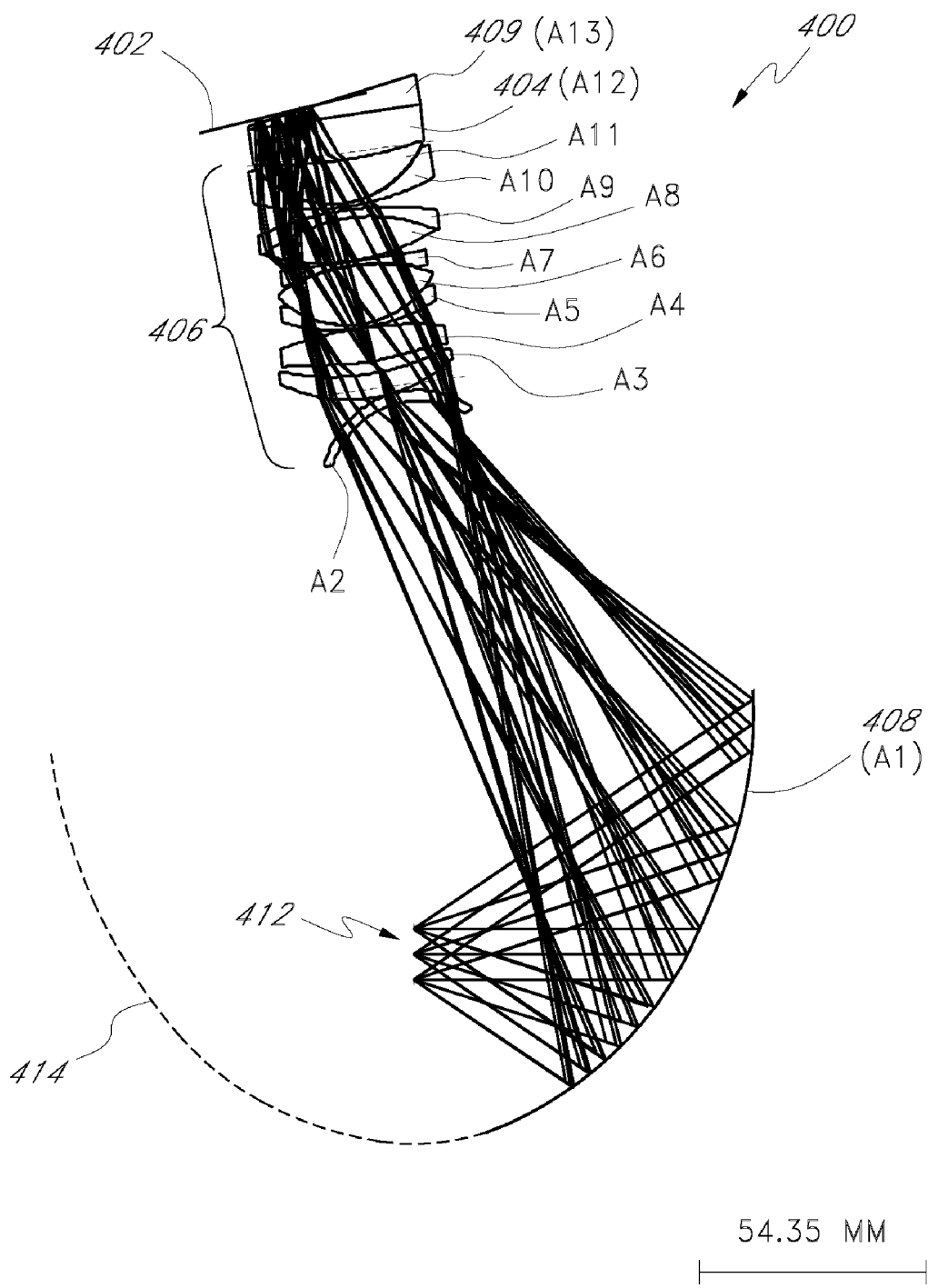

FIG. 50 shows an exemplary display device 400 comprising a spatial light modulator 402, a beamsplitter 404 such as a "V" prism for illuminating the spatial light modulator, imaging optics 406, and a combiner 408. The display device 400 may comprise a head-mounted display such as a helmet-mounted display. Accordingly, the combiner 408 combines images formed using the spatial light modulator 402 with the forward field-of-view of the wearer's eye. The "V" prism 404 may comprise high index flint to reduce the size and weight of the system 400. The display device 400 further includes a wedge 409 between the "V" prism 404 and the spatial light modulator 402 as described above. The wedge 409 may comprise a high index crown to effectively control the aberrations, while minimizing the size and weight of the system 400. The combiner 408 is an "elliptical" combiner conforming to the shape of an ellipsoid (shown in cross-section as an ellipse 414). One of the foci of the ellipse is at the stop, which preferably corresponds to the pupil of the eye.

A prescription for one preferred embodiment of the display device 400 is presented in TABLES I and II wherein the optical parameters for optical elements A1 to A13 are listed. These optical parameters include radius of curvature, thickness, material, as well as terms, where appropriate, defining aspheric curvature, tilt, and decenter. The radius of curvature, thickness, and decenter data are in millimeters. As is well known, aspheric surfaces may be defined by the following expression:

$$A\rho^4 + B\rho^6 + C\rho^8 + D\rho^{10} + E\rho^{12} + F\rho^{14} \ldots$$

where $\rho$ is the radial dimension. Non-zero values for one or more of these constants A, B, C, D, etc. are listed when the surface is aspheric. Additionally, the conic constant, k, may be provided when the surface is a conic surface. Tilt about the X axis as well as decenter in the Y and Z directions are also included for some of the surfaces in TABLE II.

The imaging optics 406 comprises ten refractive lenses A2-A11, each of which comprises glass. The imaging optics 406 comprises two groups. The first group comprises the single lens A2. The second group comprises the remaining lenses, A3-A11. The field aberrations from the elliptical combiner A1 are partially cancelled by the lenses A2 in the first group, which is a low index meniscus lens and which does not share the axis of the group of lenses A3-A10 in the second group or of the combiner. In particular, the meniscus lens A2 is tilted and/or decentered with respect to the remainder of the lenses A3-A11 in the optical system and the V-prism A12. Accordingly, this tilted lens A2 has a first optical axis about which the lens is circularly symmetric. Similarly, the plurality of lenses A3-A11 in the second group has a corresponding second optical axis about which the lenses are circularly symmetric. The two optical axes, however, are different and non-parallel. Preferably, only one lens (in the first group) is tilted with respect to the other lenses (in the second group) although in other embodiments the first group comprises more than one lens aligned along the first optical axis.

One of these lenses A4 comprising the imaging optics 406 has an aspheric shaped surface. This aspheric surface is near an intermediate pupil to provide for spherical aberration correction. Color correction is provided by the cemented doublets A5/A6, A8/A9, and A10/A11.

The entrance pupil diameter for this system is 15.0 millimeters. The field-of-view is evaluated between 50 to −15 degrees along the horizontal axis and 25 to −25 degrees along the vertical axis. The imaging optics 406 has an exit pupil that is imaged by the combiner 408 to form a conjugate pupil 412 where the eye pupil (not shown) may be placed.

Figure 51:
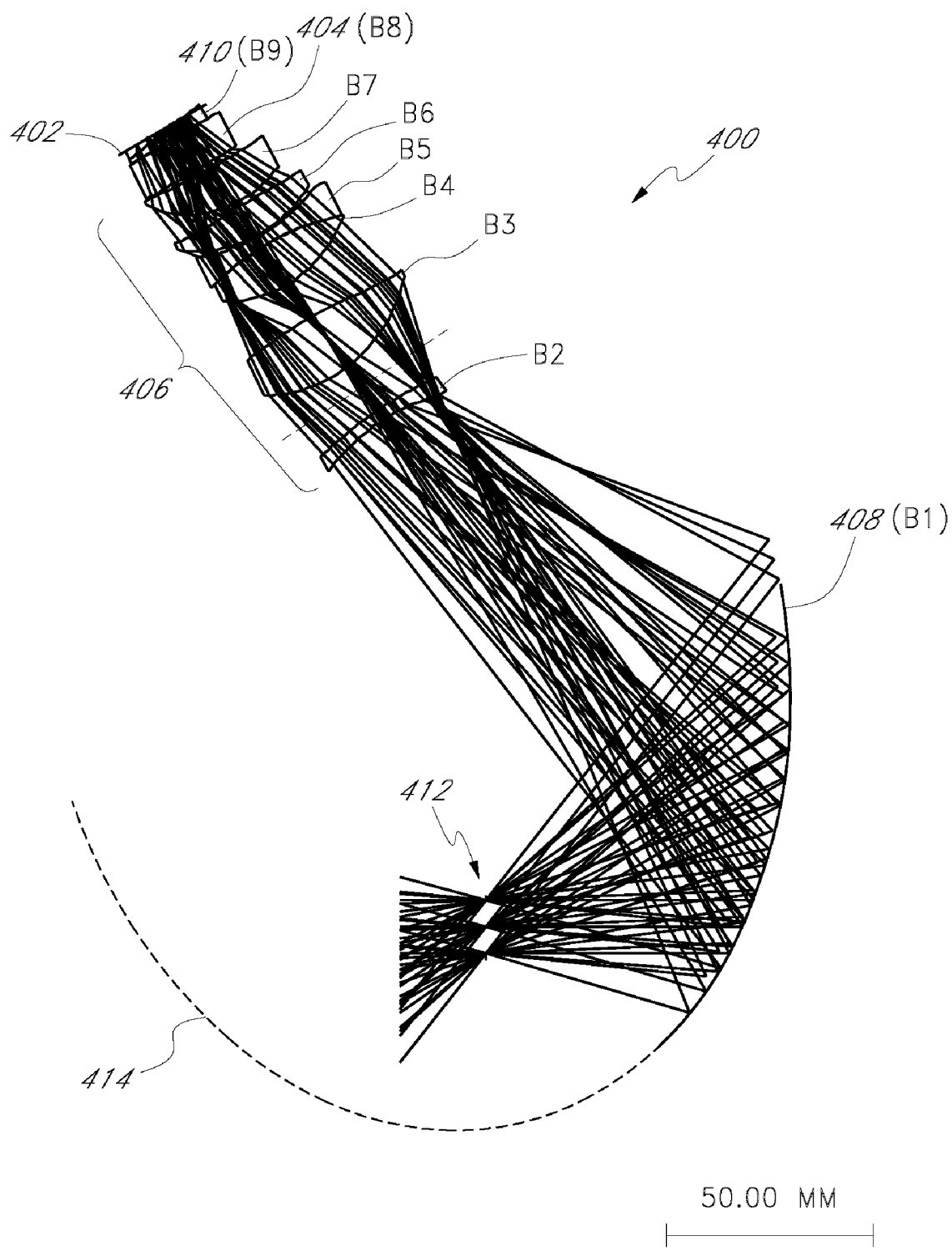

FIG. 51 shows another embodiment of the display device 400. A prescription for one preferred embodiment of this display device 400 is presented in TABLES III and IV. The optical parameters for nine optical elements B1 to B9 are listed. One of the optical elements B1 corresponds to the reflective combiner 408. One of the optical elements B8 corresponds to the V-prism 408, and one of the optical elements B9 corresponds to the wedge 410. The imaging optics 406 comprises the remaining six optical elements B2-B7, each a refractive lens. The imaging optics 406 is split into a first group comprising the first lens B2 and a second group comprising the remaining five lenses B3-B7.

Like the system 400 in FIG. 50, the combiner 408 is an "elliptical" combiner conforming to the shape of an ellipsoid (shown in cross-section as an ellipse 414). In this embodiment, however, two of the lenses B3 and B6 are plastic. These elements comprise Zeonex 1600R (Z-1600R) available from Zeon Chemicals L.P., Louisville, Ky. Plastic lenses can be fabricated in high volumes at lower cost than glass lenses. Plastic lenses are also lighter. The remaining refractive optical components B2, B4, B5, B7, B8, B9, comprise optical glass. The "V" prism 404 (B8) comprises high index flint to reduce the size and weight of the system 400. The wedge 409 between the "V" prism 404 and the spatial light modulator 402 comprises high index crown to effectively control the aberrations, while minimizing the size and weight of the system 400. Both of the plastic lenses B3, B6 have aspheric surfaces. One of the lenses B2 is also tilted and decentered with respect to the other lenses B3-B9. Like the system 400 in FIG. 51, the lens in the first group B2, a meniscus lens, is symmetrical about a first optical axis. The remaining lenses B3-B9, which are in the second group, are symmetrical about a second optical axis. These two optical axes, however, are different. Advantageously, this optical system also has only nine optical elements B1-B9, six of which are lenses. The imaging system 406 comprises a cemented doublet B4/B5 for color correction. The aspheric surface on B6 is near the "V" prism to correct for astigmatism and coma. The aspheric surface on B3 is near an intermediate pupil to provide for spherical aberration correction. The field aberrations from the elliptical combiner B1 are partially cancelled by the low index meniscus lens B2 which, as discussed above, does not share the axis of the first group of lenses B3-B7 nor that of the combiner. Some of the edges of a number of the lenses B3, B4, B6, B7, are cut off to reduce the weight of the system 400. The entrance pupil diameter for this system is 15.0 millimeters. The field-of-view is evaluated between 50 to −15 degrees along the horizontal axis and 25 to −25 degrees along the vertical axis.

Figure 52:
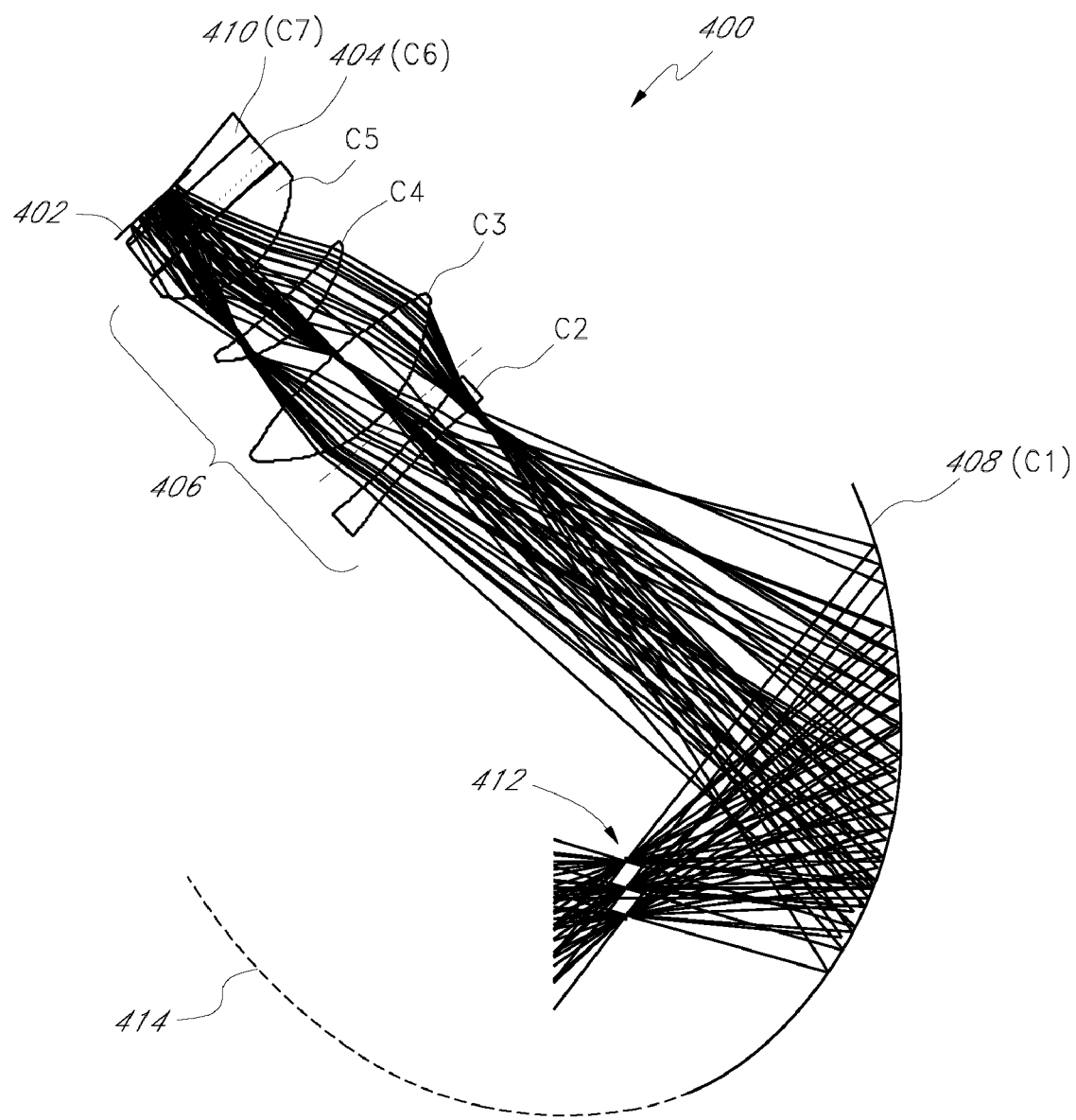

FIG. 52 shows another embodiment of the display device 400. A prescription for one preferred embodiment of this display device 400 is presented in TABLES V and VI. This optical system has a reduced number of optical elements. The optical parameters for nine optical elements B1 to B9 are listed. One of the optical elements B1 corresponds to the reflective combiner 408. One of the optical elements C6 corresponds to the V-prism 408, and one of the optical elements C7 corresponds to the wedge 410. The imaging optics 406 comprises the remaining four optical elements C2-C5, each a refractive lens. This decreased number of lens C2-C5 advantageously reduces the weight and cost of the optical system 400. The lenses C2-C5 are grouped into a first group and a second group. The first group comprises the first lens C2 and the second group comprises the three remaining lenses C3-C5. In other embodiments, the first group may comprise more than one lens, although a single lens element is preferred.

Like the systems 400 in FIGS. 50 and 51, the combiner 408 is an "elliptical" combiner conforming to the shape of an ellipsoid (shown in cross-section as an ellipse 414). In this embodiment, however, each of the four powered elements C2-C5 is plastic. These elements C2-C5 comprise acrylic (PMMAO), Zeonex 480R (Z-480R), and Zeonex 1600R (Z-1600R). Z-480R and Z-1600R are available from Zeon Chemicals L.P., Louisville, Ky. Other plastic and non-plastic materials may be used as well. Plastic lenses, however, can advantageously be fabricated in high volumes at lower cost than glass lenses. Plastic lenses are also lighter. The "V" prism comprises a high index flint to reduce the size and weight of the system. The wedge between the "V" prism 404 and the spatial light modulator 402 comprises a high index crown to effectively control the aberrations, while minimizing the size and weight of the system.

Each of the lenses C2-C5 in the imaging system is aspheric to correct for monochromatic aberrations. One of the lenses C2 is also tilted and decentered with respect to the other three lenses C3-C5. Like the system 400 in FIGS. 50 and 51, the lens C2 in the first group, a meniscus lens, is symmetrical about a first optical axis. The remaining lenses C3-C5, which are in the second group, are also symmetrical about a second optical axis. The first and second optical axes are oriented differently. The optical elements C3-C5 in the second group each comprises a plastic flint. One lens C4 in the second group comprises a diffractive element for color correction. This diffractive element, a hologram, is characterized by the following expression:

$$\phi = c_1 \rho^2 + c_2 \rho^4 \ldots$$

where $\phi$ is the phase shift imparted on the wavefront passing through the diffractive features on this optical element C4, $\rho$ is the radial dimension, and $c_1$ and $c_2$ are constants. The values of $c_1$ and $c_2$ are $-7.285 \times 10^{-4}$ and $-1.677 \times 10^{-7}$, respectively. The diffractive optical element is designed to use the first order ($m = ^+1$) at a wavelength of about 515 nanometers. The field aberrations from the elliptical combiner are partially cancelled by the low index lens in the first group, which does not share the same optical axis as either of the second group of lenses in the imaging optics 406 or of the combiner 408. The entrance pupil diameter for this system is 15.0 millimeters. The field-of-view is evaluated between 50 to −15 degrees along the horizontal axis and 25 to −25 degrees along the vertical axis.

Other designs may be used as well. For example, variations in the number, shape, thickness, material, position, and orientation, are possible. Holographic or diffractive optical elements, refractive and/or reflective optical elements can be employed in a variety of arrangements. Many other variations are possible and the particular design should not be limited to the exact prescriptions included herein.

Various preferred embodiments, however, employ combiners having a shape in the form of a conic surface. Conic surfaces are formed by generating a conic section, a particular type of curve, and rotating the curve about an axis to sweep out a three-dimensional surface. The shape of a conic surface is determined by its conic constant, k. The conic constant, k, is equal to the negative of the square of the eccentricity, e, of the conic curve in two dimensions that is rotated to form the three-dimensional surface. Conic surfaces are well know and are described, for example, in "Aspheric Surfaces", Chapter 3 of Applied Optics and Optical Engineering, Vol. VIII, R. Shannon and J. Wyant, ed., Academic Press, New York N.Y. 1980.

An ellipsoid (also known as a prolate spheroid) is formed by rotating an ellipse about an axis, referred to as a major axis, which joins two conic foci. The conic constant for an ellipsoid has a value between zero and −1. A sphere is a special case of an ellipsoid, with a conic constant of zero. A hyperboloid is formed in a similar manner, however, the value of the conic constant is more negative than −1. A paraboloid has a conic constant of exactly −1, and is formed by rotating a parabola about an axis that is perpendicular to a line referred to as a directrix of the parabola and a point on the axis, the focus of the parabola. An oblate spheroid has a positive conic constant. In various preferred embodiments, the conic constant is between about −0.25 and 0, or 0 and −0.60, and may be between about −0.36 and 0, or 0 and −0.44.

In various preferred embodiments for eliminating spherical aberration of the pupil, one conic focus 418 is located exactly at the eye 412 and the other conic focus 420 is located exactly at the pupil 416 of the projection optics 406. The conic constant for this combiner 408 has a conic constant between 0 and −1 and the surface is therefore ellipsoidal. (Since the eye pupil and the projection optics pupil are physically separated, the surface is not spherical.)

Figure 53:
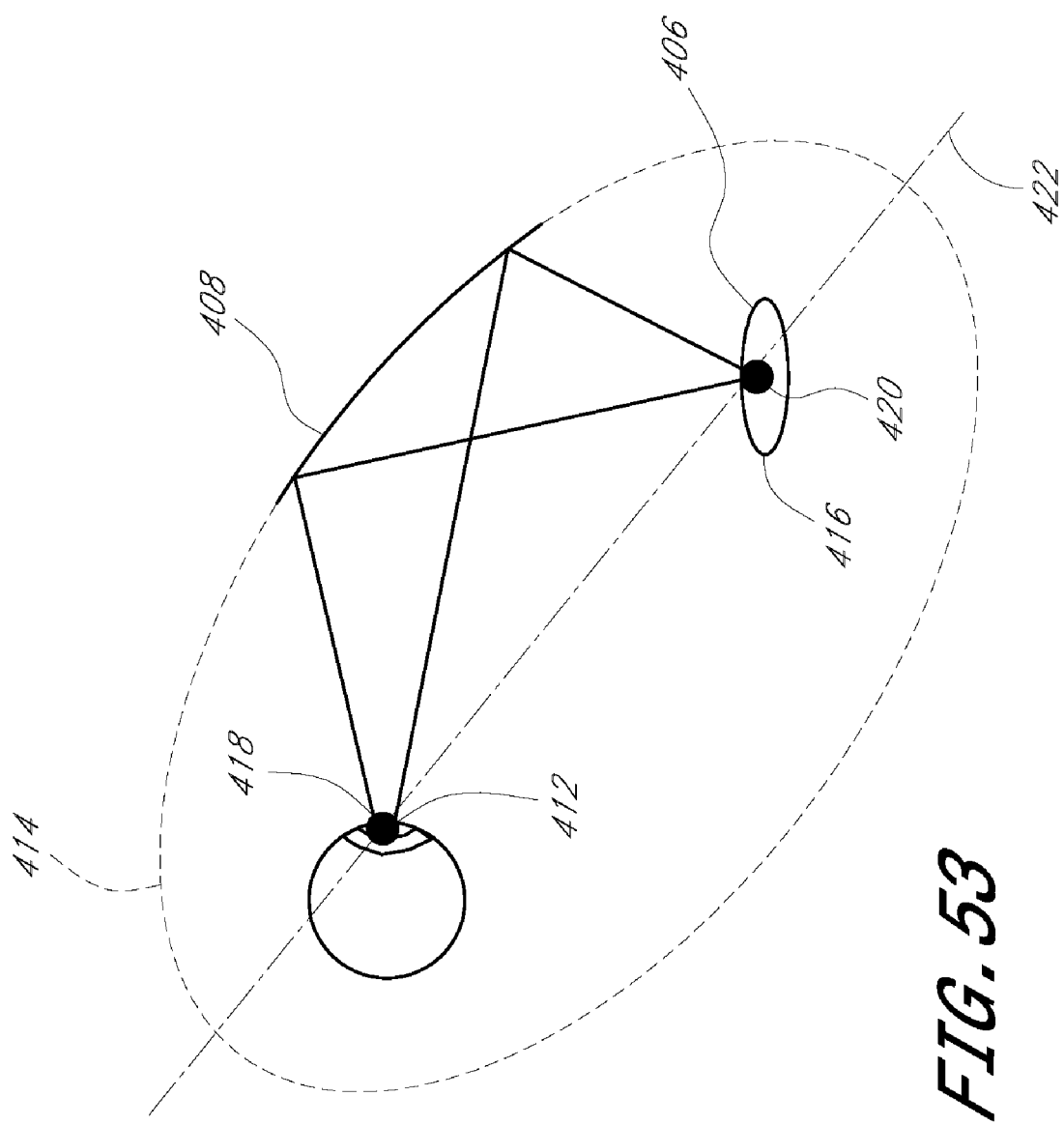

FIG. 53 is a schematic cross-sectional representation of the ellipsoid (shown as an ellipse 414) and the combiner 408 substantially conforming to the shape of the ellipsoid. The ellipsoid includes two foci 418, 420 and a major axis 422 through the two foci. A pupil 412 in the viewer's eye and an exit pupil 416 for the imaging optics 406 are depicted at the two foci 418, 420 of the ellipsoid. In various embodiments, the shape of the combiner 408 substantially conforms to a portion of the ellipsoid 414. In addition, the ellipsoid 414 is positioned with respect to the pupil 412 of the eye and the exit pupil 416 of the imaging optics 406 such that the pupils 412, 416 substantially coincide with the locations of the foci 418, 420 of the corresponding ellipsoid defining the shape of the combiner 408. In such a configuration, the ellipsoidal combiner 408 preferably images the projector pupil 416 generally onto the eye pupil 412.

Figure 54:
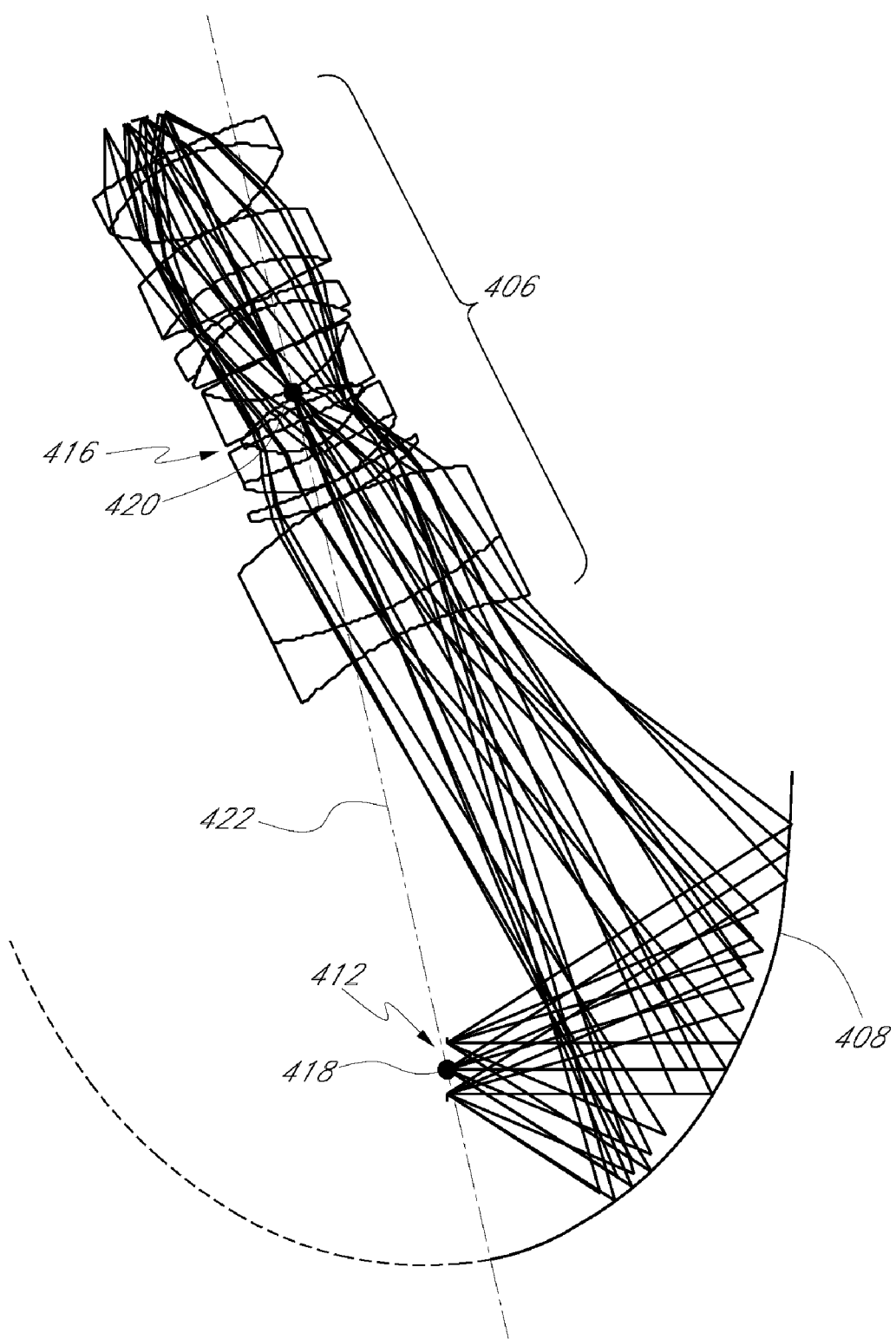

FIG. 54 illustrates another example wherein the combiner 408 conforms to the shape of an ellipsoid and the pupil 412 of the viewer's eye and the exit pupil 416 of the imaging optics 406 substantially correspond to the locations of the foci 418, 420 of the ellipsoid. FIG. 54 also depicts a plurality of lenses comprising the imaging or projection optics 406. The shape of the combiner 408 may deviate from conforming to a portion of an ellipse 414 and the pupils 412, 416 may be shifted with respect to the foci 418, 420. The major axis 422 of the ellipsoid 414 intersects the two foci 418, 420. As shown by the location of beam path reflected from the combiner 408 with respect to the major axis 422 through the ellipsoid, the combiner is an off-axis combiner.

In one preferred embodiment, to eliminate spherical aberration at the center of the field-of-view, a reflective surface having a shape of a paraboloid (formed by rotating a parabola about its axis of symmetry) may be used. Preferably, this rotation axis of the paraboloid defining the reflective surface is substantially parallel to the line-of-sight of the eye at the center of the field. Moreover, the conic focus to the paraboloid is preferably disposed at the image point for that field.

Figure 55:
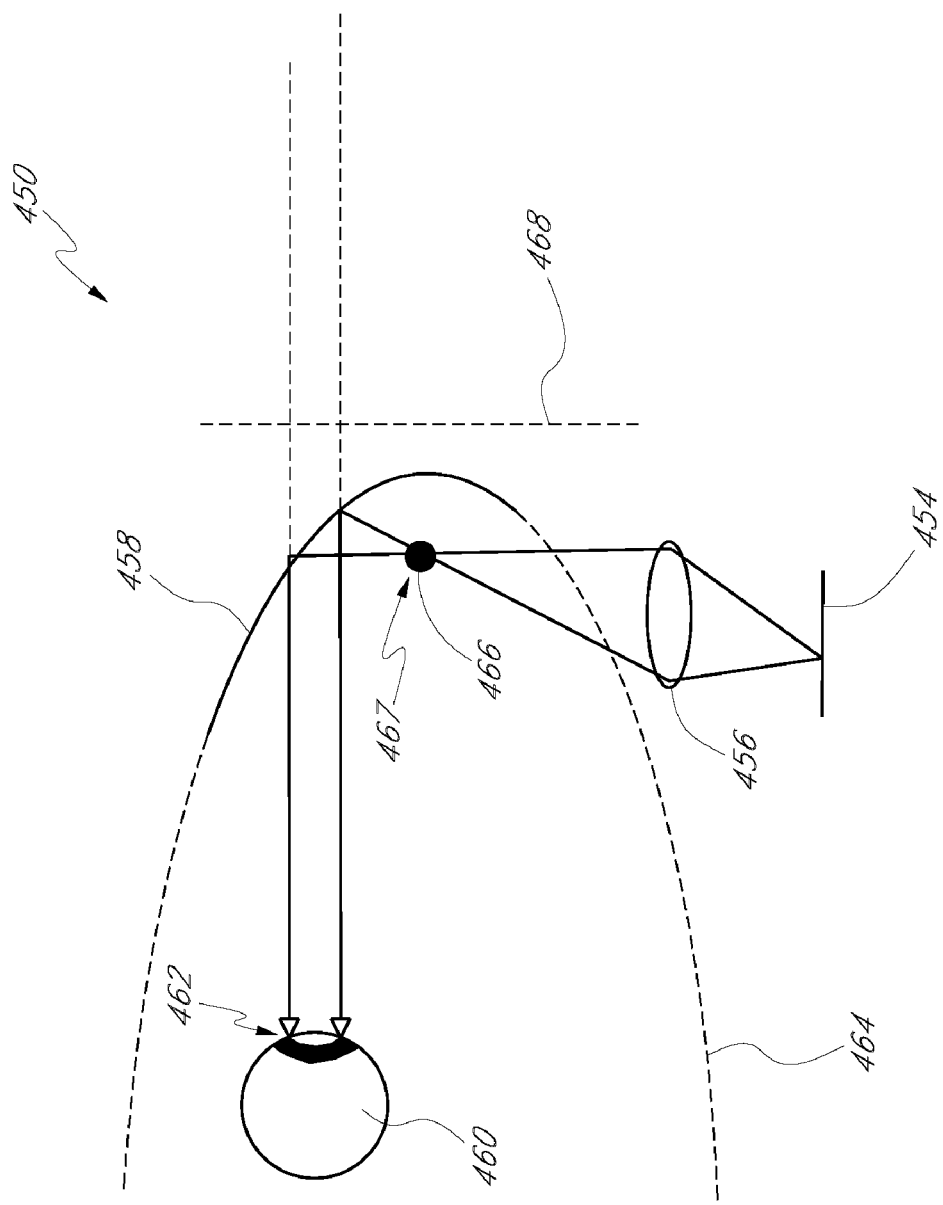

FIG. 55, for example, illustrates another display system 450 comprising an object plane 454, imaging optics 456, and a combiner 458. An optical path extends from the object plane 454, through the imaging optics 456, off the combiner 458 and into an eye 460 with a pupil 462. FIG. 55 depicts a schematic cross-sectional representation of a paraboloid (shown as a parabola 464) and the combiner 458 substantially conforming to the shape of the paraboloid. The paraboloid 464 is defined by a focus 466 and a directrix 468. An intermediate image 467 is at the focus 466 of the parabola 464. In various embodiments, the shape of the combiner 458 substantially conforms to a portion of a paraboloid 464. Additionally, the parabola 464 is positioned such that the focus 466 of the paraboloid 464 defining the shape of the combiner 458 substantially overlaps the intermediate image 467. With such a configuration, the intermediate image 467 is reproduced at or near infinity, e.g., a distance sufficiently far for comfortable viewing of the viewer, as close as several meters to several kilometers as well as outside this range. As discussed above, spherical aberration at the pupil 462 may be reduced with this configuration.

In some embodiments, the goals of simultaneously reducing the aberrations at the pupil and the aberration at the image lead to a conic constant between 0 and −1, which yields an ellipsoid. The conic foci of this ellipsoid are preferably located near, although not coincident with, the eye and the projection optics pupil, respectively. The proximity in relationship with the foci may be selected so as to reduce pupil and image aberration, e.g., as reflected in a merit function used to evaluate different designs. In various preferred embodiments, the exit pupil is at a distance from the one of the foci that is less than about ¼ the distance along the major axis of the ellipsoid that separates the foci.

Figure 56:
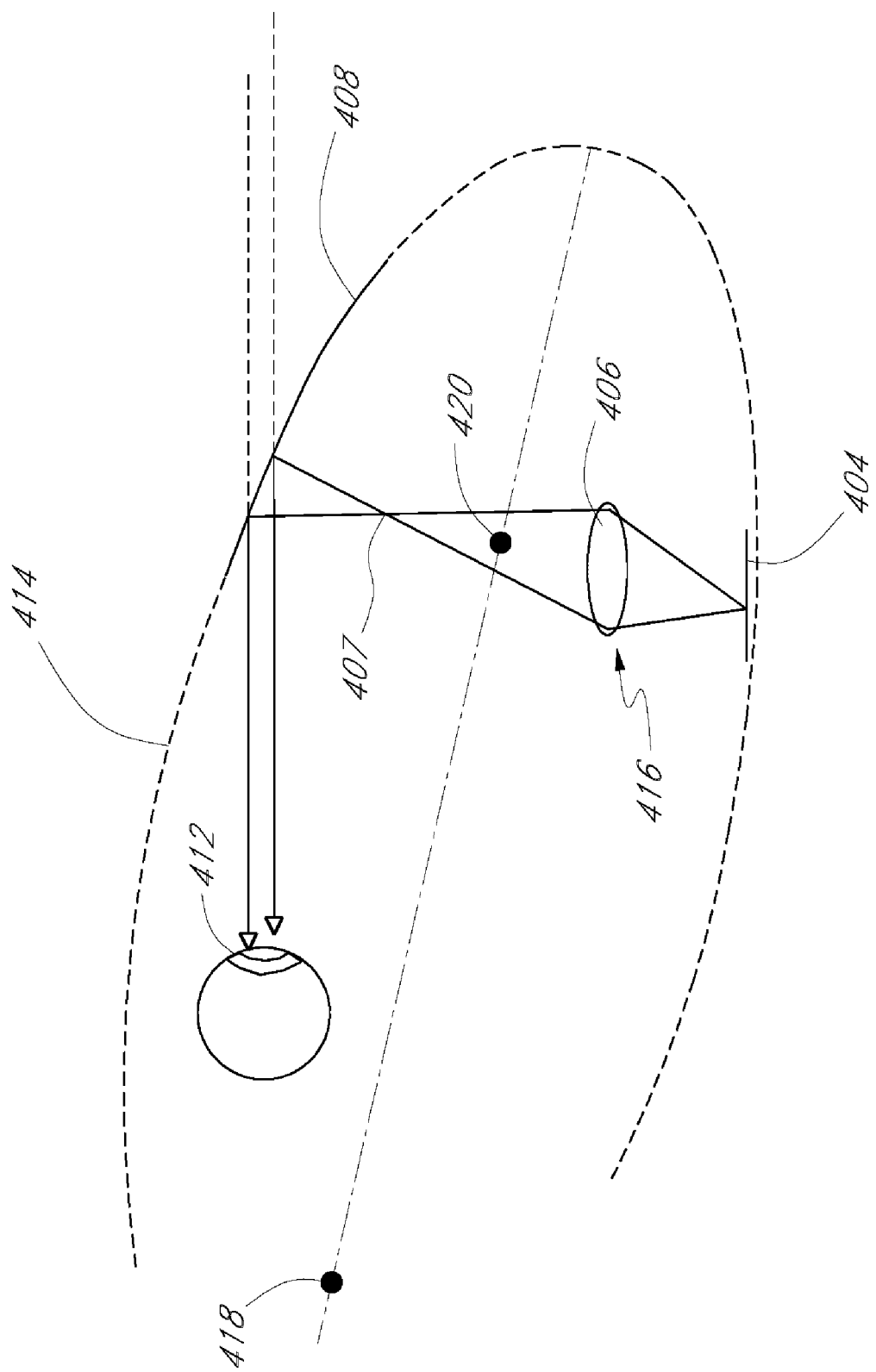

FIG. 56, for example, shows an embodiment wherein the combiner 408 comprises an ellipsoidal surface 414 and the viewer's eye and the exit pupil 416 of the imaging optics 406 are shifted away from the foci 418, 420 of the ellipse defining the shape of the combiner. More specifically, one of the foci 420 is between the exit pupil 416 of the imaging optics 406 and an intermediate image 407 formed by the imaging optics. The combiner 408 is positioned with respect to the imaging optics 406 and the object 404 as well as the resultant intermediate image 407 to project the intermediate image to or near infinity (e.g., a distance sufficiently far for comfortable viewing of the viewer, as close as several meters to kilometers). Accordingly, the rays (indicated by dashed lines) are depicted as being substantially collimated In addition, both the aberration at the pupil and the aberration at the image are reduced. The distance of the eye and pupil of the projection optics is preferably such that reduced value of the image and pupil aberrations is obtained.

Although various structures and methods for illumination and imaging are depicted in connection with displays such as head mounted displays and helmet mounted displays, other displays such as heads-up displays as well as non-display applications can benefit from the use of such technology. Examples of devices that may incorporate this technology include projectors, flat-panel displays, back-projection TV's, computer screens, cell phones, GPS systems, electronic games, palm tops, personal assistants and more. This technology may be particularly useful for aerospace, automotive, and nautical instruments and components, scientific apparatus and equipment, and military and manufacturing equipment and machinery. The potential applications range from home electronics and appliances to interfaces for business and industrial tools, medical devices and instruments, as well as other electronic and optical displays and systems both well known as well as those yet to be devised. Other applications, for example, in industry, such as for manufacturing, e.g., parts inspection and quality control, are possible. The applications should not be limited to those recited herein. Other uses are possible.

Similarly, configurations other than those described herein are possible. The structures, devices, systems, and methods may include additional components, features, and steps and any of these components, features, and steps may be excluded and may or may not be replaced with others. The arrangements may be different.

Moreover, various embodiments of the invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

TABLE I

| Elements | Surface | Radius | Thickness | Glass |
|---|---|---|---|---|
| Image | 0 | Infinity | Infinity | |
| Stop | 1 | Infinity | 0.000 | |
| A1 | 2 (aspheric) | −91.077 | 0.000 | Reflective |
| | 3 (tilt/decenter) | Infinity | −10.295 | |
| A2 | 4 | 29.791 | −3.246 | NBK10 |
| | 5 | 31.398 | 0.000 | |
| | 6 (tilt/decenter) | Infinity | −1.076 | |
| A3 | 7 | −51.916 | −7.348 | SFL57 |
| | 8 | −84.361 | −3.630 | |
| A4 | 9 (aspheric) | −80.585 | −10.299 | NBK10 |
| | 10 | 136.780 | −0.100 | |
| A5 | 11 | −63.316 | −1.200 | SFL57 |
| A6 | 12 | −33.076 | −17.828 | NBK7 |
| | 13 | 61.314 | −0.100 | |
| A7 | 14 | 72.798 | −1.360 | SFL57 |
| | 15 | −3385.379 | −0.100 | |
| A8 | 16 | −73.456 | −12.863 | NLAK33 |
| A9 | 17 | 58.037 | −2.475 | NBK10 |
| | 18 | −111.010 | −0.998 | |
| A10 | 19 | −89.176 | −1.205 | NSF5 |
| A11 | 20 | −32.741 | −12.929 | NLAK33 |
| | 21 | −159.940 | −2.190 | |
| A12 | 22 | Infinity | −11.000 | SPF57 |
| A13 | 23 | Infinity | −5.000 | NLAK33 |
| | 24 (tilt) | Infinity | 0.000 | |
| | 25 (tilt) | Infinity | −1.023 | |
| Object | 26 | Infinity | 0.000 | |

TABLE II

| Element | Surface | Aspheric Coefficients | Tilt & Decenter |
|---|---|---|---|
| A1 | 2 | Conic Const. −0.363 | Tilt X −86.59° |
| A2 | 3 | | Tilt X −69.56° |
| | | | Decenter Y 155.558 |
| | | | Decenter Z −5.097 |
| A3 | 6 | | Tilt X −12.65° |
| | | | Decenter Y −4.504 |
| A4 | 9 | A $0.432 \times 10^{-5}$ | |
| | | B $0.700 \times 10^{-09}$ | |
| A13 | 24 | | Tilt X 8.66° |
| | 25 | | Tilt X −3.84° |
| | | | Decenter Y −16.260 |

TABLE III

| Elements | Surface | Radius | Thickness | Glass |
|---|---|---|---|---|
| Image | 0 | Infinity | Infinity | |
| Stop | 1 | Infinity | 0.000 | |
| B1 | 2 (aspheric) | −89.775 | 0.000 | Reflective |
| | 3 (tilt/decenter) | Infinity | 0.000 | |
| B2 | 4 | 60.718 | −3.000 | NBK10 |
| | 5 | 134.450 | 0.000 | |
| | 6 (tilt/decenter) | Infinity | −15.482 | |
| B3 | 7 (aspheric) | −42.156 | −18.000 | Z-1600R |
| | 8 (aspheric) | 112.611 | −11.423 | |
| B4 | 9 | −38.117 | −13.000 | SK51 |
| B5 | 10 | 77.117 | −3.200 | SFL57 |
| | 11 | −57.234 | −0.271 | |
| B6 | 12 | −39.687 | −10.000 | Z-1600R |
| | 13 (aspheric) | 184.200 | −1.110 | |
| B7 | 14 | −33.701 | −12.291 | NSK5 |
| | 15 | −169.515 | −1.808 | |
| B8 | 16 | Infinity | −11.000 | SKL57 |
| B9 | 17 | Infinity | −4.500 | NLAK33 |
| | 18 (tilt) | Infinity | 0.000 | |
| | 19 (tilt/decenter) | Infinity | −1.138 | |
| Object | 20 | Infinity | 0.000 | |

TABLE IV

| Element | Surface | Aspheric Coefficients | Tilt & Decenter |
|---|---|---|---|
| B1 | 2 | Conic Const. −0.354 | Tilt X −74.86° |
| B2 | 3 | | Tilt X −56.49° |
| | | | Decenter Y 142.230 |
| | | | Decenter Z −33.024 |
| B3 | 6 | | Tilt X −4.58° |
| | | | Decenter Y −4.261 |
| B3 | 7 | A $0.104 \times 10^{-5}$ | |
| | | B $-0.323 \times 10^{-09}$ | |
| B3 | 8 | A $-0.243 \times 10^{-5}$ | |
| | | B $-0.186 \times 10^{-09}$ | |
| B7 | 13 | A $-0.426 \times 10^{-5}$ | |
| | | B $-0.358 \times 10^{-08}$ | |
| | | C $0.313 \times 10^{-11}$ | |
| | | D $0.820 \times 10^{-15}$ | |
| B9 | 18 | | Tilt X 7.34° |
| | 19 | | Tilt X −7.67° |
| | | | Decenter Y −11.883 |

TABLE V

| Elements | Surface | Radius | Thickness | Glass |
|---|---|---|---|---|
| Image | 0 | Infinity | Infinity | |
| Stop | 1 | Infinity | 0.000 | |
| C1 | 2 (aspheric) | −92.177 | 0.000 | Reflective |
| | 3 (tilt/decenter) | Infinity | 0.000 | |
| C2 | 4 (aspheric) | 234.958 | −5.000 | PMMAO |
| | 5 | −207.944 | 0.000 | |
| | 6 (tilt/decenter) | Infinity | −11.044 | |
| C3 | 7 (aspheric) | −40.907 | −22.000 | Z-480R |
| | 8 | 126.927 | −12.370 | |
| | 9 | 77.117 | −3.200 | |
| C4 | 10 | −39.049 | −9.000 | Z-480R |
| | 11 (aspheric) (holographic) | −846.922 | −12.954 | |
| C5 | 12 (aspheric) | −36.352 | −17.180 | Z-480R |
| | 13 | −467.961 | −0.100 | |
| C6 | 14 | Infinity | −11.000 | SKL57 |
| C7 | 15 | Infinity | −4.500 | NLAK33 |
| | 16 (tilt) | Infinity | 0.000 | |
| | 17 (tilt/decenter) | Infinity | −1.011 | |
| Object | 18 | Infinity | 0.000 | |

TABLE VI

| Element | Surface | Aspheric Coefficients | Tilt & Decenter |
|---|---|---|---|
| C1 | 2 | Conic Const. −0.325 | Tilt X −61.36° |
| C2 | 3 | | Tilt X 44.95° |
| | | | Decenter Y 118.396 |
| | | | Decenter Z −63.306 |
| C2 | 4 | A $0.535 \times 10^{-6}$ | |
| | | B $0.216 \times 10^{-8}$ | |
| | | C $-0.133 \times 10^{-11}$ | |
| | | D $0.723 \times 10^{-15}$ | |
| C3 | 6 | | Tilt X −4.23° |
| | | | Decenter Y −1.040 |
| C3 | 7 | A $0.198 \times 10^{-5}$ | |
| | | B $-0.397 \times 10^{-09}$ | |
| | | C $0.451 \times 10^{-12}$ | |
| | | D $0.272 \times 10^{-15}$ | |
| C4 | 11 | A $-0.521 \times 10^{-5}$ | |
| | | B $-0.739 \times 10^{-09}$ | |
| | | C $0.256 \times 10^{-11}$ | |
| | | D $-0.920 \times 10^{-14}$ | |
| | | c1 $-7.285 \times 10^{-4}$ | |
| | | c2 $-1.677 \times 10^{-7}$ | |
| C5 | 12 | A $-0.934 \times 10^{-6}$ | |
| | | B $-0.944 \times 10^{-09}$ | |
| | | C $0.697 \times 10^{-12}$ | |
| | | D $-0.170 \times 10^{-14}$ | |
| C7 | 16 | | Tilt X 7.92° |
| | 17 | | Tilt X −8.24° |
| | | | Decenter Y −10.884 |

What is claimed is:

1. An apparatus comprising:
   a prism comprising:
   a substantially optically transmissive body having first and second input ports for receiving light, an output port for egress of light, and a front face opposite said output port;
   a first reflecting polarization beamsplitting surface comprising a wire grid polarizer angled with respect to said first input port to direct polarized light received by said first input port through said output port; and a second reflecting polarization beamsplitting surface comprising a wire grid polarizer angled with respect to said second input port to direct polarized light received by said second input port through said output port; and a reflective spatial light modulator, wherein said prism is disposed with respect to said reflective spatial light modulator such that said polarized light received by said first and second input ports is delivered to said reflective spatial light modulator via said output port and is reflected from said reflective spatial light modulator through said front face of said prism.

2. The prism of claim 1, wherein at least one of said wire grid polarizers is less than about 100 microns thick.

3. The prism of claim 1, wherein said first and second reflecting polarization beamsplitting surfaces converge toward each other to form an apex.

4. The prism of claim 3, wherein said apex is less than about 200 microns wide such that said output port has a dark region resulting from reduced output at the apex of no more than 200 microns wide.

* * * * *

UNITED STATES PATENT AND TRADEMARK OFFICE
CERTIFICATE OF CORRECTION

PATENT NO. : 7,360,899 B2
APPLICATION NO. : 10/852728
DATED : April 22, 2008
INVENTOR(S) : McGuire et al.

It is certified that error appears in the above-identified patent and that said Letters Patent is hereby corrected as shown below:

Title Page, Item (56) page 2, Col. 2, (Other Publications), Line 1, delete "helmut-" and insert -- helmet --, therefor.

Column 13, Line 51, delete "lenselets" and insert -- lenslets --, therefor.

Column 19, Line 52, delete "meridianal" and insert -- meridional --, therefor.

Column 37, Line 37, delete "A 13" and insert -- A13 --, therefor.

Column 41, Line 58, after "collimated" insert -- . --.

Column 44, Line 34, delete "44.95°" and insert -- -44.95° --, therefor.

Signed and Sealed this

Twenty-fourth Day of February, 2009

JOHN DOLL
*Acting Director of the United States Patent and Trademark Office*